United States Patent
Ström et al.

(10) Patent No.: US 10,699,671 B2
(45) Date of Patent: Jun. 30, 2020

(54) PIXEL PROCESSING WITH COLOR COMPONENT

(71) Applicant: Telefonaktiebolaget LM Ericsson (publ), Stockholm (SE)

(72) Inventors: Jacob Ström, Stockholm (SE); Kenneth Andersson, Gävle (SE); Kristofer Dovstam, Hässelby (SE); Jonatan Samuelsson, Enskede (SE); Rickard Sjöberg, Stockholm (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 31 days.

(21) Appl. No.: 16/303,271

(22) PCT Filed: Nov. 18, 2016

(86) PCT No.: PCT/SE2016/051146
§ 371 (c)(1),
(2) Date: Nov. 20, 2018

(87) PCT Pub. No.: WO2017/200447
PCT Pub. Date: Nov. 23, 2017

(65) Prior Publication Data
US 2019/0206360 A1 Jul. 4, 2019

Related U.S. Application Data

(60) Provisional application No. 62/337,025, filed on May 16, 2016.

(51) Int. Cl.
*G09G 5/06* (2006.01)
*H04N 19/186* (2014.01)
(Continued)

(52) U.S. Cl.
CPC .......... *G09G 5/06* (2013.01); *H04N 1/64* (2013.01); *H04N 1/642* (2013.01);
(Continued)

(58) Field of Classification Search
None
See application file for complete search history.

(56) References Cited

U.S. PATENT DOCUMENTS 6,311,258 B1   10/2001 Gibson et al.
6,741,736 B1 *  5/2004 Jaspers .............. H04N 5/20
                                                          348/E5.073
(Continued)

FOREIGN PATENT DOCUMENTS

WO   2016/130066 A1   8/2016
WO   2016186551 A1   11/2016

OTHER PUBLICATIONS

Extended European Search Report dated Oct. 15, 2019 issued in European Patent Application No. 16902562.4. (6 pages).
(Continued)

*Primary Examiner* — Duane N Taylor, Jr.
(74) *Attorney, Agent, or Firm* — Rothwell, Figg, Ernst & Manbeck, P.C.

(57) ABSTRACT

A processing of pixels comprises checking whether a color component of a pixel in a color space resulting in a smallest error between at least one color component in another color space determined based on the color component and at least one original color component of the pixel in the another color space causes any color channel of the pixel to fall outside of an allowed range. A value of the color component is obtained using a first function/LUT if the color component resulting in the smallest error does not cause any color channel of the pixel to fall outside of said allowed range. However, a value of the color component is obtained using
(Continued)

a second, different function/LUT if the color component resulting in the smallest error causes any color channel of the pixel to fall outside of the allowed range.

21 Claims, 22 Drawing Sheets

(51) Int. Cl.
*H04N 19/85* (2014.01)
*H04N 1/64* (2006.01)

(52) U.S. Cl.
CPC .......... *H04N 19/186* (2014.11); *H04N 19/85* (2014.11); *G09G 2340/06* (2013.01)

(56) References Cited

U.S. PATENT DOCUMENTS

| | | | |
|---|---|---|---|
| 2009/0123089 A1 | 5/2009 | Karlov et al. | |
| 2009/0251487 A1* | 10/2009 | Chiang | G09G 5/02 345/604 |
| 2013/0177066 A1 | 7/2013 | Ye et al. | |
| 2014/0078198 A1 | 3/2014 | Roh et al. | |
| 2015/0029210 A1 | 1/2015 | Daly et al. | |
| 2016/0148596 A1* | 5/2016 | Bhattacharjee | G09G 5/06 345/602 |

OTHER PUBLICATIONS

Norkin, A., "Closed form HDR 4:2:0 chroma subsampling (HDR CE1 and AHG5 related)",Document: JCTVC-W0107; Joint Collaborative Team on Video Coding (JCT-VC) of ITU-T SG 16 WP 3 and ISO/IEC JTC 1/SC 29/WG 11; 23rd Meeting: San Diego, USA, Feb. 19-26, 2016. (9 pages).
Ericsson, "Luma Adjustment", International Telecommunication Union; COM 16-C 1028-E; Telecommunication Standardization Sector; Study Period 2013-2016; Sep. 2015. (8 pages).
Tourapis, A., et al., "Enhanced Luma Adjustment Methods", Document: JCTVC-W0052; Joint Collaborative Team on Video Coding (JCT-VC) of ITU-T SG 16 WP 3 and ISO/IEC JTC 1/SC 29/WG 11; 23rd Meeting: San Diego, USA, Feb. 19-26, 2016. (9 pages).
Translation of Russian Official Action of Substantive Examination and Search dated Jun. 25, 2019 issued in Russian Application No. 2018144162/08. (6 pages).
International Search Report and Written Opinion dated Mar. 16, 2017 issued in International Application No. PCT/SE2016/051146. (12 pages)
Singh, P., "Extraction of Image Objects in Very High Resolution Satellite Images Using Spectral Behaviour in Look-Up Table and Color Space Based Approach", SAI Computing Conference 2016, Jul. 13-15, 2016. (6 pages).
Ström, J. et al., "Luma Adjustment for High Dynamic Range Video", 2016 Data Compression Conference, Mar. 30, 2016. (10 pages).
Ström, J. et al., "Branches: Modified Linearization of Luma Adjustment", Joint Collaborative Team on Video Coding (JCT-VC) of ITU-T SG 16 WP 3 and ISO/IEC JTC 1/SC 29/WG11; 24th Meeting: Geneva, CH, May 26-Jun. 1, 2016; Document: JCTVC-X0036. (10 pages).
Ström, J. et al., "Luma Adjustment for Hybrid Log Gamma", International Organisation for Standardisation Organisation Internationale de Normalisation; ISO/IEX JTC1/SC29/WG11; Coding of Moving Pictures and Audio; ISO/IEC JTC1/SC29/WG11 MPEG2015/m37182; Geneva, Switzerland; Oct. 2015. (4 pages).
Samuelsson, J. et al., "Crosscheck of Luma delta QP adjustment based on video statistical information (JCTVC-W0039)", Joint Collaborative Team on Video Coding (JCT-VC) of ITU-T SG 16 WP 3 and ISO/IEC JTC 1/SC 29/WG11; 23rd Meeting: San Diego, USA, Feb. 19-26, 2016; Document: JCTVC-W0081. (3 pages).

\* cited by examiner

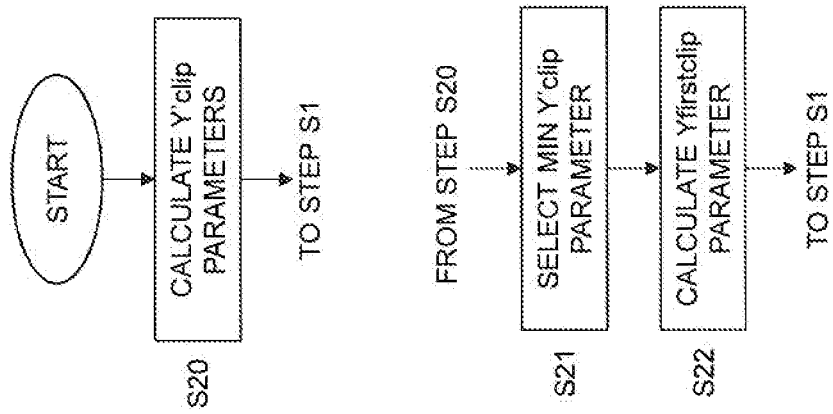
Fig. 5
Fig. 6
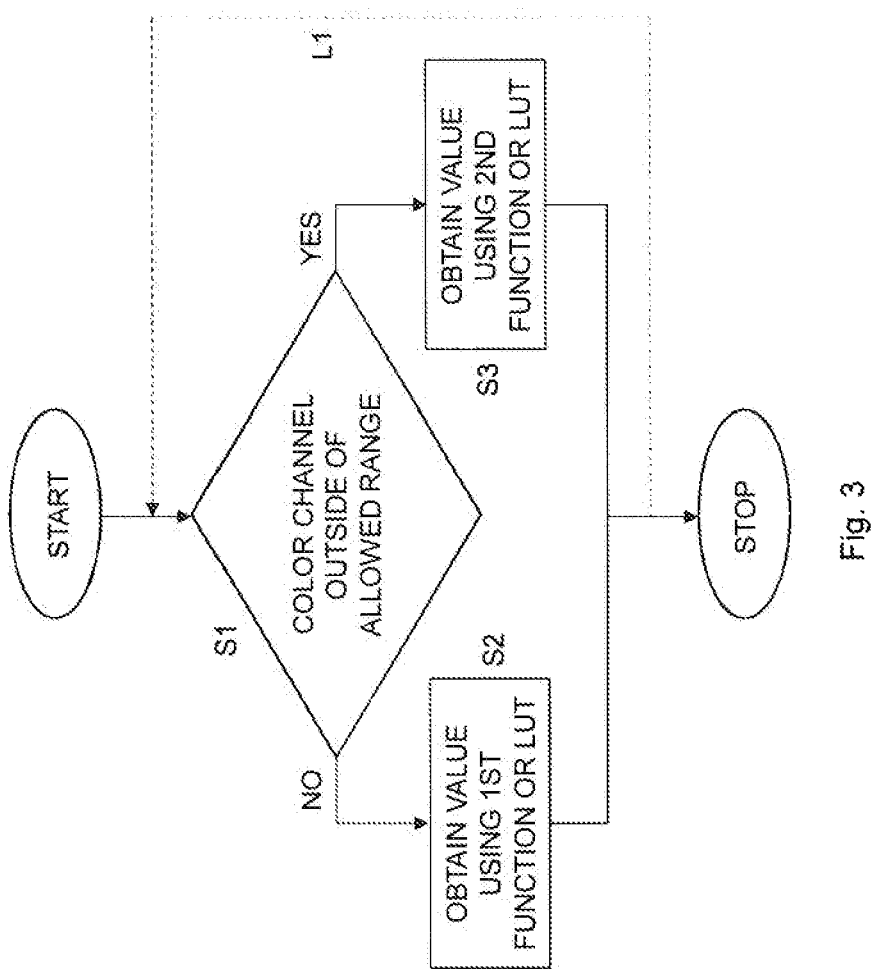
Fig. 3

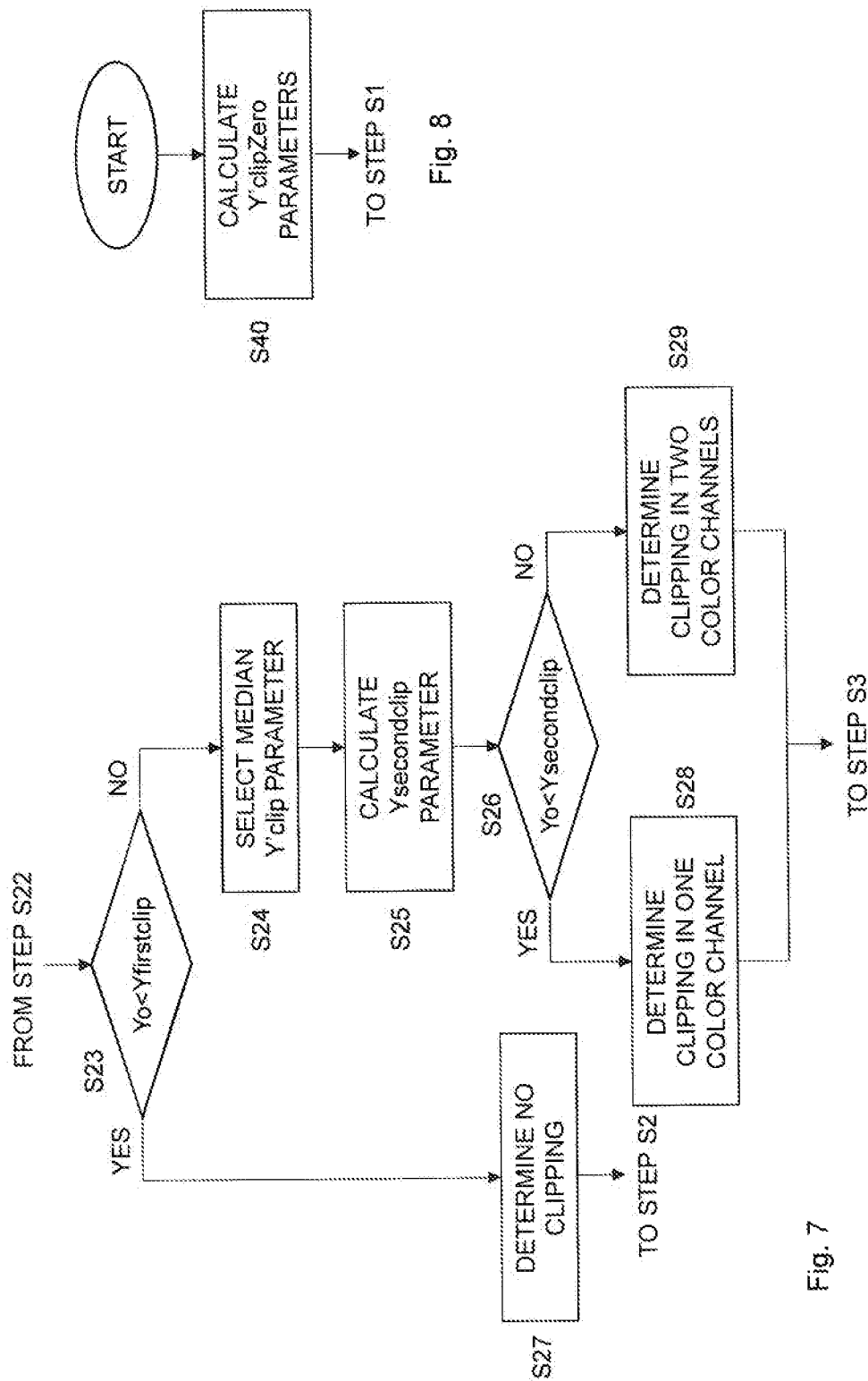

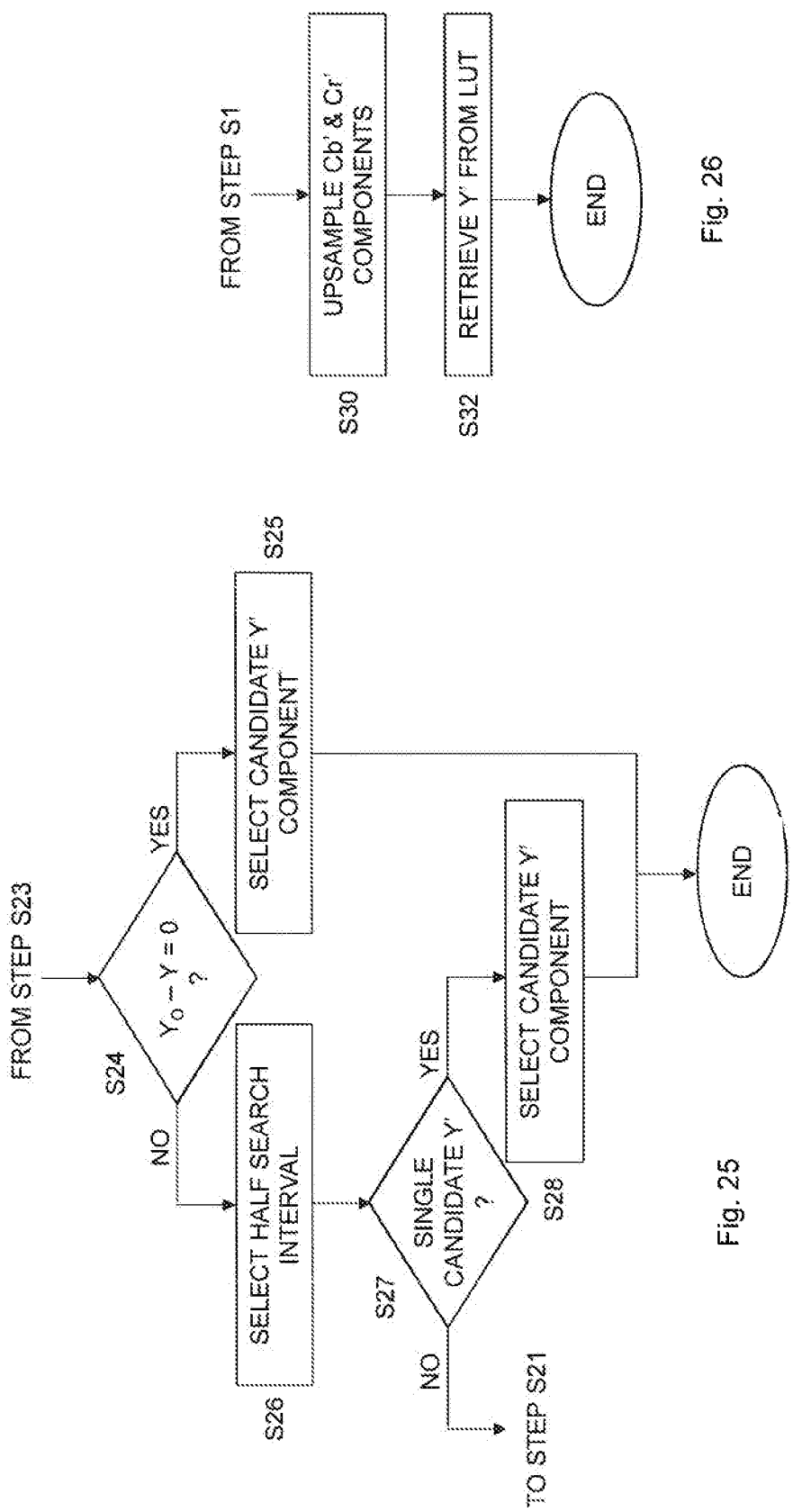

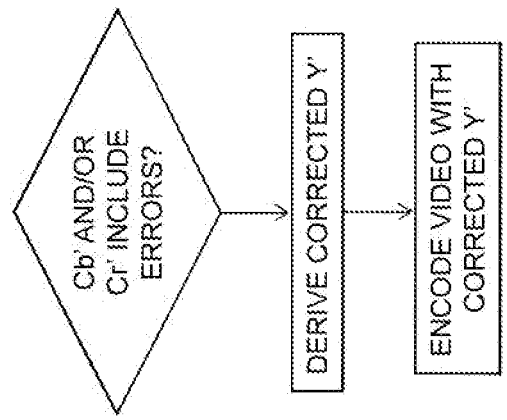
Fig. 31
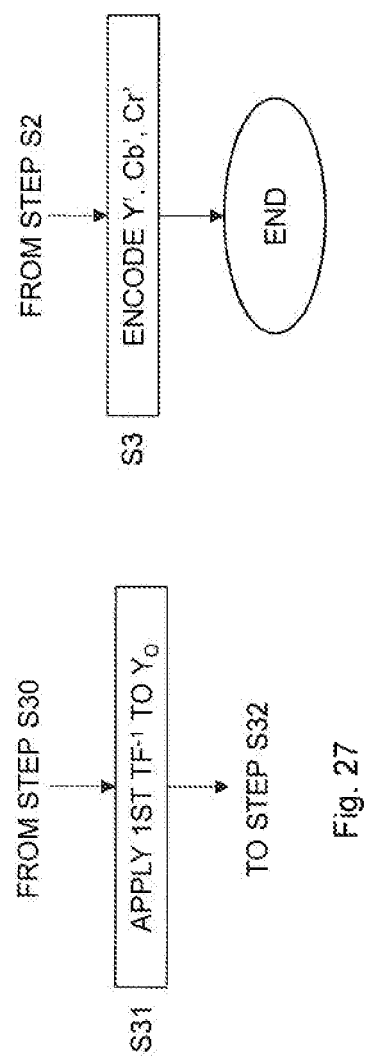
Fig. 28
Fig. 27

PIXEL PROCESSING WITH COLOR COMPONENT

CROSS REFERENCE TO RELATED APPLICATION(S)

This application is a 35 U.S.C. § 371 National Stage of International Patent Application No. PCT/SE2016/051146, filed Nov. 18, 2016, designating the United States and claiming priority to U.S. provisional application No. 62/337,025, filed on May 16, 2016. The above identified provisional application is incorporated by reference.

TECHNICAL FIELD

The present embodiments generally relate to processing of pixels in a picture, and in particular to such processing that improves luminance values of pixels.

BACKGROUND

Within the art of video coding, a non-linear transfer function converts linear samples to non-linear samples with the purpose of mimicking human vision. In coding of high dynamic range (HDR) video, it can be advantageous to use a highly non-linear transfer function. A highly non-linear transfer function makes it possible to distribute many codewords to dark regions, and fewer codewords to bright regions, where the relative difference in brightness is anyway small.

An example of traditional processing of HDR video is shown in FIG. 1. In this traditional processing, an inverse of a transfer function ($TF^{-1}$), such as the opto-electrical transfer function (OETF), which is typically the inverse of the electro-optical transfer function (EOTF), is applied to the red, green and blue color components of the original linear light signal (RoGoBo) to form a non-linear R'G'B' color. A first color transform or color transformation (CT1) is applied to this non-linear R'G'B' color to get a Y'CbCr 4:4:4 color comprising a luma component Y and two chroma components Cb, Cr. The chroma components Cb, Cr are subsampled, for instance to quarter resolution resulting in Y'CbCr 4:2:0 or half resultion resulting in Y'CbCr 4:2:2. This Y'CbCr 4:2:0 or 4:2:2 color is then input to an encoder to get an encoded representation of the HDR video sequence, typically denoted bitstream in the art. The bitstream is then decoded by a decoder to get a reconstructed Y'CbCr 4:2:0 or 4:2:2 color. An inverse of the above described processing takes place to upsample the chroma components Cb, Cr to full resolution, giving Y'CbCr 4:4:4. A reconstructed R'G'B' color is obtained by applying a second color transform (CT2) onto the reconstructed Y'CbCr 4:4:4 color. This reconstructed R'G'B' color is input to a transfer function (TF), such as the EOTF, to get a reconstructed linear RGB color.

Unfortunately, a combination of a highly non-linear transfer function, 4:2:0 subsampling and non-constant luminance ordering gives rise to severe artifacts in saturated colors if the traditional processing as shown in FIG. 1 is used.

One way to solve this problem is to find the luma value (Y') that will give the correct luminance (Yo), where the luminance Yo is determined by applying a color transform to the original linear RoGoBo color. One way of finding this luma value is to perform a binary search, also referred to as bisection search or interval halving, as described in the present Annex A disclosing the AJUSTY technology. For instance, starting with the interval [0, 1023] for the value of the luma component Y', if the candidate value, for instance Y'=512, will generate too high luminance value Y, i.e., Y>Yo, then the method continues with the lower half of the interval [0, 512] and so forth. A disadvantages with using binary search is that the number of iterations can vary. As an example, if 10 bits are used, then up to ten iterations are needed to reduce the interval in the binary search.

Techniques for reducing the interval are available, such as disclosed in [1]. The interval reducing method in [1] works by finding a mathematical bound on Y'. As an example, if the lower bound of Y' is 324 and the upper bound of Y' is 455, then the interval [321, 448] can be used in the binary search instead of the full interval [0, 1023]. Since this interval is only 127 steps wide, it will be ready in seven ($127<2^7$) iterations instead of ten. Using such techniques it is possible to get the average number of iterations down to less than two iterations. This means that it can be efficiently used for offline or non-real-time applications, when the average processing time is what counts. However, for real-time applications, it is typically necessary to know in advance how many iterations will take place.

The present Annex A also describes an embodiment that uses a linearization of the transfer function in order to calculate Y' approximately without resorting to binary search. A linearization solution to calculate an approximate value for Y' has also been described in [2].

However, there is a problem with the linearization strategy, such as disclosed in [2]. The linearization can sometimes lead to failures, resulting in luma values that give rise to severe artifacts. In fact, in some cases the result obtained with the linearization strategy is worse than what would have been obtained by using traditional processing in FIG. 1, which is cheaper.

SUMMARY

It is a general objective to provide an improved processing of pixels in a picture.

This and other objectives are met by embodiments as disclosed herein.

An aspect of the embodiments relates to a method of processing a pixel in a picture. The method comprises checking whether a color component of the pixel in a color space resulting in a smallest error between at least one color component in another color space determined based on the color component in the color space and at least one original color component of the pixel in the another color space causes any color channel of the pixel to fall outside of an allowed range. The method also comprises obtaining a value of the color component in the color space using a first function or a first look-up table if the color component in the color space resulting in the smallest error does not cause any color channel of the pixel to fall outside of said allowed range. The method further comprises obtaining a value of the color component in the color space using a second, different function or a second, different look-up table if the color component in said color space resulting in the smallest error causes any color channel of the pixel to fall outside of the allowed range.

Another aspect of the embodiments relates to a device of processing a pixel in a picture. The device is configured to check whether a color component of the pixel in a color space resulting in a smallest error between at least one color component in another color space determined based on the color component in the color space and at least one original color component of the pixel in the another color space causes any color channel of the pixel to fall outside of an allowed range. The device is also configured to obtain a value of the color component in the color space using a first function or a first look-up table if the color component in the color space resulting in the smallest error does not cause any color channel of the pixel to fall outside of the allowed range. The device is further configured to obtain a value of the color component in the color space using a second, different function or a second, different look-up table if the color component in the color space resulting in the smallest error causes any color channel of the pixel to fall outside of the allowed range.

A further aspect of the embodiments relates to a device for processing a pixel. The device comprises a determining unit for determining whether a color component of the pixel in a color space resulting in a smallest error between at least one color component in another color space determined based on the color component in the color space and at least one original color component of the pixel in the another color space causes any color channel of the pixel to fall outside of an allowed range. The device also comprises a value deriver for deriving value of the color component in the color space using i) a first function or a first look-up table if the color component in the color space resulting in the smallest error does not cause any color channel of the pixel to fall outside of the allowed range and ii) a second, different function or a second, different look-up table if the color component in the color space resulting in the smallest error causes any color channel of the pixel to fall outside of the allowed range.

Yet another aspect of the embodiments relates to a computer program comprising instructions, which when executed by at least one processor, cause the at least one processor to check whether a color component of the pixel in a color space resulting in a smallest error between at least one color component in another color space determined based on the color component in the color space and at least one original color component of the pixel in the another color space causes any color channel of the pixel to fall outside of an allowed range. The at least one processor is also caused to obtain a value of the color component in the color space using a first function or a first look-up table if the color component in the color space resulting in the smallest error does not cause any color channel of the pixel to fall outside of the allowed range. The at least one processor is further caused to obtain a value of the color component in the color space using a second, different function or a second, different look-up table if the color component in the color space resulting in the smallest error causes any color channel of the pixel to fall outside of the allowed range.

The proposed technology also provides a carrier comprising the computer program. The carrier is one of an electronic signal, an optical signal, an electromagnetic signal, a magnetic signal, an electric signal, a radio signal, a microwave signal, or a computer-readable storage medium.

The present embodiments reduce the risk of severe artifacts in pictures as a result of using a linearization strategy for approximating a transfer function during processing of pixels.

BRIEF DESCRIPTION OF THE DRAWINGS

The embodiments, together with further objects and advantages thereof, may best be understood by making reference to the following description taken together with the accompanying drawings, in which:

FIG. 3 is a flow chart illustrating a method of processing a pixel according to an embodiment;

FIG. 5 is a flow chart illustrating an additional, optional step of the method shown in FIG. 3 according to an embodiment;

FIG. 6 is a flow chart illustrating additional, optional steps of the method shown in FIG. 5 according to an embodiment;

FIG. 7 is a flow chart illustrating additional, optional steps of the method shown in FIG. 6 according to an embodiment;

FIG. 8 is a flow chart illustrating an additional, optional step of the method shown in FIG. 3 according to another embodiment;

FIG. 25 is a flow chart illustrating additional, optional steps of the method shown in FIG. 24;

FIG. 26 is a flow chart illustrating an embodiment of implementing the deriving step in FIG. 22;

FIG. 27 is a flow chart illustrating an additional, optional step of the method shown in FIG. 26;

FIG. 28 is a flow chart illustrating an additional step of the method shown in FIG. 22 to form a method of encoding a pixel;

FIG. 31 is a flow chart illustrating a method that can be performed in an encoder or in a pre-process to the encoder;

DETAILED DESCRIPTION

Figure 1:
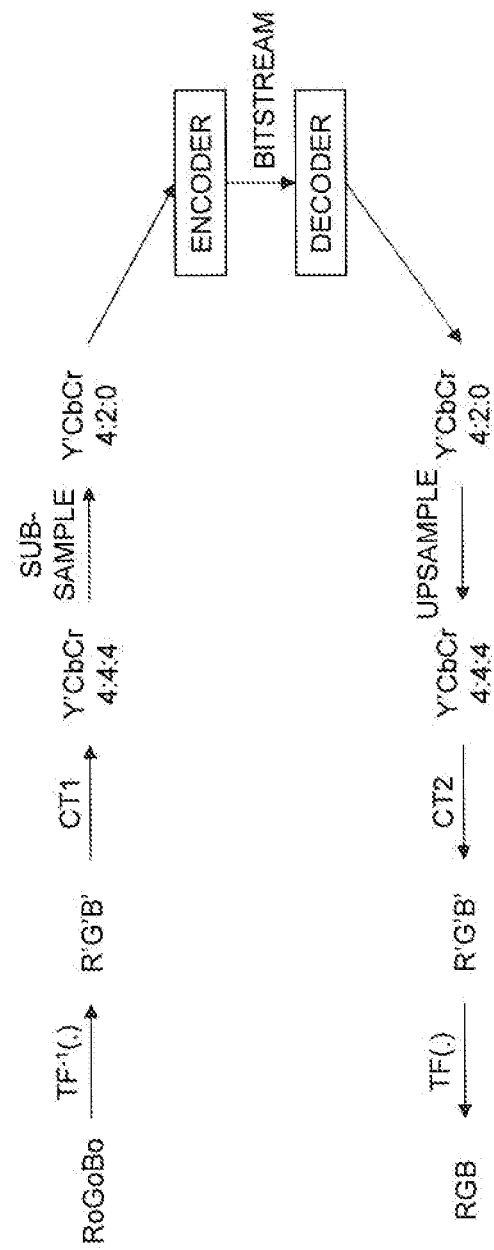
FIG. 1 schematically illustrates traditional processing of pixels in connection with encoding and decoding of video sequences.

The present embodiments generally relate to processing of pixels in a picture, and in particular to such processing that improves luminance values of pixels.

A combination of a highly non-linear transfer function, chroma subsampling and non-constant luminance ordering gives rise to severe artifacts to the video data, in particular for HDR video and saturated colors. The trouble comes from the fact that the chroma components are interpolated, whereas the luma component is not. Hence, there can be sharp shift in the luma component in a pixel but the chroma components cannot follow since they are interpolated. For some colors, especially saturated colors, the result is a pixel of completely wrong intensity, which is clearly visible as an artifact.

Solutions to this problem involve finding the luma value (Y') that will give the correct luminance (Yo) for a pixel. A computationally efficient solution is to linearize the transfer function in order to find an optimal luma value instead of resorting to more computationally expensive and time consuming solutions. As mentioned in the background section, such linearization strategies can, however, lead to failures, resulting in luma values that give rise to severe artifacts in the HDR video sequence. In fact, in some cases the result obtained with the linearization strategy is worse than what would have been obtained without any luma optimization at all. This problem with prior art linearization strategies, such as disclosed in [2] is illustrated here below.

In AJUSTY and Annex A, we note that the original pixel before subsampling has the color (Ro, Go, Bo) and gets the original luminance Yo=wR×Ro+wG×Go+wB×Bo, where Ro is the (linear) red channel, Go is the green channel and Bo is the blue channel of the original pixel. wR, wG and wB are constants such as the CIE1931 XYZ constants for the luminance Y or the (similar) constants for BT.2020, for instance wR=0.2627, wG=0.6780, wB=0.0593.

After subsampling and upsampling, it may not be possible to obtain exactly the same values for red, green and blue. We denote the resulting color values R, G and B and the resulting luminance Y=wR×R+wG×G+wB×B, where R is the (linear) red channel, G is the green channel and B is the blue channel.

R is obtained from the nonlinear value R' by applying the transfer function tf( ) which can be the PQ-EOTF transfer function as defined by SMPTE ST 2084, or another transfer function, such as BT.1886 or Hybrid Log Gamma (HLG). We thus get Y=wR×tf(R')+wG×tf(G')+wB×tf(B').

The values R', G' and B' in turn depend on Y', Cb and Cr according to $$R' = Y' + a13 \times Cr$$

$$G' = Y' - a22 \times Cb - a23 \times Cr$$

$$B' = Y' + a32 \times Cb$$

where a13, a22, a23 and a32 are positive constants that depend on which color format or space is used. For instance, for BT.2020 we have a13=1.4746, a22=0.1646, a23=0.5714, and a32=1.8814. Inserting this into the equation above gives Y=wR×tf(Y'+a13×Cr)+wG×tf(Y'−a22×Cb−a23×Cr)+wg×tf(Y+a32×Cb).

Note that since Cr and Cb are subsampled, we cannot change them in each pixel. Hence we can assume that they are fixed. However, we can change the luma value Y' so that the resulting luminance value Y matches the original luminance value Yo. Note also that since tf( ) is nonlinear, and exists in three places, it is in general not possible to algebraically invert the function Y=f(Y') to get Y'=f⁻¹(Y'). However, as is described in AJUSTY (Annex A), it is possible to linearize tf( ) three times. For instance, the first term wR×tf(Y'+a13×Cr) can be approximated as a line k1×Y'+m1 by linearizing tf(x)~tf(a)+tf'(a)×(x−a).

For instance, linearizing in the point Ro' gives tf(x)~tf(Ro')+tf'(Ro')×(x−Ro'). Thus, tf(Y'+a13×Cr)~tf(Ro')+tf'(Ro')×(Y'+a13×Cr−Ro') and hence wR×tf(Y'+a13×Cr)~wR×tf(Ro')+wR×tf'(Ro')×(Y'+a13×Cr−Ro'), which equals wR×tf(Y'+a13×Cr)~wR×tf(Ro')×Y'+(wR×tf(Ro')+wR×tf'(Ro')×(a13×Cr−Ro'))=k1 Y'+m1, where k1=wR×tf'(Ro') and m1=wR×tf(Ro')+wR×tf'(Ro')×(a13×Cr−Ro').

Doing a similar linearization for wG×tf(Y'−a22×Cb−a23×Cr) and wB×tf(Y'+a32×Cb) by linearizing in Go' and Bo', respectively, means that we can approximate Y as Y~k1×Y'+m1+k2×Y'+m2+k3×Y'+m3, which is described in AJUSTY (Annex A). This is equivalent to Y~(k1+k2+k3)×Y'+(m1+m2+m3). This can be inverted to Y'~Y'k=(Yo−(m1+m2+m3))/(k1+k2+k3).

In more detail, starting with Yo=wR×tf(Y'+a13×Cr)+wG×tf(Y'−a22×Cb−a23×Cr)+wB×tf(Y'+a32×Cb) we linearize tf(x)~tf(a)+tf'(a)(x−a), where the linearization point is a=Ro' for the first instance of the function, a=Go' for the second instance, and a=Bo' for the third instance of the function. This gives Yo=wR×[tf(Ro')+tf'(Ro')(Y'+a13×Cr−Ro')]+wG×[tf(Go')+tf'(Go')(Y'−a22×Cb−a23×Cr−Go')]+wB×[tf(Bo')+tf(Go')(Y'+a32×Cb−Bo')].

Collecting Y' terms gives Yo={wR×tf(Ro')+wG×tf (Go')+wB×tf(Bo')}×Y'+{wR×tf(Ro')+wR×tf(Ro')(a13×Cr−Ro')+wG×tf(Go')+wG×tf(Go')(−a22×Cb−a23×Cr−Go')+wB×tf (Bo')+wB×tf'(Bo')(a32×Cb−Bo')}. We can now write Y'=t/n, where t=Yo−{wR×tf(Ro')+wR×tf(Ro')(a13×Cr−Ro')+wG×tf(Go')+wG×tf(Go')(−a22×Cb−a23×Cr−Go')+wB×tf(Bo')+wB×tf(Bo')(a32×Cb−Bo')} and n=wR×tf(Ro')+wG×tf (Go')+wB×tf'(Bo').

Since Yo=wR×tf(Ro')+wG×tf(Go')+wB×tf(Bo') we can simplify t into t=−{wR×tf(Ro')(a13×Cr−Ro')+wG×tf(Go')(−a22×Cb−a23×Cr−Go')+wB×tf'(Bo')(a32×Cb−Bo')} and, hence, we get equation 1:

Y'=−(wR×tf(Ro')(a13×Cr−Ro')+wG×tf (Go')(−a22×Cb−a23×Cr−Go')+wB×tf(Bo')(a32×Cb−Bo'))/(wR×tf(Ro')+wG×tf (Go')+wB×tf(Bo'))

Figure 2:
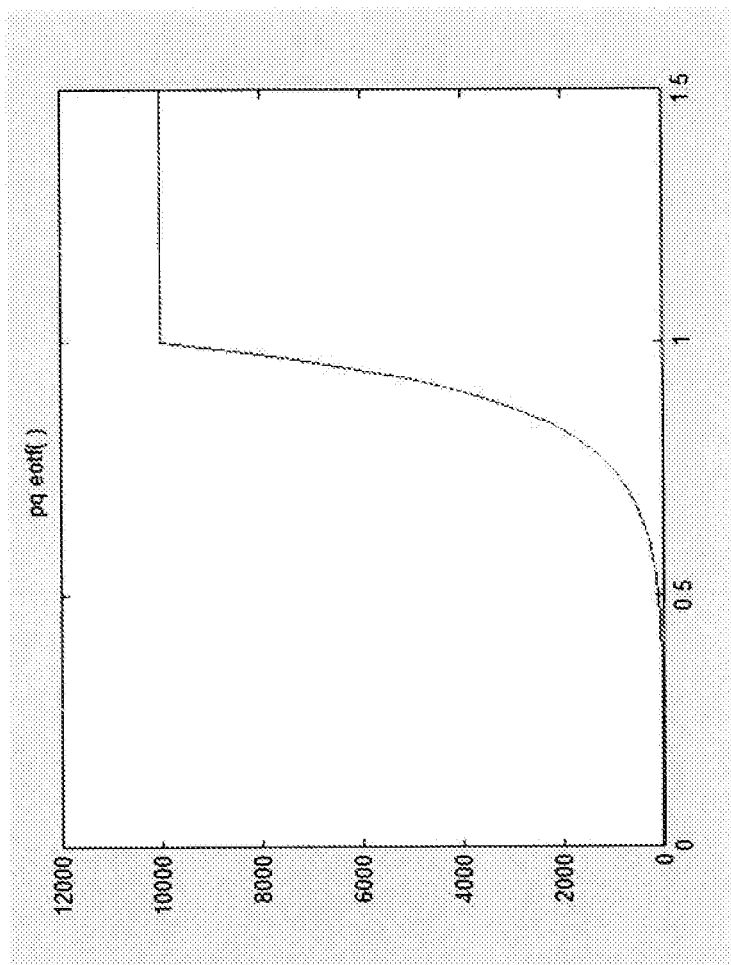
FIG. 2 is a diagram illustrating the perceptual quantizer (PQ) electro-optical transfer function (EOTF) for different input values.

This is equivalent to "Algorithm 2" in document [2]. This often works reasonably well. However, when we get close to the saturation point, the linearization breaks down. FIG. 2 shows the behavior of the PQ EOTF as defined by SMPTE ST 2084. The output increases between 0 and 1.0, but after 1.0 the output is capped at 10,000.

Note that just before input values of one (1), the slope is very steep, the derivative here is over 90,000. At input values over one, the derivative is exactly zero. Therefore, if one linearizes at a point where the input is just below one but the optimum color will have an input just above one, things can go wrong.

Here we have a detailed example of when that happens:

Assume we have two pixels, denoted "1" and "2" herein, next to each other:

$RGB1=[1000\ 1000\ 9995]$ $RGB2=[0\ 0\ 10000]$

The subsampling process will first convert to nonlinear domain, $R'G'B'1=[0.7518\ 0.7518\ 0.9999]$ $R'G'B'2=[0.0000\ 0.0000\ 1.0000]$ and then to Y'CbCr (using BT.2020 conversion matrix):

$Y'CbCr1=[0.7665\ 0.1241\ -0.0100]$ $Y'CbCr2=[0.0593\ 0.5000\ -0.0402]$

The subsampling now replaces these two values with an interpolated value:

$Y'CbCr=[0.4129\ 0.3120\ -0.0251]$

Using Cb and Cr from this interpolated value, we can now use equation 1 to get the Y' value. For pixel 1 we use Ro'=0.7518, Go'=0.7518, Bo'=0.9999. This gives Y'=0.639883 using equation 1. However, this is far too low, since it results in a luminance value Y=wR×tf(Y'+a13×Cr)+wG×tf(Y'−a22×Cb−a23×Cr)+wB×tf(Y'+a32×Cb)=828.89. However, the optimum luma value should be Y'=0.7889, which would generate luminance value of Yo=wR×1000+wG×1000+wB×9995=1533.4. There is a considerable error between the luminance values 828.89 and 1533.4.

In this particular example the linear approximation breaks down since the blue channel saturates. In detail, the optimum luma value Y', i.e., the Y' value that will create a luminance value Y closest to the original luminance value Yo, will make the blue channel saturate.

If we somehow knew that this was going to happen, i.e., that a color channel saturates, we could make sure to linearize not in Bo', which at 0.9999 is on the wrong side of the saturation point, but instead linearize in, for instance, the point 1.25.

Linearizing at Bo', i.e., 0.9999 in the present example, would mean that we approximated wB×tf(Y'+a32×Cb) with k3×Y'+m3 where k3 is over 90,000. Linearizing at, say 1.25 would mean that k3=0.

Instead of linearizing in 1.25 one can replace the equation Y=wR×tf(Y'+a13×Cr)+wG×tf(Y'−a22×Cb−a23×Cr)+wB×tf(Y'+a32×Cb) with the equation Y=wR×tf(Y'+a13×Cr)+wG×tf(Y'−a22×Cb−a23×Cr)+wB×10000, since tf(1)=10000, and do the linearization only in Ro' and Go'. This emanates to the same thing.

The present embodiments provide an improved processing of pixels that solves the above mentioned linearization problems. This is basically achieved by obtaining a value of a color component in a color space using either a first function or look-up table (LUT) or a second, different function or LUT depending on whether the color component resulting in the smallest error value causes any color channel of the pixel to fall outside of an allowed range, such as making it saturate.

A color space or color format is the type and number of colors that originate from the combinations of color components of a color model. A color model is an abstract configuration describing the way colors can be represented as tuples of numbers, i.e., color components. The color components have several distinguishing features such as the component type, e.g., hue, and its unit, e.g., degrees or percentages, or the type of scale, e.g., linear or non-linear, and its intended number of values referred to as the color depth or bit depth.

Non-limiting, but illustrative, color spaces that are commonly used for pixels in pictures and videos include the red, green, blue (RGB) color space, the luma, chroma blue and chroma red (Y'CbCr, sometimes denoted YCbCr, Y'Cb'Cr', YCBCR, Y'CBCR or Y'CB'CR') color space and the luminance and chrominances (XYZ) color space.

FIG. 3 is a flow chart illustrating a method of processing a pixel in a picture. The method comprises checking, in step S1, whether a color component of the pixel in a color space resulting in a smallest error between at least one color component in another color space determined based on the color component in the color space and at least one original color component of the pixel in the another color space causes any color channel of the pixel to fall outside of an allowed range. If the color component in the color space resulting in the smallest error does not cause any color channel of the pixel to fall outside of the allowed range the method continues to step S2. This step S2 comprises obtaining a value of the color component in the color space using a first function or a first LUT. However, if the color component in the color space resulting in the smallest error causes any color channel of the pixel to fall outside of the allowed range the method instead continues to step S3. This step S3 comprises obtaining a value of the color component in the color space using a second, different function or a second, different LUT.

In FIG. 3, the method is illustrated as first checking whether the color component in the color space causes any color channel to fall outside of the allowed range in step S1. Then, and depending on the result of the check, the value of this color component is obtained in either step S2 or S3 as selected based on the result of the check using the first function or LUT or the second, different function or LUT. The embodiments are, however, not limited thereto. In another embodiment, the value of the color component could be first calculated using the first function or retrieved from the first LUT. Then the check of step S1 is performed. If the check concludes that the color component does not cause any color channel to fall outside of the allowed range the calculated or retrieved value of the color component is used for the current pixel. However, if the check instead concludes that the color component causes any color channel to fall outside of the allowed range, the value of the color component is calculated using the second, different function or is retrieved from the second, different LUT. A further variant is to calculate or retrieve the value of the color component using the first function or first LUT and calculate or retrieve the value of the color component using the second, different function or second, different LUT to obtain two values for the color component. Thereafter, the check of step S1 is performed in order to select which of these two values to use for the current pixel depending on whether the color component causes any color channel to fall outside of the allowed range.

The present embodiments thereby obtain a value of the color component using different functions or LUTs depending on whether the optimal value of the color component, i.e., the value that results in the smallest error between the at least one color component in the another color space and the at least one original color component of the pixel in the another color space, causes any color channel of the pixel to fall outside of an allowed range.

Each color channel of the pixel, such as the red color channel, the green color channel and the blue color channel, has a defined allowed range. This allowed range could define an upper limit U, i.e., ≤U or <U, a lower limit L, i.e., ≥L or >L, or both an upper limit and a lower limit, i.e., L≤color channel≤U or L<color channel<U.

If the optimal value of the color component does not cause any of the color channels to fall outside of the allowed range, i.e., color channel≤U or color channel<U, color channel≥L or color channel>L, or L≤color channel≤U or L<color channel<U, the first function or LUT is used to obtain a value of the color component. However, if the optimal value of the color component causes a color channel to fall outside of the allowed range, i.e., color channel>U or color channel, or color channel<L or color channel≤L, then instead the second function or LUT is used to obtain the value of the color component.

The processing of a pixel is preferably performed for multiple, i.e., at least two, pixels in the picture as schematically illustrated by the line L1 in FIG. 3. For instance, the processing of FIG. 3 could be performed for each pixel in the picture, or at least for a portion thereof. The picture is preferably a picture of a video sequence, and in particular an HDR video sequence. In such a case, the method of processing could be performed for pixels in multiple pictures of the (HDR) video sequence.

In an embodiment, step S1 comprises checking whether a color component of the pixel in a second color space resulting in a smallest error between i) a color component in a third color space determined based on the color component in the second color space and an original color component in the third color space determined based on original color components of the pixel in a first color space, or ii) color components in the first color space determined based on the color component in the second color space and the original color components in the first color space causes any color channel of the pixel to fall outside of the allowed range. In this embodiment, step S2 comprises obtaining a value of the color component in the second color space using the first function or the first LUT if the color component in the second color space resulting in the smallest error does not cause any color channel of the pixel to fall outside of the allowed range. Correspondingly, step S3 comprises obtaining a value of the color component in the second color space using the second, different function or the second, different LUT if the color component in the second color space resulting in the smallest error color error causes any color channel of the pixel to fall outside of the allowed range.

In a particular embodiment, the first color space is an RGB color space. Color components of the first color space are thereby red (R), green (G) and blue (B) color components. Correspondingly, the second color space is preferably a Y'CbCr color space. In such a particular embodiment, the color component of the second color space is preferably a luma component (Y') of the pixel. The third color space is preferably an XYZ color space and the color component in the third color space is preferably a luminance component (Y).

In such a particular embodiment, the method of FIG. 3 comprises checking, in step S1, whether a luma component (Y') of the pixel resulting in a smallest error between i) a luminance (Y) determined based on the luma component (Y') and an original luminance (Yo) determined based on original red, green and blue color components (Ro,Go,Bo) of the pixel, or ii) red, green and blue color components (R,G,B) determined based on the luma component (Y') and the original red, green and blue color components (Ro,Go,Bo) of the pixel causes any color channel of the pixel to fall outside of the allowed range.

Step S2 comprises, in this particular embodiment, obtaining a value of the luma component (Y') using the first function or the first LUT if the luma component (Y') resulting in the smallest error does not cause any color channel of the pixel to fall outside of the allowed range. Step S3 correspondingly comprises obtaining a value of the luma component (Y') using the second, different function or the second, different LUT if the luma component (Y') resulting in the smallest error causes any color channel of the pixel to fall outside of the allowed range.

The first function or LUT could be regarded as a default function or LUT to obtain optimal values of the luma component (Y'). This first function or LUT is thereby used for most of the pixels in the picture to derive optimal luma component values. However, for some pixels, the first function or LUT will result in incorrect of the value of the luma component (Y') potentially resulting in visual artifacts. As a consequence, the first function or LUT will not be appropriate to obtain values of the luma component since the first function or LUT is selected or adapted to be used only when no color channel exceeds the allowed range. This means that if the optimal luma component (Y') of a pixel, such as obtained using the first function or LUT, results in a color channel outside of the allowed range, it is more appropriate to use the second, different function or LUT to obtain the optimal value of the luma component.

This was exemplified in the foregoing, where the first function $Y'=-(wR\times tf(Ro')(a13\times Cr-Ro')+wG\times tf(Go')(-a22\times Cb-a23\times Cr-Go')+wB\times tf(Bo')(a32\times Cb-Bo'))/(wR\times tf(Ro')+wG\times tf(Go')+wB\times tf(Bo'))$ could be used to calculate the value of the luma component (Y') of a pixel if no color channel is outside of the allowed range. However, if, for instance, the blue color channel would exceed the maximum allowed value when using this first function, then instead a second function $Y'=(Yo-wB\times 10000-wR\times tf(Ro')-wR\times tf(Ro')(a13\times Cr-Ro')-wG\times tf(Go')-wG\times tf(Go')(-a22\times Cb-a23\times Cr-Go'))/(wR\times tf(Ro')+wG\times tf'(Go'))$ should be used to calculate the value of the luma component (Y').

The error between the luminance values or the red, green and blue components could be defined in various ways. For instance, an error between the luminance Y determined based on the luma component Y' and the original luminance Yo determined based on the original red, green and blue components Ro, Go, Bo could be defined as $|Y-Yo|$ or $(Y-Yo)^2$. Correspondingly, the error between the red, green and blue components R, G, B determined based on the luma component Y' and the original red, green and blue components Ro, Go, Bo could be defined as $|R-Ro|+|G-Go|+|B-Bo|$ or $(R-Ro)^2+(G-Go)^2+(B-Bo)^2$, or $wR|R-Ro|+wG|G-Go|+wB|B-Bo|$ or $wR(R-Ro)^2+wG(G-Go)^2+wB(B-Bo)^2$.

In an embodiment, step S1 comprises checking whether the color component in the color space resulting in the smallest error causes any color channel of the pixel to cause clipping of any color channel of the pixel.

Clipping is a function well known within computer science and involves replacing the value of a parameter exceeding a maximum value with the maximum value or falling below a minimum value with the minimum value. For instance, the clipping function could be defined as clip(a, L, U), which outputs L if a<L, U if a>U and otherwise a.

A color component causing clipping implies that the value of the color component is outside of the allowed range and is replaced by the maximum or minimum value of the allowed range.

In a particular embodiment, step S1 comprises checking whether the color component in the color space, preferably luma component Y' in the Y'CbCr color space, resulting in the smallest error causes clipping of any color channel, preferably any of the red, green and blue color channel, of the pixel against zero or one. In this particular embodiment, the allowed range is thereby (0, 1). Thus, in this particular embodiment zero is the minimum allowed value and one is the maximum allowed value.

In another embodiment, step S1 comprises checking whether the color component in the color space resulting in the smallest error causes any color channel of the pixel to be larger than one or to be smaller than zero, or be equal to or larger than one or to be equal to or smaller than zero. This means that if the color component is $\leq 0$ or $\geq 1$ or $<0$ or $>1$ then the method continues from step S1 in FIG. 3 to step S3. Otherwise the method continues from step S1 to step S2.

In the above described embodiments, the allowed range has an upper limit, U or 1, and a lower limit, L or 0. In another embodiment, only one of the limits is of interest, such as the upper limit. In such an embodiment, step S1 comprises checking whether the color component in the color space resulting in the smallest error causes any color channel of the pixel to saturate.

A color channel saturates if it exceeds the upper limit or maximum value for which the first function or LUT is valid.

In an embodiment, step S2 of FIG. 3 comprises calculating the value of the color component in the color space using a first linearization function if the color component in the color space does not cause any color channel of the pixel to fall outside of the allowed range. Step S3, correspondingly, comprises in this embodiment, calculating the value of the color component in the color space using a second, different linearization function or an inverse function if the color component in the color space causes any color channel of the pixel to fall outside of the allowed range.

Thus, different linearization functions or a linearization function or an inverse function is used to calculate the value of the color component in the color space. These functions are then valid and adapted for different situations, i.e., whether any color channel of the pixel fall outside of the allowed range. As is clearly seen in FIG. 2, the PQ EOTF function behaves very differently depending on whether the input to the PQ EOTF is below or above 1. This means that it is, as shown herein, not possible to accurately represent the PQ EOTF with a single linearization function covering input values both below and above one. Hence, according to an embodiment, a first linearization function of the PQ EOTF, or another transfer function, is used for function input values below one and another linearization function or an inverse function of the PQ EOTF, or the other transfer function, is used for function input values above one.

Figure 4:
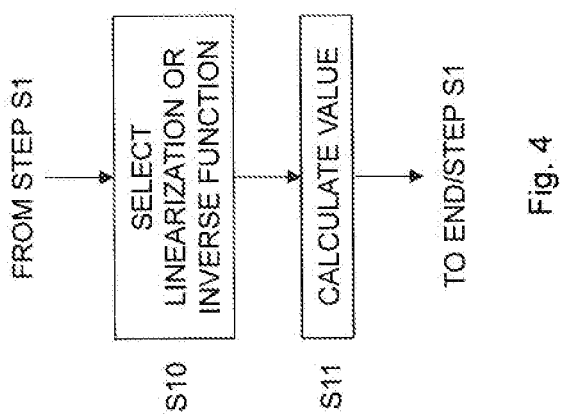
FIG. 4 is a flow chart illustrating additional, optional steps of the method shown in FIG. 3 according to an embodiment.

FIG. 4 is a flow chart illustrating a particular embodiment of step S3 in FIG. 3. The method continues from step S1 in FIG. 3 to step S10. Step S10 comprises selecting the second, different linearization function or the inverse function depending on which color channel or color channels of the pixel that falls or fall outside of the allowed range. A following step S11 then comprises calculating the value of the color component in the color space using the selected second, different linearization function or the selected inverse function.

Steps S10 and S11 have in FIG. 4 been illustrated as two steps. However, the selection of linearization function or inverse function and the calculation of the value of the color component may be performed in a single step. In such an embodiment, which is further disclosed herein, a common linearization function is defined with different terms that are set to zero depending on whether a color channel falls outside of the allowed range, thereby basically resulting in a different linearization function.

This particular embodiment thereby differentiates the linearization or inverse functions depending on which color channel(s) that fall(s) outside of the allowed range. For instance, a given linearization function could be used if the red color channel falls outside of the allowed range and another linearization function is used if the green or blue color channel falls outside of the allowed range.

In a preferred embodiment, different linearization functions are used in step S11 depending on whether the red, green or blue color channel falls outside of the allowed range. In another preferred embodiment, different inverse functions are used in step S11 depending on which combination of two color channels that fall outside of the allowed range.

Hence, in this particular embodiment there are three different linearization functions $LF_R(.)$, $LF_G(.)$ and $LF_B(.)$ that are selected among if one of the color channels fall outside of the allowed range. In this case $LF_R(.)$ is selected if the red color channel falls outside of the allowed range, $LF_G(.)$ is selected if the green color channel falls outside of the allowed range and $LF_B(.)$ is selected if the blue color channel falls outside of the allowed range. Correspondingly, there are three different inverse function $IF_{RG}(.)$, $IF_{RB}(.)$ and $IF_{GB}(.)$ depending on whether the red and green color channels fall outside of the allowed range, the red and blue color channels fall outside of the allowed range or the green and blue color channels fall outside of the allowed range.

One question that comes up is how to know in advance if any color channel will saturate or not. After all, in the previously described example, if the optimal Y' was a little bit lower, we could have the case that the blue channel would not saturate for the optimal Y', and then the linearization where k3=90000 would be correct.

The answer to that question can be seen when studying the conversion from Y'CbCr to R'G'B':

$$R' = Y' + a13 \times Cr$$

$$G' = Y' - a22 \times Cb - a23 \times Cr$$

$$B' = Y' + a32 \times Cb$$

Note that Cr and Cb are fixed, and so are a13, a22, a23 and a32. This means that there is a value Y'redclip, for which the red channel always clips if Y'>Y'redclip. This value can be easily computed as Y'redclip=1−a13×Cr, since this means that R'=Y'+a13×Cr>Y'redclip+a13×Cr=1−a13×Cr+a13×Cr=1. Likewise we have Y'greenclip=1+a22×Cb+a23×Cr and Y'blueclip=1−a32×Cb.

We can now calculate the lowest value where any of these values clip, Y'firstclip=min(Y'redclip, Y'greenclip, Y'blueclip).

Now we can calculate the luminance for this value Yfirstclip=wR×tf(Y'firstclip+a13×Cr)+wG×tf(Y'firstclip−a22×Cb−a23×Cr)+wB×tf(Y'firstclip+a32×Cb).

Now, if Yo<Yfirstclip, we know that the best Y' will not result in any color channels that saturate, and hence it is safe to use equation 1 as linearization function in step S2 of FIG. 3.

However, assume that Yo>Yfirstclip. Assume, for instance, Y'firstclip=Y'blueclip. This means that the blue channel will saturate, and we must linearize in a point above 1.0, for instance 1.25. However, it may still be the case that either the green or the red channel will also saturate. Therefore we will have to test Y'secondclip=median(Y'redclip, Y'greenclip, Y'blueclip), where median gives the middle value.

We now calculate the luminance for this second case Ysecondclip=wR×tf(Y'secondclip+a13×Cr)+wG×tf(Y'secondclip−a22×Cb−a23×Cr)+wB×tf(Y'secondclip+a32×Cb).

Now, if Yo<Ysecondclip, we know that only the blue component saturated, and we can linearize in Ro', Go' and 1.25. Else, if Yo>Ysecondclip, and assume that Y'secondclip=Y'redclip, then we can linearize in 1.25, Go', and 1.25.

Note that all three color channels cannot simultaneously saturate for inputs Y' in [0, 1], so we can stop there.

In summary, we calculate two extra luminance values. This is unfortunate, since that is expensive. However, if we do that, we are sure that we are using the correct formula. Also, it is still less expensive than the worst case of having to perform ten iterations, as was the worst case in AJUSTY, see Annex A.

This is pseudo-code for approximating Y' in a safe way:

Step 1: calculate Y'redclip, Y'greenclip, Y'blueclip:

$$Y'\text{redclip} = 1 - a13 \times Cr,$$

$$Y'\text{greenclip} = 1 + a22 \times Cb + a23 \times Cr,$$

$$Y'\text{blueclip} = 1 - a32 \times Cb.$$

Step 2: calculate luminance for lowest clip value:

```
Y'firstclip = min(Y'redclip, Y'greenclip, Y'blueclip)
Yfirstclip = wRxtf(Y'firstclip + a13 x Cr) + wGxtf(Y'firstclip -
a22 x Cb - a23 x Cr) + wBxtf(Y'firstclip + a32
x Cb)
if(Yo < Yfirstclip)
{
  calculate Y' according to linearization in Ro', Go', and Bo':
  Y' = -(wRxtf'(Ro')(a13 x Cr - Ro') + wGxtf'(Go')(-a22 x Cb -
  a23 x Cr - Go') + wBxtf'(Bo')(a32 x
  Cb - Bo')) / (wRxtf'(Ro') + wGxtf'(Go')+wBxtf'(Bo'))
  STOP
}
```

Step 3: at least one channel clips. See if another channel clips:

```
Y'secondclip = median(Y'redclip, Y'greenclip, Y'blueclip)
Ysecondclip = wRxtf(Y'secondclip + a13 x Cr) + wGxtf(Y'secondclip -
a22 x Cb - a23 x Cr) +
wBxtf(Y'secondclip + a32 x Cb)
if(Yo < Ysecondclip)
{
  only one channel saturates. Use different approximations depending upon which channel
  saturated.
  if Y'firstclip = Y'blueclips, use
    Y' = (Yo - wBx10000 - wRxtf(Ro') - wRxtf'(Ro')(a13 x Cr - Ro') -
    wGxtf(Go') - wGxtf'(Go')(-
    a22 x Cb - a23 x Cr - Go')) / (wRxtf'(Ro')+wGxtf'(Go'))
  if Y'firstclip = Y'redclips, use
    Y' = (Yo - wRx10000 - wBxtf(Bo') - wBxtf'(Bo')(a32 x Cb - Bo') -
    wGxtf(Go') - wGxtf'(Go')(-
    a22 x Cb - a23 x Cr - Go')) / (wBxtf'(Bo') + wGxtf'(Go'))
  if Y'firstclip = Y'greenclips, use
    Y' = (Yo - wGx10000 - wBxtf(Bo') - wBxtf'(Bo')(a32 x Cb - Bo') - wRxtf(Ro') -
    wRxtf'(Ro')(a13 x Cr - Ro')) / (wBxtf'(Bo') + wRxtf'(Ro'))
  STOP
}
```

Step 4: Two channels saturate. We do not need a linearization since the transfer function now is invertible.

```
If Y'firstclip = Y'redclips and Y'secondclip = Y'greenclips or Y'firstclip = Y'greenclips and Y'secondclip =
Y'redclips
  Y' = tf^-1((Yo - 10000wR - 10000wG) / wB) - a32 x Cb
If Y'firstclip = Y'redclips and Y'secondclip = Y'blueclips or Y'firstclip = Y'blueclips and Y'secondclip =
Y'redclips
```

-continued $Y' = tf^{-1}((Yo - 10000wR - 10000wB) / wG) + a22 \times Cb + a23 \times Cr$
If Y'firstclip = Y'greenclips and Y'secondclip = Y'blueclips or Y'firstclip = Y'blueclips and Y'secondclip = Y'greenclips
$Y' = tf^{-1}((Yo - 10000wG - 10000wB) / wR) - a13 \times Cr$
where $tf^{-1}(\ )$ is the inverse of the EOTF transfer function.

STOP

One idea behind the embodiments is to find out whether the individual color channels, i.e., red, green or blue, saturates to the maximum allowed value before linearizing. As an example, if it can be determined that the Y' that results in the best Y, i.e., closes to Yo, means that the red channel will saturate, it is important that the linearization of the transfer function for that channel will be a constant, instead of a sloping line. This will avoid large errors.

The core of an embodiment of the invention is, thus, to find out whether the solution to the equation (r): Yo=wR×tf(Y'+a13×Cr)+wG×tf(Y'-a22×Cb-a23×Cr)+wB×tf(Y'+a32×Cb) will cause the values in the parenthesis to exceed 1 or not for the different color channels. Since all values Yo, Cr, Cb, wR, wG, wB, a13, a22, a23 and a32 are known, the solution to the equation will be a value for Y', let us call this number Y'*.

The idea with the embodiment of the invention is therefore, that even before we know the exact value of Y'*, we investigate whether it will cause any of the color channels to saturate, i.e., whether $Y'^* + a13 \times Cr > 1$      equation (a)

$Y'^* - a22 \times Cb - a23 \times Cr > 1$      equation (b)

$Y'^* + a32 \times Cb > 1$      equation (c)

If the answer to all these questions are "no", i.e., we know that Y'* will not cause any of the above equations (a) to (c) to exceed 1, we can safely use a first way to calculate or obtain Y'*. If the answer to any of the questions are "yes", we use a different way to calculate or obtain Y'*.

In the above-mentioned embodiment, we find the lowest value of Y' that will cause at least one of the equations (a) through (c) to saturate, and we call that value Y'firstclip. We can then calculate what luminance Y that would be the result of using Y'=Y'firstclip by inserting it in equation (r) to obtain Yfirstclip=wR×tf(Y'firstclip+a13×Cr)+wG×tf(Y'firstclip-a22×Cb-a23×Cr)+wB×tf(Y'firstclip+a32×Cb).

Now, if the desired Yo is smaller than Yfirstclip, we can be sure that the optimal value of Y'* will be smaller than Y'firstclip. Hence, without knowing the exact value for Y'*, we know that it will not exceed 1 in any of the equations (a) through (c), and we can safely use a first approximation to calculate an approximate value for Y'*, for instance, Y'=-(wR×tf(Ro')(a13×Cr-Ro')+wG×tf(Go')(-a22×Cb-a23×Cr-Go')+wB×tf(Bo')(a32×Cb-Bo'))/(wR×tf(Ro')+wG×tf(Go')+wB×tf(Bo')).

If Yo on the other hand is larger than Yfirstclip, we cannot use the above formula for calculating Y'*, but must use one that takes into account that one or more of the channels are clipped.

In an embodiment, step S1 of FIG. 3 comprises checking whether a luma component Y' of the pixel resulting in a smallest error between a luminance Y determined based on the luma component Y' and an original luminance Yo determined based on original red, green and blue color components RoGoBo of the pixel causes any of a red, green and blue color channel of the pixel to clip against one, i.e., saturate or is equal to or exceed one. In this embodiment, step S2 comprises calculating a value of the luma component Y' as $$Y' = -\frac{\begin{array}{l}w_R tf'(Ro')(a_{13}Cr - Ro') + \\ w_G tf'(Go')(-a_{22}Cb - a_{23}Cr - Go') + \\ w_B tf'(Bo')(a_{32}Cb - Bo')\end{array}}{w_R tf'(Ro') + w_G tf'(Go') + w_B tf'(Bo')}$$

if the luma component Y' does not cause any of the red, green, blue color channel of the pixel to clip against one. In this embodiment, $w_R$, $w_G$, $w_B$ denote color weights, $a_{13}$, $a_{22}$, $a_{23}$, $a_{32}$ denote positive constants of a color transformation from a Y'CbCr color to an R'G'B' color, Cb, Cr denote chroma components of the pixel, P=tf(P'), wherein P=red (R), green (G) or blue (B), tf(.) is a transfer function and tf(Po') denotes the derivative of the transfer function in Po'. In this embodiment, step S10 of FIG. 4 comprises selecting the second, different linearization function $$Y' = -\frac{Yo - w_R 10000 - w_G tf'(Go')(-a_{22}Cb - a_{23}Cr - Go') - w_B tf'(Bo')(a_{32}Cb - Bo')}{w_G tf'(Go') + w_B tf'(Bo')}$$

if the red color channel clips, selecting the second, different linearization function $$Y' = \frac{Yo - w_R tf'(Ro')(a_{13}Cr - Ro') - w_G 10000 - w_B tf'(Bo')(a_{32}Cb - Bo')}{w_R tf'(Ro') + w_B tf'(Bo')}$$

if the green color channel clips, and selecting the second, different linearization function $$Y' = \frac{Yo - w_R tf'(Ro')(a_{13}Cr - Ro') - w_G tf'(Go')(-a_{22}Cb - a_{23}Cr - Go') - w_B 10000}{w_r tf'(Ro') + w_G tf'(Go')}$$

if the blue color channel clips. Step S10 also comprises selecting the inverse function $$Y' = tf^{-1}\left(\frac{Yo - w_R 10000 - w_G 10000}{w_B}\right) - a_{32}Cb$$

if the red color channel and the green color channel clip, wherein $tf^{-1}(.)$ denotes the inverse of the transfer function tf(.), selecting the inverse function $$Y' = tf^{-1}\left(\frac{Yo - w_R 10000 - w_B 10000}{w_G}\right) - a_{22}Cb + a_{23}Cr$$

if the red color channel and the blue color channel clip, and selecting the inverse function $$Y' = tf^{-1}\left(\frac{Yo - w_G 10000 - w_B 10000}{w_R}\right) - a_{13}Cb$$

if the green color channel and the blue color channel clip.

In an embodiment, the method also comprises an additional step S20 as shown in FIG. 5. This step S20 comprises calculating Y'redclip=1−$a_{13}$Cr, Y'greenclip=1+$a_{22}$Cb+$a_{23}$Cr and Y'blueclip=1−$a_{32}$Cb. The method then continues to step S1 in FIG. 3. In this embodiment, step S1 comprises checking whether the luma component Y' resulting in the smallest error causes any of the red, green and blue color channel of the pixel to clip against one based on a smallest value of Y'redclip, Y'greenclip and Y'blueclip.

FIG. 6 is a flow chart illustrating additional steps of the method shown in FIG. 5. The method continues from step S20 in FIG. 5 to step S21 in FIG. 6. This step S21 comprises selecting a smallest value Y'firstclip=min(Y'redclip, Y'greenclip, Y'blueclip). The method then continues to step S22, which comprises calculating Yfirstclip=$w_R$tf(Y'firstclip+$a_{13}$Cr)+$w_G$tf(Y'firstclip−$a_{22}$Cb−$a_{23}$Cr)+$w_B$tf(Y'firstclip+$a_{32}$Cb). The method then continues to step S1 in FIG. 3. This step S1 comprises, in this embodiment, checking whether Yo<Yfirstclip. If Yo is smaller than Yfirstclip, the method continues to step S2, where the value of the luma component is calculated using a first linearization function as described above. If Yo is not smaller than Yfirstclip then another linearization function or an inverse function should be used and the method continues to step S3 of FIG. 3 or step S10 of FIG. 4.

FIG. 7 is a flow chart illustrating additional steps of the method shown in FIG. 6. The method continues from step S22 in FIG. 6. A next optional step S23 comprises checking whether Yo<Yfirstclip. If Yo<Yfirstclip the method continues to step S27, which comprises determining that the luma component Y' resulting in the smallest error does not cause any of the red, green or blue color channel of the pixel to clip, such as clip against one, saturate or be (equal to or) exceed one. The method then continues to step S2 in FIG. 3, which comprises calculating the value of the luma component Y' using the linearization function $$Y' = -\frac{w_R tf'(Ro')(a_{13}Cr - Ro') + w_G tf'(Go')(-a_{22}Cb - a_{23}Cr - Go') + w_B tf'(Bo')(a_{32}Cb - Bo')}{w_R tf'(Ro') + w_G tf'(Go') + w_B tf'(Bo')}.$$

However, if Yo is not smaller than Yfirstclip in step S23, the method continues to step S24. This step S24 comprises selecting a median value Y'secondclip=median(Y'redclip, Y'greenclip, Y'blueclip). The method also comprises calculating, in step S25, Ysecondclip=$w_R$tf(Y'secondclip+$a_{13}$Cr)+$w_G$tf(Y'secondclip−$a_{22}$Cb−$a_{23}$Cr)+$w_B$tf(Y'secondclip+$a_{32}$Cb). The method continues to the optional step S26, which comprises checking whether Yo<Ysecondclip. If Yo<Ysecondclip the method continues to step S28, which comprises determining that the luma component Y' resulting in the smallest error causes one of the red, green and blue color channels of the pixel to clip. The method then continues to step S3 of FIG. 3 or step S10 of FIG. 10, in which the value of the luma component Y' is calculated using one of the following linearization functions, depending on which color channel that clips, $$Y' = \frac{Yo - w_R 10000 - w_G tf'(Go')(-a_{22}Cb - a_{23}Cr - Go') - w_B tf'(Bo')(a_{32}Cb - Bo')}{w_G tf'(Go') + w_B tf'(Bo')}$$

$$Y' = \frac{Yo - w_R tf'(Ro')(a_{13}Cr - Ro') - w_G 10000 - w_B tf'(Bo')(a_{32}Cb - Bo')}{w_R tf'(Ro') + w_B tf'(Bo')}$$

$$Y' = \frac{Yo - w_R tf'(Ro')(a_{13}Cr - Ro') - w_G tf'(Go')(-a_{22}Cb - a_{23}Cr - Go') - w_B 10000}{w_R tf'(Ro') + w_G tf'(Go')}$$

Correspondingly, if Yo is not smaller than Ysecondclip, the method continues to step S29. This step S29 comprises determining that the luma component Y' resulting in the smallest error causes two of the red, green and blue color channels of the pixel to clip. The method then continues to step S3 of FIG. 3 or step S10 of FIG. 10, in which the value of the luma component Y' is calculated using one of the following inverse functions, depending on which color channels that clip $$Y' = tf^{-1}\left(\frac{Yo - w_R 10000 - w_G 10000}{w_B}\right) - a_{32}Cb$$

$$Y' = tf^{-1}\left(\frac{Yo - w_R 10000 - w_B 10000}{w_G}\right) + a_{22}Cb + a_{23}Cr$$

$$Y' = tf^{-1}\left(\frac{Yo - w_G 10000 - w_B 10000}{w_R}\right) - a_{13}Cb$$

The linearization function described in the foregoing for the case in which no color channels clips, the linearization functions for the cases in which one color channel clips and the inverse functions for the cases in which two color channels clip against one should merely be seen as illustrative but non-limiting examples of linearization and inverse functions. These example functions are based on linearizing the transfer function tf(x) by tf(a)+tf'(a)×(x−a). Other variants of linearizations are possible and within the scope of the embodiments. For instance, tf(a)+tf'(a)×(x−a)+tf''(a)×(x−a)$^2$/2 could be used, i.e., approximating the transfer function using a second degree polynomial instead of a first degree polynomial.

In another embodiment, we do not calculate Yfirstclip or Ysecondclip. Instead we have a pre-determined look-up table (LUT). The input to the look-up table is Yo, Cr and Cb. The constants wR, wG, wB, a13, a22 a23 and a32 do not vary from pixel to pixel and therefore do not need to be inputs to the LUT. The output of the lookup table is, in an embodiment, three bits ba, bb, bc. If ba=0, this means that the optimal Y'* does not cause equation (a) to saturate, i.e., it does not cause equation (a) to exceed 1. If however ba=1, this means that the optimal Y'* does indeed cause equation (a) to saturate, i.e., that Y'*+a13×Cr>1. Likewise, bb tells whether the optimal Y'* will cause equation (b) to saturate, and bc tells whether the optimal Y'* will cause equation (c) to saturate. In this embodiment, the first step is to get ba, bb and bc from the LUT (ba, bb, bc)=LUT(Yo, Cr, Cb).

Now if ba==bb==bc==0, we use a first approximation to calculate the approximate value of Y'*, for instance, we may use Y'=-(wR×tf(Ro')(a13×Cr-Ro')+wG×tf(Go')(-a22×Cb-a23×Cr-Go')+wB×tf(Bo')(a32×Cb-Bo'))/(wR×tf(Ro')+wG×tf (Go')+wB×tf(Bo')). However, if one or more of ba, bb, bc equals 1, we use another approximation to calculate the value of Y'*.

As an example, if ba=0, bb=0, bc=1, we may use Y'=(Yo-wB×10000-wR×tf(Ro')-wR×tf(Ro')(a13×Cr-Ro')-wG×tf(Go')-wG×tf(Go')(-a22×Cb-a23×Cr-Go'))/(wR×tf(Ro')+wG×tf(Go')). As another example, if ba=1, bb=0, bc=1 we may use Y'=tf$^{-1}$((Yo-10000wR-10000wB)/wG)+a22×Cb+a23×Cr to calculate the approximate value of Y'.

It should be noted that in each of the above cases we have used linearization to get a formula to calculate Y'. Note however that this formula is approximate, and we can use other approximations to get Y'. As an example, we can train a neural network for each of the cases. Thus, in one embodiment, we first obtain ba, bb, bc using the LUT: (ba, bb, bc)=LUT(Yo, Cb, Cr).

Then we use one of the following seven neural networks to calculate Y'*:

```
if( ba==0 AND bb == 0 AND bc==0)
    Y' = neural_network_000(Yo, Cb, Cr)
else if(ba == 0 AND bb == 0 AND bc == 1)
    Y' = neural_network_001(Yo, Cb, Cr)
else if(ba == 0 AND bb == 1 AND bc == 0)
    Y' = neural_network_010(Yo, Cb, Cr)
else if(ba == 1 AND bb == 0 AND bc == 0)
    Y' = neural_network_100(Yo, Cb, Cr)
else if(ba == 0 AND bb == 1 AND bc == 1)
    Y' = neural_network_011(Yo, Cb, Cr)
else if(ba == 1 AND bb == 0 AND bc == 1)
    Y' = neural_network_101(Yo, Cb, Cr)
else if(ba == 1 AND bb == 1 AND bc == 0)
    Y' = neural_network_110(Yo, Cb, Cr)
else
    Y = 1
```

These seven neural networks have previously been trained using data that only comes from the relevant cases, for instance, neural_network_011 has only been trained on data where both the green and the blue channels saturate.

Note also that in the above method the LUT may not give the correct answer. In order to use the LUT, one really need to first quantize the input variables Yo->Yoq, Cb->Cbq, Cr->Crq. Hence, the output we get (ba, bb, bc)=LUT(Yoq, Cbq, Crq) is really the answer to whether the solution Y'* that satisfies Yo=wR×tf(Y'q+a13×Crq)+wG×tf(Y'q-a22×Cbq-a23×Crq)+wB×tf(Y'q+a32×Cbq) will cause any color channel to saturate, not whether the Y'* that satisfies Yo=wR×tf(Y'+a13×Cr)+wG×tf(Y'-a22×Cb-a23×Cr)+wB×tf(Y'+a32×Cb) will cause any color channel to saturate. However, hopefully the difference is small enough for this to be OK. Quantification means that the values of Yo, Cb and Cr are represented by respective predetermined number of bits.

Instead of getting ba, bb and bc using a LUT, it is of course possible to calculate them using

```
if(Yo > Yredclip)
    ba = 1
else
    ba = 0
``` where Yredclip=wR×tf(Y'redclip+a13×Cr)+wG×tf(Y'redclip-a22×Cb-a23×Cr)+wB×tf(Y'redclip+a32×Cb), which can be simplified to Yredclip=wR×10000+wG×tf(Y'redclip-a22×Cb-a23×Cr)+wB×tf(Y'redclip+a32×Cb) and where Y'redclip=Y'redclip=1-a13×Cr. bb and bc can be calculated analogously. In this case they will be exact.

Thus, in an embodiment a LUT is used in the method of FIG. 3. In this embodiment, step S1 of FIG. 3 comprises retrieving, from a LUT and for each color channel of the red, green and blue color channels of the pixel using the original luminance Yo and the chroma components Cb, Cr of the pixel or quantized versions thereof as input, a bit indicating whether the luma component Y' resulting in the smallest error causes the color channel to clip, e.g. clip against one, saturate or is (equal to or) exceed one.

In another embodiment, we also investigate clipping against zero. In that case we use if(Yo>Yredclip)

```
ba = 1
else if (Yo < YredclipZero)
    ba = -1
else
    ba = 0
``` where Yredclip is calculated as above but YredclipZero equals wR×tf(Y'redclipZero+a13×Cr)+wG×tf(Y'redclipZero-a22×Cb-a23×Cr)+wB×tf(Y'redclipZero+a32×Cb) and Y'redclipZero=-a13×Cr. bb and be are computed likewise. Thus, we can use

```
if( ba==0 AND bb == 0 AND bc==0)
    Y' = neural_network_000(Yo, Cb, Cr)
else if(ba == 0 AND bb == 0 AND bc == 1)
    Y' = neural_network_001(Yo, Cb, Cr)
else if(ba == 0 AND bb == 1 AND bc == 0)
    Y' = neural_network_010(Yo, Cb, Cr)
else if(ba == 1 AND bb == 0 AND bc == 0)
    Y' = neural_network_100(Yo, Cb, Cr)
else if(ba == 0 AND bb == 1 AND bc == 1)
    Y' = neural_network_011(Yo, Cb, Cr)
else if(ba == 1 AND bb == 0 AND bc == 1)
    Y' = neural_network_101 (Yo, Cb, Cr)
else if(ba == 1 AND bb == 1 AND bc == 0)
    Y' = neural_network_110(Yo, Cb, Cr)
else if(ba == 1 AND bb == 1 AND bc == 1)
    Y' = 1
else if(ba == 0 AND bb == 0 AND bc == -1)
    Y' = neural_network_00m(Yo, Cb, Cr)
else if(ba == 0 AND bb == -1 AND bc == 0)
    Y' = neural_network_0m0(Yo, Cb, Cr)
else if(ba == -1 AND bb == 0 AND bc == 0)
    Y' = neural_network_m00(Yo, Cb, Cr)
else if(ba == 0 AND bb == -1 AND bc == -1)
    Y' = neural_network_0mm(Yo, Cb, Cr)
else if(ba == -1 AND bb == 0 AND bc == -1)
    Y' = neural_network_m0m(Yo, Cb, Cr)
else if(ba == -1 AND bb == -1 AND bc == 0)
    Y' = neural_network_mm0(Yo, Cb, Cr)
else if(ba == -1 AND bb == -1 AND bc == -1)
    Y' = 0
```

FIG. 8 is a flow chart illustrating an additional step of the method shown in FIG. 3. This step S30 comprises calculating Y'redclipZero=-$a_{13}$Cr, Y'greenclipZero+$a_{22}$Cb+$a_{23}$Cr and Y'blueclipZero=1-$a_{23}$Cr. $a_{13}$, $a_{22}$, $a_{23}$, $a_{32}$ denote positive constants of a color transformation from a Y'CbCr color to an R'G'B' color, Y' denotes a luma component of the pixel, Cb, Cr denote chroma components of the pixel. The method then continues to step S1 of FIG. 3. In this embodiment, step S1 comprises checking whether a luma component Y' of the pixel resulting in a smallest error between i) a luminance Y determined based on the luma component Y' and an original luminance Yo determined based on original red, green and blue color components RoGoBo of the pixel or ii) red, green and blue color components RGB determined based on the luma component Y' and the original red, green and blue color components RoGoBo of the pixel causes any of a red, green and blue color channel of the pixel to clip against zero, i.e., be (equal to or) smaller than zero, based on at least one of Y'redclipZero=$-a_{13}$Cr, Y'greenclipZero=$a_{22}$Cb+$a_{23}$Cr and Y'blueclipZero=1$-a_{13}$Cr.

This embodiment thereby investigates if any color channel of the pixel clips against zero. This embodiment could be used alone, i.e., instead of investigating whether any color channel of the pixel clips against one. Alternatively, these two variants are used in combination. In such a case, the method comprises both investigating whether any color channel of the pixel clips against one and investigating whether any color channel of the pixel clips against zero. This is further exemplified here below.

When minimizing $(Y-Yo)^2$, even though clipping against 1 will create the worst errors, it has been found that clipping against 0 will also create errors, although less severe. It is therefore an aspect of the embodiments invention to investigate whether the best Y' clips against either 0 or 1 in any of the color channels.

It is possible to write a general formula that automatically adapts to the case when zero or one component clips either against 0 or against 1.

To do so we introduce e.g., two helper variables n and l. We define them as:
n[0]=0 if the best possible Y'* will clip the red component either against 0 or 1,
n[0]=1 otherwise.

Similarly n[1] tells if the green component clips and n[2] tells if the blue component clips. Furthermore,
l[0]=1 if the best possible Y'* will clip the red component against 1, l[0]=0 otherwise. Similarly l[1] and l[2] apply for the green and blue components.

The decoder will get three values Y', Cb and Cr, and from them calculate R', G', B' using $R'=\text{clip}(Y'+a13\times Cr)$ $G'=\text{clip}(Y'-a22\times Cb-a23\times Cr)$ $B'=\text{clip}(Y'+a32\times Cb)$ where clip(x) clips a value to the interval [0, 1]. By using $Rt=a13\times Cr$ $Gt=-a22\times Cb-a23\times Cr$ $Bt=a32\times Cb$ this can be simplified to $R'=\text{clip}(Y'+Rt)$ $G'=\text{clip}(Y'+Gt)$ $B'=\text{clip}(Y'+Bt)$.

To simplify notation we can use normalized values, wherein luminance Y goes from zero and one and the output of the transfer function tf(.) goes from zero to one.

To get the linear values, the decoder will then apply the transfer function R=tf(R'), and similarly for the green and blue components. However, note that R=tf(R')=tf(clip(Y'+Rt)) can be written as R=l[0]+n[0]×tf(R'), and ditto for green and blue. Now if we want to minimize the error in luminance Y, we need to calculate the luminance in the decoder Y=wR×tf(R')+wG×tf(G')+wB×tf(B'). Using the replacement above, we can thus write Y=wR×l[0]+wR×n[0]×tf(Y'+Rt)+wG×l[1]+wG×n[1]×tf(Y'+Gt)+wB×l[2]+wB×n[2]×tf(Y'+Bt), which can be written Y−wR×l[0]−wG×l[1]−wB×l[2]=wR×n[0]×tf(Y'+Rt)+wG×n[1]×tf(Y'+Gt)+wB×n[2]×tf(Y'+Bt).

We can now linearize tf( ) around Ro', Go' and Bo'. For the red channel, we use tf(x)~tf(Ro')+(x−Ro')×tf'(Ro'), where Ro'=tf(Ro), and Ro is the linear red component in the original pixel. We do ditto for the green and blue channels and get Y−wR×l[0]−wG×l[1]−wB×l[2]=wR×n[0]×[tf(Ro')+(Y'+Rt−Ro')×tf'(Ro')]+wG×n[1]×[tf(Go')+(Y'+Gt−Go')×tf'(Go')]+wB×n[2]×[tf(Bo')+(Y'+Bt−Bo')×tf'(Bo')].

This is equal to Y−wR×l[0]−wG×l[1]−wB×l[2]=wR×n[0]×[tf(Ro')+(Rt−Ro')×tf'(Ro')−wG×n[1]×[tf(Go')+(Gt−Go')×tf'(Go')−wB×n[2]×[tf(Bo')+(Bt−Bo')×tf'(Bo')]=wR×n[0]×Y'×tf'(Ro')+wG×n[1]×Y'×tf(Go')+wB×n[2]×Y'×tf'(Bo').

The right hand side of the equation can be simplified to (wR×n[0]×tf'(Ro')+wG×n[1]×tf'(Go')+wB×n[2]×tf'(Bo'))×Y', and hence we can find Y' as Y'=(Y−wR×l[0]−wG×l[1]−wB×l[2]−wR×n[0]×[tf(Ro')+(Rt−Ro')×tf'(Ro')−wG×n[1]×[tf(Go')+(Gt−Go')×tf (Go)−wB×n[2]×[tf(Bo')+(Bt−Bo')×tf'(Bo'])/(wR×n[0]×tf'(Ro')+wG×n[1]×tf'(Go')+wB×n[2]×tf'(Bo')).

Note that this linearization works regardless if the optimum Y' would make either R', G' or B' clip against either 0 or 1. So it can be used if we do not have any clipping at all or if one component clips against either 0 or 1 for the optimum Y'.

However, if the best Y' would cause two color components to clip, which is indicated by n[0]+n[1]+n[2]=1, then, as we have seen above, we do not need to use an approximation through linearization. Instead we can invert the formula directly. We will now present the general formula for this too. Starting from Y−wR×l[0]−wG×l[1]−wB×l[2]=wR×n[0]×tf(Y'+Rt)+wG×n[1]×tf(Y'+Gt)+wB×n[2]×tf(Y'+Bt), we realize that since two components will clip, the n[ ]-factors will zero out two of the factors to the right. If we know that the best Y' clips two components, the following equation will generate exactly the same result Y−wR×l[0]−wG×l[1]−wB×l[2]=(wR×n[0]+wG×n[1]+wB×n[2])×tf(Y'+n[0]×Rt+n[1]×Gt+n[2]×Bt). Dividing by (wR×n[0]+wG×n[1]+wB×n[2]) and taking $tf^{-1}$( ) of both sides gives $tf^{-1}$(Y−wR×l[0]−wG×l[1]−wB×l[2])/(wR×n[0]+wG×n[1]+wB×n[2])=Y'+n[0]×Rt+n[1]×Gt+n[2]×Bt, which equals Y'=$tf^{-1}$(Y−wR×l[0]−wG×l[1]−wB×l[2])/(wR×n[0]+wG×n[1]+wB×n[2])−n[0]×Rt−n[1]×Gt−n[2]×Bt.

So if we know that the best Y' will cause exactly two components to clip, we can use the above formula to calculate Y' exactly.

---

Now we need a simple way to calculate n[0], n[1], n[2] and l[0], l[1], l[2]. It can be done using the following code. In the code " Yp " is used to denote " Y' ", " Rpo, Gpo, Bpo " are used to denote " Ro', Go', Bo' ".
// Figure out which values of Y' are on the limit of clipping.
// Step 1: Calculate Rterm, Gterm and Bterm from Cr and Cb and set up some variables. The desired
// luminance is stored in yLinear.

```
int clipListIndex = 0;
double YpThatClip[5] = {0.0, 0.0, 1.0, 1.0, 1.0};
// The first and the last are 0.0 and 1.0 respectively. Only the 3 middle ones are calculated.
double YLinAtClipBoundary[5] = {−0.0, 0.0, 1.0, 1.0, 1.0};
// The first and the last are −0.1 and 1.0 respectively, to stop the search in the correct position if we have
// Ytarget = 0.0 or 1.0.
double Rterm = a13 × Cr;
double Gterm = −a22 × Cb − a23 × Cr;
double Bterm = a32 × Cb;
// Unless Rterm = 0 we cannot have a situation where Y' in range [0, 1] clips against 0 and another Y' in
// range [0, 1] clips against 1. For instance, if Rterm > 0 then R' = Y' + Rterm will clip against 0 only for
// Y' < 0, which never happens. We can thus discard that one.
if( Rterm < 0)
  YpThatClip[1 + clipListIndex++] = −Rterm;
else
  YpThatClip[1 + clipListIndex++] = 1−Rterm;
if( Gterm < 0)
  YpThatClip[1 + clipListIndex++] = −Gterm;
else
  YpThatClip[1 + clipListIndex++] = 1−Gterm;
if( Bterm < 0)
  YpThatClip[1 + clipListIndex++] = −Bterm;
else
  YpThatClip[1 + clipListIndex++] = 1−Bterm;
// Step 2: Sort the three middle values so that YpThatClip are in increasing order. Use bubble sort.
bubble3(&YpThatClip[1]);
// Step 3: Evaluate Ylinear for every Y' in the list
for(int q = 0; q<3; q++)
  YLinAtClipBoundary[1+q] = convertToYLinear(YpThatClip[1+q], Rterm, Gterm, Bterm);
// Step 4: Find out which interval of Y' we belong to, i.e.,, which branch we are in.
int qq = 1;
while(YLinAtClipBoundary[qq] < yLinear)
  qq++;
// Step 5: Find a representative for that branch to find out which variables we clip.
double YpMid = (YpThatClip[qq−1] + YpThatClip[qq])/2.0;
// Step 6: Set Clipping variables for this branch
int l[3] = {0, 0, 0};
int n[3] = {0, 0, 0};
if( (YpMid + Rterm > 0)&&(YpMid + Rterm < 1) )
  n[0] = 1;
else if( YpMid + Rterm > 1)
  l[0] = 1;
if( (YpMid + Gterm > 0)&&(YpMid + Gterm < 1) )
  n[1] = 1;
else if( YpMid + Gterm > 1)
  l[1] = 1;
if( (YpMid + Bterm > 0)&&(YpMid + Bterm < 1) )
  n[2] = 1;
else if( YpMid + Bterm > 1)
  l[2] = 1;
```

For the special case when Rterm=0 or Gterm=0 or Bterm=0 a slightly modified version of the code above may be used.

Finally, we should choose the best formula for calculating Y'. If all the variables clip, it does not matter which Y' we choose as long as we choose one for which all variables clip in the same way. We can therefore use YpMid. If exactly two variables clip, we use the inverse formula, and if more than one variable is not clipping, we need to use the linearization formula if we want a solution in a single step. This is done using the following code.

```
// Step 7: Now we can see how many free variables we have.
double Yp_Branch;
if(n[0]+n[1]+n[2] == 0)
{
  // 7.1: All three variables clip, we can use any value in the interval, they will all give the same value.
  // Hence we can just as well use the value YpMid.
  Yp_Branch = YpMid;
}
else if(n[0]+n[1]+n[2] == 1)
{
  // 7.2: All but one variable clips. We will therefore get an equation that is invertible. We do not have to
  // approximate at all.
  Yp_Branch = dClip(tfInverse((yLinear − wR×l[0] − wG×l[1] − wB×l[2]) / (wR×n[0] + wG×n[1] + wB×n[2]))
    − n[0]×Rterm − n[1]×Gterm − n[2]×Bterm, 0.0, 1.0);
}
```

-continued

```
else
{
  // 7.3: So here we have more than one variable not clipping. This means that we cannot use the
  // inverse. We therefore have to linearize. We use the general formula. Ro, Go and Bo are the linear
  // components of the original pixel. Rpo is the original red component primed, i.e., Rpo = tf(Ro) and
  // ditto for Gpo and Bpo. Dtf( ) is the first derivative of the transfer function tf( ).
  double Dtf_Rpo = (double) Dtf(Rpo);
  double Dtf_Gpo = (double) Dtf(Gpo);
  double Dtf_Bpo = (double) Dtf(Bpo);
  Yp_Branch = dClip( (yLinear − wR×l[0] − wG×l[1] − wB×l[2] − wR×n[0]×(Ro + Rterm − Rpo)×Dtf_Rpo) −
  wG×n[1]×(Go + (Gterm − Gpo)×Dtf_Gpo) − wB×n[2]×(Bo + (Bterm − Bpo)×Dtf_Bpo) ) /
  (wR×n[0]×Dtf_Rpo + wG×n[1]×Dtf_Gpo + wB×n[2]×Dtf_Bpo), 0.0, 1.0);
}
```

Note that the above code is quite a lot more work compared to the other embodiments, which is just doing the linearization (7.3 above). Especially the following code snippet is expensive: // Step 3: Evaluate Ylinear for every Y' in the list for(int q = 0; q<3; qq++)

YLinAtClipBoundary[1+q]=convertToYLinear(YpThatClip[1+q], Rterm, Gterm, Bterm);
since it calculates the luminance three times. For each such calculation, it will need to execute the transfer function tf( ) three times. In all this means nine executions of the transfer function tf( ) Thus, it may be tempting to skip steps 1-6 and just execute 7.3. But as we have seen, we then open up to large problems if some components actually clip.

One solution is to only test against clippings above 1 and skip clippings against 0. This means that only the values that generate clipping against 1 need to be tested. That can at most be two values, since all three values cannot clip to 1, and on average it may be something like 1.5 value. That saves computation.

Another embodiment goes even further. In this embodiment we calculate step 7.3 directly without any testing, and only if the result will cause clipping in any of the components do we execute the other steps to do things properly. Hence we do:

```
// Step 0: First try the linearized version.
// Assume n and l are set so nothing clips.
int l[3] = {0, 0, 0};
int n[3] = {0, 0, 0};
double Dtf_Rpo = (double) Dtf(Rpo);
double Dtf_Gpo = (double) Dtf(Gpo);
double Dtf_Bpo = (double) Dtf(Bpo);
Yp_Candidate = dClip( (yLinear − wR×l[0] − wG×l[1] − wB×l[2] −
wR×n[0]×(Ro + (Rterm − Rpo)×Dtf_Rpo) −
wG×n[1]×(Go + (Gterm − Gpo)×Dtf_Gpo) − wB×n[2]×(Bo +
(Bterm − Bpo)×Dtf_Bpo) ) / (wR×n[0]×Dtf_Rpo
+ wG×n[1]×Dtf_Gpo + wB×n[2]×Dtf_Bpo), 0.0, 1.0);
if(Yp_Candidate + Rterm >= 0 && Yp_Candidate + Rterm <=
1 && Yp_Candidate + Gterm >= 0 &&
Yp_Candidate + Gterm <= 1 && Yp_Candidate + Bterm >=
0 && Yp_Candidate + Bterm <= 1)
// "Candidate test"
 return (Yp_Candidate);
else
{
 ... do steps 1 to 7 above.
 return(Yp_Branch);
}
```

Thus if the test "Candidate test" passes, we just use that one and we are as quick as just doing the linearization. However, when this test fails, it is indicating that we perhaps should not have used the Yp_Candidate value, since some values are probably clipping for the best Y'. Then we execute the steps 1 through 7 as before. Hopefully this will happen only for a small minority of the pixels, and we will have a fast computation on average.

Note that the worst case behavior, however, is not affected. It is possible that every pixel will clip. In this case the execution time will actually be longer, since we need to calculate both Yp_Candidate and Yp_Branch, whereas before we only needed to calculate Yp_Branch. Thus, for hardware applications where it is necessary to make sure that the worst case can be handled, it may be better to just calculate Steps 1 to 7 without calculating Yp_Candidate.

As has been noted above, a color component can clip both against 0 and 1. However, as we have seen above, it is the clipping against 1 that gives the most severe artifacts. Therefore we may want to use Yp_Candidate even if one or more of the components clip against 0. This can be done by replacing the candidate test with the following:

```
if(Yp_Candidate + Rterm <= 1 && Yp_Candidate +
Gterm <= 1 && Yp_Candidate + Bterm <= 1)
// "Alternative candidate test"
 return (Yp_Candidate);
else
{
 ... do steps 1 to 7 above.
 return(Yp_Branch);
}
```

This will result in faster computation, with the potential loss in quality for pixels clipping against 0.

Note that neither the "Candidate test" or the "Alternative candidate test" are guarantees for a proper processing. It may be the case that the optimal Y' would clip one or more components against 1, but that the formula used to determine Yp_Candidate will result in a value that does not cause clipping against 1. That is a risk, but it may be a good trade off to see some loss in quality for this special case compared to running the computation of steps 1 through 7 for every pixel.

Note that a lot of the expensive calculations above (Step 3) is only used to calculate n[0], n[1], n[2] and l[0], l[1], l[2]. If we instead approximate this calculation with how Yp_Candidate clips we may further reduce the complexity. Thus instead of

```
else
{
 ... do steps 1 to 7 above.
 return(Yp_Branch);
}
We instead do
else
```

```
{
  YpMid = YpCandidate
  ... do steps 6 to 7 above.
  return(Yp_Branch);
}
```

This avoids the expensive Step 3, yielding a faster computation even in the cases where we have clipping. Note, however, that n[0], n[1], n[2] and l[0], l[1] and l[2] will only be approximations of their correct values, so again we cannot be sure that we will get the best approximation. Still, this may be an appropriate trade off sometimes.

In yet another embodiment, steps 1-6 are used to calculate the clipping parameters n[0], n[1], n[2], l[0], l[1] and l[2]. However, instead of using a linearization approximation in step 7, the clipping parameters are used to select one of several look-up tables. The look-up tables contain precomputed values which can be made without any approximations. If no variable is clipping, i.e., if n[0]+n[1]+n[2]=3, then a full-size 3D look-up table can be used. If one variable is clipping, i.e., if n[0]+n[1]+n[2]=2, then only a reduced look-up table is needed, which greatly reduces the size constraints. If two variables are clipping, then only a 1D look-up table is needed, which again greatly reduces the size requirements and also the cache misses.

Ideally, different LUTs will be used for the different clipping cases. As an example, if red clips against 0 and green and blue do not clip, one LUT can be used. If red instead clips against 1 and green and blue do not clip, another LUT can instead be used.

Since every channel can either clip against 0, clip against 1, or be "free", i.e., not clip, there should in principle be 27 different combinations possible, and hence 27 different LUTs. However, 8 of these will cover cases where all three components clip, such as 000, all components clip to zero, or 101, red and blue clips to 1, green clips to 0. In these cases it is possible to use the approximation Yp_Branch=YpMid from step 7.1. Hence only 19 different LUTs are really needed.

The following code can be used:

```
if(n[0]==1 && n[1]==1 && n[2]==1)
{
  Yp_Branch = LUT_fff(Yo, Cb, Cr);
}
else if(n[0]==1 && n[1]==1 && n[2]==0)
{
  if(l[2]==0)
    Yp_Branch = LUT_ff0(Yo, Cb, Cr);
  else
    Yp_Branch = LUT_ff1(Yo, Cb, Cr);
}
else if (n[0]==1 && n[1]==0 && n[2]==1)
{
  if(l[1]==0)
    Yp_Branch = LUT_f0f(Yo, Cb, Cr);
  else
    Yp_Branch = LUT_f1f(Yo, Cb, Cr);
}
else if (n[0]==0 && n[1]==1 && n[2]==1)
{
  if(l[0]==0)
    Yp_Branch = LUT_0ff(Yo, Cb, Cr);
  else
    Yp_Branch = LUT_1ff(Yo, Cb, Cr);
}
else if (n[0]==1 && n[1]==0 && n[2]==0)
{
  if(l[1]==0 && l[2]==0)
    Yp_Branch = LUT_f00(Yo, Cb, Cr);
  else if(l[1]==0 && l[2]==1)
    Yp_Branch = LUT_f01(Yo, Cb, Cr);
  else if(l[1]==1 && l[2]==0)
    Yp_Branch = LUT_f10(Yo, Cb, Cr);
  else if(l[1]==1 && l[2]==1)
    Yp_Branch = LUT_f11(Yo, Cb, Cr);
}
else if (n[0]==0 && n[1]==1 && n[2]==0)
{
  if(l[0]==0 && l[2]==0)
    Yp_Branch = LUT_0f0(Yo, Cb, Cr);
  else if(l[0]==0 && l[2]==1)
    Yp_Branch = LUT_0f1(Yo, Cb, Cr);
  else if(l[0]==1 && l[2]==0)
    Yp_Branch = LUT_1f0(Yo, Cb, Cr);
  else if(l[0]==1 && l[2]==1)
    Yp_Branch = LUT_1f1(Yo, Cb, Cr);
}
else if (n[0]==0 && n[1]==0 && n[2]==1)
{
  if(l[0]==0 && l[1]==0)
    Yp_Branch = LUT_00f(Yo, Cb, Cr);
  else if(l[0]==0 && l[1]==1)
    Yp_Branch = LUT_01f(Yo, Cb, Cr);
  else if(l[0]==1 && l[1]==0)
    Yp_Branch = LUT_10f(Yo, Cb, Cr);
  else if(l[0]==1 && l[1]==1)
    Yp_Branch = LUT_11f(Yo, Cb, Cr);
}
else
{
  Yp_Branch = YpMid
}
```

Please note that the look-up tables above with only a single "f", i.e. LUT_abf(.), LUT_afb(.) and LUT_fab(.), wherein a, b is 0 or 1, could be replaced by inverse functions. Hence, this applies to the cases when (n[0]==1 && n[1]==0 && n[2]==0), (n[0]==0 && n[1]==1 && n[2]==0) and (n[0]==0 && n[1]==0 && n[2]==1).

It should also be noted that each of these look-up-tables may be may be implemented as several LUTs. The reason is that sometimes more precision is needed in a certain area of the LUT, and it is not efficient to make the entire LUT higher resolution, since it becomes too big. As an example, when making a LUT for the transfer inverse of the transfer function $tf^{-1}(\ )$, more resolution is needed close to 0 since the values change much quicker close to zero. For that reason it may be a good idea to use several look up tables and then use the appropriate one. As an example, the inverse could be estimated using the following code:

```
double getInverseTF(doubleY)
{
  if(Y>0.1)
    return (LUT_0_to_1[Y];
  else if (Y> 0.01)
    return (LUT_0_to_0_1[Y];
  else if (Y> 0.001)
    return(LUT_0_to_0_01[Y];
  else if (Y> 0.0001)
    return(LUT_0_to_0_001[Y];
  else if (Y> 0.00001)
    return (LUT_0_to_0_0001[Y];
  else if (Y> 0.000001)
    return(LUT_0_to_0_00001[Y];
  else if (Y> 0.0000001)
    return(LUT_0_to_0_000001[Y];
  else if (Y> 0.00000001)
    return(LUT_0_to_0_0000001[Y];
  else
    return(LUT_0_to_0_00000001[Y];
}
```

Each of the LUTs LUT_0_to_1 through LUT_0_to_0_to_0_00000001 could be of the same size, such as 1024 values. A quicker way than doing all the nested ifs could be to convert the value to a fixed point number and then count the leading number of zeros:

```
double getInverseTF(double Y)
{
    int Ydecide = Y×65536.0;
    int num_leading_zeros_div_2 = (CLZ(Ydecide)+1)/2;
    int Yfixed = Y×2^26;
    int Yindex = Yfixed >> num_leading_zeros_div_2×2;
    return( LUT[num_leading_zeros_div2×1024 + Yindex] );
}
```

Here we first count the number of leading zeros, and divide by two. This is similar to comparing against 0.1, 0.01, 0.001, etc. but instead of every step being 10 each step is 4. The function CLZ is counting the number of leading zeros in an integer and can be implemented with a single assembly instruction in every modern CPU, such as Intel CPUs and ARM CPUs. The big LUT here is a concatenation of the LUTs LUT_0_to_1, LUT_0_to_0_1, LUT_0_to_0_01 etc.

Just as the inverse TF "LUT" really consists of several LUTs, the same thing can be true for the LUTs mentioned above, such as LUT_f00(Yo, Cb, Cr).

Steps S2 and S3 of FIG. 3 can, thus, be obtained according to various embodiments. As described in the foregoing, the value of the color component in the color space could be obtained in terms of calculating the value using a linearization function or an inverse function. In other embodiments, the value is instead retrieved from a LUT as mentioned above.

In such a LUT-based embodiment, step S2 of FIG. 3 preferably comprises retrieving the value of the color component in the color space from a first LUT if the color component in the color space does not cause any color channel of the pixel to fall outside of the allowed range. Step S3 correspondingly comprises, in this embodiment, retrieving the value of the color component in the color space from a second, different LUT if the color component in the color space causes any color channel of the pixel to fall outside of the allowed range.

Figure 9:
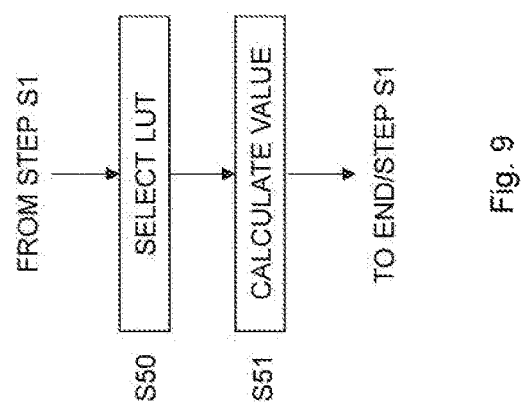
FIG. 9 is a flow chart illustrating additional, optional steps of the method shown in FIG. 3 according to another embodiment.

FIG. 9 is a flow chart illustrating a particular embodiment of step S3 in the case of a LUT-based implementation. The method continues from step S1 in FIG. 3. A next step S40 comprises selecting the second, different LUT depending on which color channel or color channels of the pixel that falls or fall outside of the allowed range. The method then continues to step S41, which comprises retrieving the value of the color component in the color space from the selected second, different LUT.

Thus, as in the previous embodiment disclosing a selection between different linearization functions and inverse functions depending on which color channel(s) that fall(s) outside of the allowed range, this embodiment selects the particular LUT to use to retrieve the value of the color component depending on which color channel(s) that fall(s) outside of the allowed range. In the above described embodiments, the error in luminance is minimized, i.e., a value of the luma component Y' that results in a luminance Y=function(Y') that minimizes the error $|Y-Y_o|$ or $(Y-Y_o)^2$ is obtained using a linearization or inverse function or a LUT.

In an alternative embodiment we do not try to minimize the error in luminance, but instead we want to minimize the (square) error in the linear RGB components. So instead of minimizing $(Y-Y_o)^2$, which is equivalent to $|Y-Y_o|$, where $Y_o=wR \times tf(Y'+a13 \times Cr)+wG \times tf(Y'-a22 \times Cb-a23 \times Cr)+wB \times tf(Y'+a32 \times Cb)$, we minimize $wR \times (R-R_o)^2+wG \times (G-G_o)^2+wB \times (B-B_o)^2$, denoted equation (p) herein, which is equivalent to minimizing $wR \times |R-R_o|+wG \times |G-G_o|+wB \times |B-B_o|$, where $$R=tf(Y'+a13 \times Cr)$$

$$G=tf(Y'-a22 \times Cb-a23 \times Cr)$$

$$B=tf(Y'+a32 \times Cb)$$

By linearizing tf( ) in Ro', Go' and Bo' one can get to the approximate solution $Y'=-[wR \times tf(Ro')^2(a13 \times Cr+Ro')+wG \times tf(Go')^2(-a22 \times Cb-a23 \times Cr-Go')+wB \times tf(Bo')^2(a32 \times Cb-Bo')]/[wR \times tf(Ro')^2+wG \times tf(Go')^2+wB \times tf(Bo')^2]$.

In the same way as above, we will run into problems when one of the components clip. Therefore we do the same where we find out if the optimal Y' will clip any components. As an example, we can use the LUT technique (ba, bb, bc)=LUT(Yo, Cb, Cr), where the LUT has been calculated by minimizing equation (p).

If ba==bb==bc==0 then we can use the approximation $Y'=-[wR \times tf(Ro')^2(a13 \times Cr+Ro')+wG \times tf(Go')^2(-a22 \times Cb-a23 \times Cr-Go')+wB \times tf(Bo')^2(a32 \times Cb-Bo')]/[wR \times tf(Ro')^2+wG \times tf(Go')^2+wB \times tf(Bo')^2]$. If, for instance, the blue component clips, minimizing $wR \times (R-R_o)^2+wG \times (G-G_o)^2+wB \times (B-B_o)^2$ is equivalent to minimizing $wR \times (R-R_o)^2+wG \times (G-G_o)^2+wB \times (10000-B_o)^2$ since tf(1)=10000. We now note that Y' will not affect the last term, so we can instead minimize $D=wR \times (R-R_o)^2+wG \times (G-G_o)^2$, which is equal to $D=wR \times (tf(R')-tf(Ro'))^2+wG \times (tf(G')-tf(Go'))^2$. Linearizing tf( ) in Ro' and Go' gives $D \sim d=wR \times (tf(Ro')+tf'(Ro')(R'-Ro')-tf(Ro'))^2+wG \times (tf(Go')+tf'(Go')(G'-Go')-tf(Go'))^2$, which equals $d=wR \times (tf'(Ro')(R'-Ro'))^2+wG \times (tf'(Go')(G'-Go'))^2$. Inserting $R=tf(Y'+a13 \times Cr)$ and $G=tf(Y'-a22 \times Cb-a23 \times Cr)$ gives $d=wR \times (tf'(Ro')(Y'+a13 \times Cr-Ro'))^2+wG \times (tf'(Go')(Y'-a22 \times Cb-a23 \times Cr-Go'))^2$. Differentiating with respect to Y' and setting the derivative to zero gives $wR \times tf'(Ro')^2 \times 2 \times (Y'+a13 \times Cr-Ro')+wG \times tf'(Go')^2 \times 2 \times (Y'-a22 \times Cb-a23 \times Cr-Go')=0$. Collecting the terms for Y' and solving for Y' gives $Y'=-[wR \times tf'(Ro')^2(a13 \times Cr-Ro')+wG \times tf'(Go')^2 \times (-a22 \times Cb-a23 \times Cr-Go')]/[wR \times tf'(Ro')^2+wG \times tf'(Go')^2]$. This is therefore used when ba=0, bb=0 and bc=1.

In the case when we minimize $(Y-Y_o)^2$, where $Y=wR \times tf(Y'+a13 \times Cr)+wG \times tf(Y'-a22 \times Cb-a23 \times Cr)+wB \times tf(Y'+a32 \times Cb)$, we can see that since tf( ) is a monotonically increasing function, Y will increase monotonically with Y'. This means that if a particular value Y'1 gives a value Y1 that is too big, we know that the ideal Y' value, i.e., the one that will result in Y=Yo, will be smaller than Y'1. The reason is that any other Y'>Y'1 will generate a Y>Y1 but Y1 is already too big, so that cannot be good. Likewise, if another value Y'2 will generate a value Y2 that is too small, then we know that the ideal Y' value must be bigger than Y'2. Any value smaller than Y'2 would create a Y even worse than Y2. This means that the error function $(Y(Y')-Y_o)^2$ will have only one local minimum, and that this value will also be the global minimum, located at the ideal Y'-value, which we can call Y'*, and that the error will be increasing monotonically when moving away from Y'*.

However, when instead minimizing $wR \times (R-R_o)^2+wG \times (G-G_o)^2+wB \times (B-B_o)^2$, which equals $wR \times (tf(Y'+a13 \times Cr)-R_o)^2+wG \times (tf(Y'-a22 \times Cb-a23 \times Cr)-G_o)^2+wB \times (tf(Y'+a32 \times Cr)-B_o)^2$, we cannot be sure that we have just one local minimum. As an example, assume we have the following two linear RGB-values RGB1=(113, 3900, 33) and RGB2=

(3.11, 0.17, 3950). Applying the inverse EOTF gives R'G'B'1=(0.5204, 0.8998, 0.4015) and R'G'B'2=(0.2157, 0.0776, 0.9012). Converting to Y'CbCr gives Y'CbCr1=(0.7706, −0.1962, −0.1697) and Y'CbCr2=(0.1627, 0.3925, 0.0359) and averaging these two values gives Y'CbCr=(0.4667 0.0982−0.0669). Now, if we want to select a Y' for the first pixel (RGB1) we set Ro'=0.5204, Go'=0.8998 and Bo'=0.4015. We have Cb=0.0982 and Cr=−0.0669. Now we can plot the RGB-error=wR×(tf(Y'+a13×Cr)−Ro)$^2$+wG×(tf(Y'−a22×Cb−a23×Cr)−Go)$^2$+wB×(tf(Y'+a32×Cr)−Bo)$^2$. This is plotted in FIG. 10.

Figure 10:
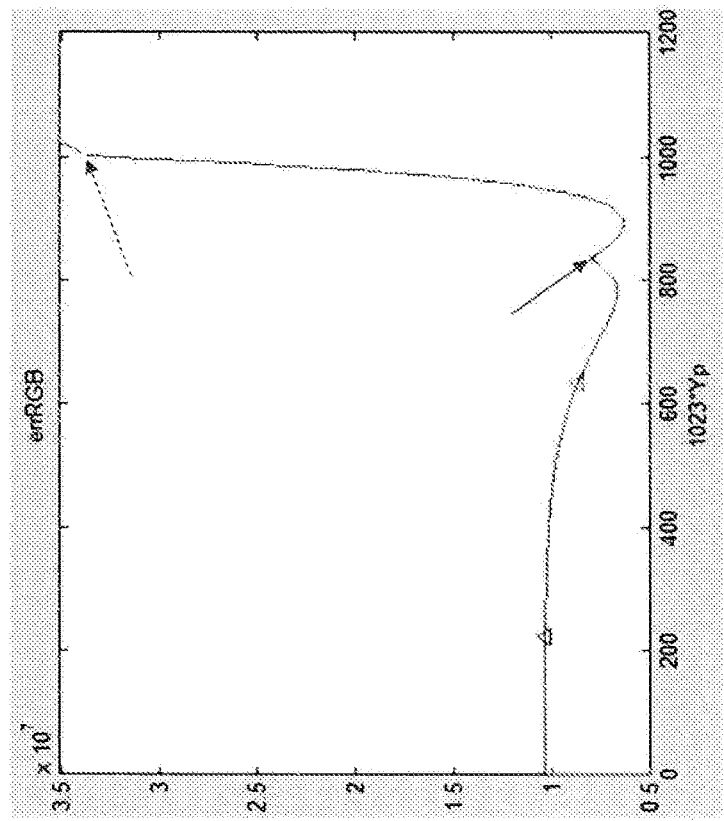
FIG. 10 is a diagram plotting errRGB as a function of Y'×1023 (Yp×1023).

In FIG. 10, Y' is multiplied by 1023. Note how the curve has two local minima, one around 900 and another around 780. There is, thus, no simple way to know which approximation to use. The blue component clips for 1023×Y'=835 marked with the cross indicated by the full arrow. For values of 1023×Y' lower than 835 the linearization Y'rgb with all three components must be used. For values between 835 and 1005, where the green component clips, marked with a hatched arrow, the linearization Y'rg that excludes the blue component should instead be used. Note that since there are multiple local minima there is no way to tell which linearization to use.

When we used the error function (Y−Yo)$^2$, it was sufficient to check whether the first clipping point Y'firstclip would generate a Y-value larger than Yo. In that case it was unnecessary to continue with other linearizations. In this case, however, we cannot say anything from the value of errRGB in the clipping point. As an example, the first clipping point happens at 835, and this is higher than the local minimum to the left at 783, but the true global minimum is at 895, to the right of the first clipping point.

The way to solve this is to calculate linearizations in all three areas. For values of Y' from zero up to the first clipping point Y'firstclip=835/1023 we use the linearization Y'rgb=−[wR×tf(Ro')$^2$(a13×Cr+Ro')+wG×tf(Go')$^2$(−a22×Cb−a23×Cr−Go')+wB×tf(Bo')$^2$(a32×Cb−Bo')]/[wR×tf(Ro')$^2$+wG×tf(Go')$^2$+wB×tf(Bo')$^2$].

Since in this case the blue is the first to clip, we use the linearization Y'rg for the values from 835/1023 to where the green clips at 1005/1023: Y'rg=−[wR×tf(Ro')$^2$(a13×Cr−Ro')+wG×tf(Go')$^2$(−a22×Cb−a23×Cr−Go')]/[wR×tf(Ro')$^2$+wG×tf(Go')$^2$]. For the last values from 1005/1023 to 1023/1023 we can invert the function and we do not need to do a linearization, but we can use Y'r=tf$^{-1}$((Yo−10000×wG−10000×wB)/wR)−a13×Cr.

Thus, this embodiment of the method can be summarized as follows:

Step 1: calculate Y'redclip, Y'greenclip, Y'blueclip:

$$Y'\text{redclip}=1-a13\times Cr$$

$$Y'\text{greenclip}=1+a22\times Cb+a23\times Cr$$

$$Y'\text{blueclip}=1-a32\times Cb$$

Step 2: calculate the approximation for no clipping and its associated error value:

$$Y'rgb=-[wR\times tf(Ro')^2(a13\times Cr+Ro')+wG\times tf(Go')^2(-a22\times Cb-a23\times Cr-Go')+wB\times tf(Bo')^2(a32\times Cb-Bo')]/[wR\times tf(Ro')^2+wG\times tf(Go')^2+wB\times tf(Bo')^2]$$

$$\text{errRGB}(Y'rgb)=wR\times(tf(Y'rgb+a13\times Cr)-Ro)^2+wG\times(tf(Y'rgb-a22\times Cb-a23\times Cr)-Go)^2+wB\times(tf(Y'rgb+a32\times Cr)-Bo)^2$$

Step 3: calculate the approximation when one channel clips:

```
if(Y'blueclip < Y'redclip && Y'blueclip < Y'greenclip)
  Y'rg = − [wR×tf'(Ro')²(a13 × Cr −Ro') + wGxtf'(Go')²(−a22 × Cb − a23 × Cr −Go')] / [wR×tf'(Ro')² + wG×tf'(Go')²]
  Y'one = Y'rg
  errRGBone = wR×(tf(Y'one + a13 × Cr) − Ro)² + wG×(tf(Y'one − a22 × Cb − a23 × Cr) − Go)² + wB×(10000 − Bo)²
else if(Y'redclip < Y'greenclip && Y'redclip < Y'blueclip)
  Y'gb = − [wG×tf'(Go')²(−a22 × Cb − a23 × Cr −Go') + wB×tf'(Ro')²(a32 × Cb − Bo')] / [wG×tf'(Go')² + wB×tf'(Bo')²]
  Y'one = Y'gb
  errRGBone = wR×(10000 − Ro)² + wG×(tf(Y'one − a22 × Cb − a23 × Cr) − Go)² + wB×(tf(Y'one + a32 × Cr) − Bo)²
else // we have that Y'greenclip is the smallest
  Y'rb = − [wR×tf'(Ro')²(a13 × Cr − Ro') + wB×tf'(Bo')²(a32 × Cb − Bo')] / [wR×tf'(Ro')² + wB×tf'(Bo')²]
  Y'one = Y'rb
  errRGBone = wR×(tf(Y'one + a13 × Cr) − Ro)² + wG×(10000 − Go)² + wB×(tf(Y'one + a32 × Cr) − Bo)²
end
```

Step 4: Calculate the approximation, or rather exact formula, for the case when two channels clip:

```
if(Y'redclip > Y'blueclip && Y'redclip > Y'greenclip) // both blue and green clips
  Y'r = tf⁻¹((Yo − 10000×wG − 10000×wB)/wR) − a13 × Cr
  Y'two = Y'r
  errRGBtwo = wR×(tf(Y'two + a13 × Cr) − Ro)² + wG×(10000 − Go)² + wB×(10000 − Bo)²
else if(Y'greenclip > Y'blueclip && Y'greenclip > Y'redclip) // both red and blue clips
  Y'g = tf⁻¹((Yo − 10000×wR − 10000×wB)/wG) + a22 × Cb + a23 × Cr
  Y'two = Y'g
  errRGBtwo = wR×(10000 − Ro)² + wG×(tf(Y'two − a22 × Cb − a23 × Cr) − Go)² + wB×(10000 − Bo)²
else if(Y'blueclip > Y'greenclip && Y'blueclip > Y'redclip) // both red and green clips
  Y'b = tf⁻¹((Yo − 10000×wR − 10000×wG)/wB) − a32 × Cb
  Y'two = Y'b
  errRGBtwo = wR×(10000 − Ro)² + wG×(10000 − Go)² + wB×(Y'two + a32 × Cr − Bo)²
end
```

Step 5: Select the best approximation:

```
errBest = errRGB
Y'best = Y'rgb
if(errRGBone < errBest)
    errBest = errRGBone
    Y'best = Y'one
end
if(errRGBtwo < errBest)
    errBest = errRGBtwo
    Y'best = Y'two
end
```

We have now found the best approximation Y'best. It will have the error errBest.

In an embodiment, step S1 of FIG. 3 thereby comprises checking whether a luma component Y' of the pixel resulting in a smallest error between red, green and blue color components RGB determined based on the luma component r and original red, green and blue color components RoGoBo of the pixel causes any of a red, green and blue color channel of the pixel to clip against one, i.e., saturate or be equal to or exceed one.

Figure 11:
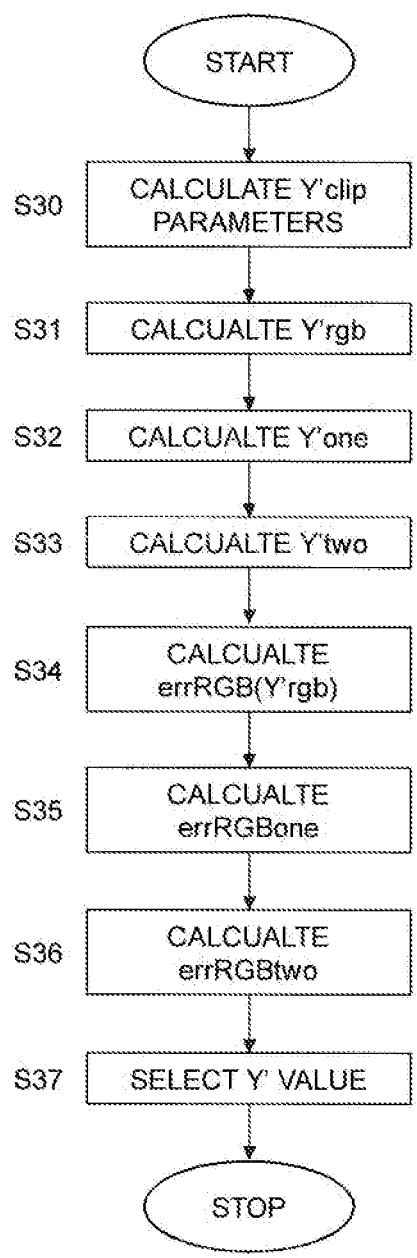
FIG. 11 is a flow chart illustrating a method of processing a pixel according to another embodiment.

FIG. 11 is a flow chart illustrating another embodiment of the method of processing a pixel in a picture. This embodiment comprises calculating, in step S30, Y'redclip=1−$a_{13}$Cr, Y'greenclip=1+$a_{22}$ Cb+$a_{23}$Cr and Y'blueclip=1−$a_{32}$Cb, wherein $a_{13}$, $a_{22}$, $a_{23}$, $a_{32}$ denote positive constants of a color transformation from a Y'CbCr color to an R'G'B' color, Cb, Cr denote chroma components of the pixel. The method also comprises step S31, which comprises calculating a first value Y'rgb of the luma component r as $$Y'rgb = -\frac{w_R tf'(Ro')^2(a_{13}Cr - Ro') + w_G tf'(Go')^2(-a_{22}Cb - a_{23}Cr - Go') + w_B tf'(Bo')^2(a_{32}Cb - Bo')}{w_R tf'(Ro')^2 + w_G tf'(Go')^2 + w_B tf'(Bo')^2},$$

wherein $w_R$, $w_G$, $w_B$ denote color weights, $a_{13}$, $a_{22}$, $a_{23}$, $a_{32}$ denote positive constants of a color transformation from a Y'CbCr color to an R'G'B' color, P=tf(P'), wherein P=red (R), green (G) or blue (B), tf(.) is a transfer function and tf'(Po') denotes the derivative of the transfer function in Po'. The method also comprises of calculating, in step S32, a second value Y'one of the luma component Y' as $$Y'gb = -\frac{w_G tf'(Go')^2(-a_{22}Cb - a_{23}Cr - Go') + w_B tf'(Bo')^2(a_{32}Cb - Bo')}{w_G tf'(Go')^2 + w_B tf'(Bo')^2}$$

if Y'redclip = min(Y'redclip,

Y'greenclip, Y'blueclip), as $$Y'rb = -\frac{w_R tf'(Ro')^2(a_{13}Cr - Ro') + w_B tf'(Bo')^2(a_{32}Cb - Bo')}{w_R tf'(Ro')^2 + w_B tf'(Bo')^2}$$

if Y'greenclip=min(Y'redclip, Y'greenclip, Y'blueclip), and as $$Y'rg = -\frac{w_R tf'(Ro')^2(a_{13}Cr - Ro') + w_G tf'(Go')^2(-a_{22}Cb - a_{23}Cr - Go')}{w_R tf'(Ro')^2 + w_G tf'(Go')^2}$$

if Y'blueclip=min(Y'redclip, Y'greenclip, Y'blueclip). The method further comprises calculating, in step S33, a third value Y'two of the luma component Y' as $$Y'r = tf^{-1}\left(\frac{Yo - w_R 10000 - w_B 10000}{w_G}\right) + a_{22}Cb + a_{23}Cr$$

if Y'redclip=max(Y'redclip, Y'greenclip, Y'blueclip), as $$Y'g = tf^{-1}\left(\frac{Yo - w_R 10000 - w_B 10000}{w_G}\right) + a_{22}Cb + a_{23}Cr$$

if Y'greenclip=max(Y'redclip, Y'greenclip, Y'blueclip), and as $$Y'b = tf^{-1}\left(\frac{Yo - w_G 10000 - w_B 10000}{w_R}\right) - a_{13}Cb$$

if Y'blueclip=min(Y'redclip, Y'greenclip, Y'blueclip). Steps S30 to S33 can be performed serially in any order, or at least partly in parallel.

The method also comprises calculating three respective error values. A first such error value is calculated in step S34 as errRGB(Y'rgb)=$w_R$(tf(Y'rgb+$a_{13}$Cr)−Ro)$^2$+$w_G$(tf(Y'rgb−$a_{22}$Cb−$a_{23}$Cr)−Go)$^2$+$w_B$(tf(Y'rgb+$a_{32}$Cb)−Bo)$^2$. Step S35 comprises calculating a second error value errRGBone=$w_R$(10000−Ro)$^2$+$w_G$(tf(Y'gb−$a_{22}$Cb−$a_{23}$Cr)−Go)$^2$+$w_B$(tf(Y'gb+$a_{32}$Cb)−Bo)$^2$ if Y'redclip=min(Y'redclip, Y'greenclip, Y'blueclip), as errRGBone=$w_R$(tf(Y'rb+$a_{13}$Cr)−Ro)$^2$+$w_G$(10000−Go)$^2$+$w_B$(tf(Y'rb+$a_{32}$Cb)−Bo)$^2$ if Y'greenclip=min (Y'redclip, Y'greenclip, Y'blueclip), and as errRGBone=$w_R$(tf(Y'rg+$a_{13}$Cr)−Ro)$^2$+$w_G$(tf(Y'rg−$a_{22}$Cb−$a_{23}$Cr)−Go)$^2$+$w_B$(10000−Bo)$^2$ if Y'blueclip=min(Y'redclip, Y'greenclip, Y'blueclip). Correspondingly, step S36 comprises calculating a third error value errRGBtwo=$w_R$(tf(Y'r+$a_n$ Cr)−Ro)$^2$+$w_G$(10000−Go)$^2$+$w_B$(10000−Bo)$^2$ if Y'redclip=max(Y'redclip, Y'greenclip, Y'blueclip), as errRGBtwo=$w_R$(10000−Ro)$^2$+$w_G$(tf(Y'g−$a_{22}$Cb−$a_{23}$Cr)−Go)$^2$+$w_B$(10000−Bo)$^2$ if Y'greenclip=max(Y'redclip, Y'greenclip, Y'blueclip), and as errRGBtwo=$w_R$(10000−Ro)$^2$+$w_G$(1000−Go)$^2$+$w_B$(tf(rb+$a_{32}$Cb)−Bo)$^2$ if Y'blueclip=max(Y'redclip, Y'greenclip, Y'blueclip). Steps S34 to S36 can be performed serially in any order or at least partly in parallel. Step S34 is, though, preferably performed after step S31, step S35 is preferably performed after step S32 and step S36 is preferably performed after step S33.

The method also comprises step S37, in which Y'rgb is selected as the value of the luma component Y' if errRGB(Y'rgb)=min(errRGB(Y'rgb, errRGBone, errRGBtwo), Y'one is selected as the value of the luma component Y' if errRGBone=min(errRGB(Y'rgb, errRGBone, errRGBtwo) and Y'two is selected as the value of the luma component Y' if errRGBtwo=min(errRGB(Y'rgb, errRGBone, errRGBtwo).

Figure 12:
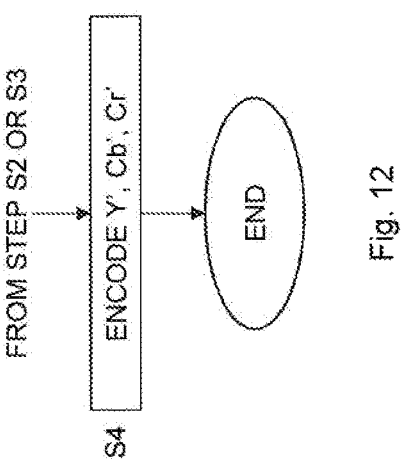
FIG. 12 is a flow chart illustrating an additional step of the method shown in FIG. 3 to form a method of encoding a pixel in a picture according to an embodiment.

The processing of pixels according to the embodiments can be used in different applications, in particular different video applications, including video encoding and in particular to encoding of HDR video sequences An embodiment therefore relates to a method of encoding a pixel in a picture. The method comprises processing the pixel according to any of the embodiments as disclosed herein to derive a value of a luma component for the pixel. The method also comprises, in step S4 as shown in FIG. 12, encoding the value of the luma component and values of subsampled chroma components.

Thus, the processing of pixels can be used as during encoding pixels of pictures, such as in connection with encoding pictures of a video sequence, such as a HDR video sequence.

The output of the processing, i.e., Y'Cb'Cr', such as in the 4:2:0 or 4:2:2 format, is then input to a video encoder, such as a H.264 video encoder, a High Efficiency Video Encoder (HEVC) or H.265 video encoder, or another video encoder. The encoding as performed by the video encoder can include traditional video encoding steps, such as inter prediction, intra prediction, mode decision, transformation of residual, quantization and encoding of the transformed and quantized residuals, such as in an entropy encoder, e.g., a context-adaptive binary arithmetic coding (CABAC) encoder.

An advantage of the processing of the embodiments is that it can be applied to any video or picture encoding process without the need for performing any adjustments in the video or picture encoder or any adjustments in the corresponding video or picture decoder.

The processing of pixels in pictures, such as of a video sequence, may also be used in other applications besides video encoding. For instance, the embodiments can be used as a processing that is applied before transferring video over an interface, such as high-definition multimedia interface (HDMI), DisplayPort or Thunderbolt. For example, in HDMI 2.0a the only way to convey 4K resolution at 50 or 60 frames per second (fps) is to use 4:2:0 or 4:2:2 YCbCr subsampling. If the video data is in full chroma sampling format (4:4:4) then a subsampling processing step must be applied before sending the video data over the HDMI cable. The 4:2:0 or 4:2:2 video data is then transferred over the interface without further compression. By applying the processing of the embodiments, the video quality is improved compared to conventional 4:2:0 or 4:2:2 subsampling without any correction of Y' component or finding of optimal Y' component.

In an embodiment, the core of the processing is to find out whether the luma value Y' that would provide the luminance value of a pixel closest to Yo would cause any of the color components to saturate, or fall below zero. If the answer is no, we use a first way to calculate or obtain the luma value. If the answer is yes, we use a different way to calculate or obtain the luma value.

Figure 13:
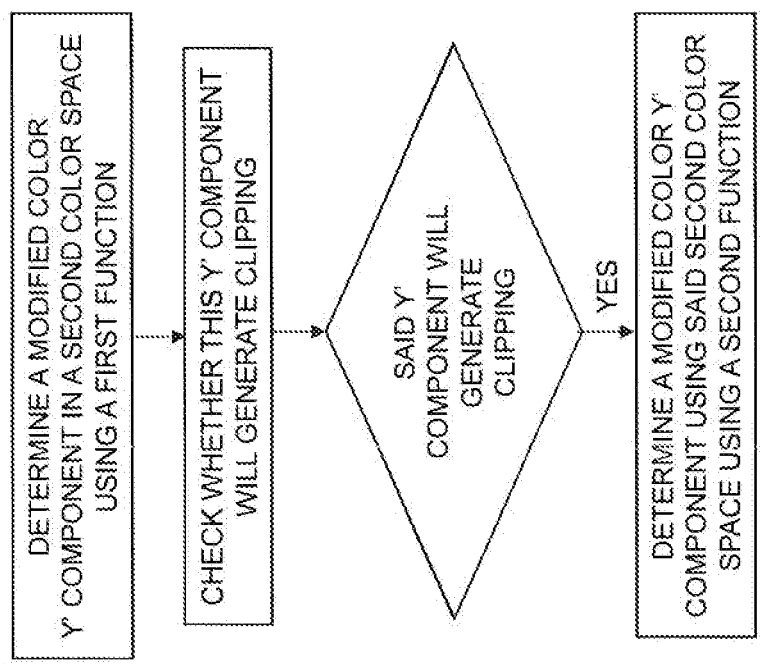
FIG. 13 is a flow chart illustrating a method of processing a pixel according to another embodiment.

FIG. 13 is a flow chart illustrating a method of processing a pixel in a picture according to a further embodiment. The pixel can be represented by color components in a first color space, e.g., R',G',B', color components in a second color space, e.g., Y',Cb,Cr, and color components in a third color space, e.g., Y',Cb,Cr or X,Y,Z, and wherein the color components of the different color spaces can be transferred between each other, as exemplified in the foregoing, by color transformation functions. The method comprises determining a modified color Y'component in a second color space using a first function. The method also comprises checking whether this Y'component will generate clipping. If the Y' component will generate clipping the method also comprises determining a modified color Y'component in the second color space using a second function.

The first function is preferably a first linearization function, i.e., an approximation of a transfer function in terms of representing the transfer function with a linearized version. The second function is preferably a second, different linearization function or an inverse function. In the latter case, it is an inverse or inverted version of the transfer function.

Another aspect of the embodiments relates to a device of processing a pixel in a picture. The device is configured to check whether a color component of the pixel in a color space resulting in a smallest error between at least one color component in another color space determined based on the color component in the color space and at least one original color component of the pixel in the another color space causes any color channel of the pixel to fall outside of an allowed range. The device is also configured to obtain a value of the color component in the color space using a first function or a first look-up table if the color component in the color space resulting in the smallest error does not cause any color channel of the pixel to fall outside of the allowed range. The device is further configured to obtain a value of the color component in the color space using a second, different function or a second, different look-up table if the color component in the color space resulting in the smallest error causes any color channel of the pixel to fall outside of the allowed range.

In an embodiment, the device is configured to check whether a color component of the pixel in a second color space resulting in a smallest error between i) a color component in a third color space determined based on the color component in the second color space and an original color component in the third color space determined based on original color components of the pixel in a first color space or ii) color components in the first color space determined based on the color component in the second color space and the original color components in the first color space causes any color channel of the pixel to fall outside of the allowed range. The device is also configured to obtain a value of the color component in the second color space using the first function or the first look-up table if the color component in the second color space resulting in the smallest error does not cause any color channel of the pixel to fall outside of the allowed range. The device is further configured to obtain a value of the color component in the second color space using the second, different function or the second, different look-up table if the color component in the second color space resulting in the smallest error causes any color channel of the pixel to fall outside of the allowed range.

In an embodiment, the device is configured to check whether a luma component of the pixel resulting in a smallest error between i) a luminance determined based on the luma component and an original luminance determined based on original red, green and blue color components of the pixel or ii) red, green and blue color components determined based on the luma component and the original red, green and blue color components of the pixel causes any color channel of the pixel to fall outside of the allowed range. The device is also configured to obtain a value of the luma component using the first function or the first look-up table if the luma component resulting in the smallest error does not cause any color channel of the pixel to fall outside of the allowed range. The device is further configured to obtain a value of the luma component using the second, different function or the second, different look-up table if the luma component resulting in the smallest error causes any color channel of the pixel to fall outside of the allowed range.

In an embodiment, the device is configured to check whether the color component in the color space resulting in the smallest error causes clipping of any color channel of the pixel, optionally against zero or one.

In a particular embodiment, the device is configured to check whether the color component in the color space resulting in the smallest error causes any color channel of the pixel to be larger than one or to be smaller than zero, or to be equal to or larger than one or to be equal to or smaller than zero.

In another particular embodiment, the device is configured to check whether the color component in the color space resulting in the smallest error causes any color channel of the pixel to saturate.

In an embodiment, the device is configured to calculate the value of the color component in the color space using a first linearization function if the color component in the color space does not cause any color channel of the pixel to fall outside of the allowed range. The device is also configured to calculate the value of the color component in the color space using a second, different linearization function or an inverse function if the color component in the color space causes any color channel of the pixel to fall outside of the allowed range.

In an embodiment, the device is configured to select the second, different linearization function or the inverse function depending on which color channel or color channels of the pixel that falls or fall outside of the allowed range. The device is also configured to calculate the value of the color component in the color space using the selected second, different linearization function or the selected inverse function.

For instance, in an embodiment, the device is configured to check whether a luma component Y' of the pixel resulting in a smallest error between a luminance Y determined based on the luma component Y' and an original luminance Yo determined based on original red, green and blue color components RoGoBo of the pixel causes any of a red, green and blue color channel of the pixel to clip, such as clip against one, saturate or be (equal to or) exceed one. The device is also configured to calculate a value of the luma component Y' as $$Y' = -\frac{w_R tf'(Ro')(a_{13}Cr - Ro') + w_G tf'(Go')(-a_{22}Cb - a_{23}Cr - Go') + w_B tf'(Bo')(a_{32}Cb - Bo')}{w_R tf'(Ro') + w_G tf'(Go') + w_B tf'(Bo')}$$

if the luma component Y' does not cause any of the red, green, blue color channel of the pixel to clip/clip against one/saturate/be equal to or exceed one, wherein $w_R$, $w_G$, $w_B$ denote color weights, $a_{13}$, $a_{22}$, $a_{23}$, $a_{32}$ denote positive constants of a color transformation from a Y'CbCr color to an R'G'B' color, Cb, Cr denote chroma components of the pixel, P=tf(P'), wherein P=red (R), green (G) or blue (B), tf(.) is a transfer function and tf'(Po') denotes the derivative of the transfer function in Po'. The device is further configured to select the second, different linearization function $$Y' = \frac{Yo - w_R 10000 - w_G tf'(Go')(-a_{22}Cb - a_{23}Cr - Go') - w_B tf'(Bo')(a_{32}Cb - Bo')}{w_G tf'(Go') + w_B tf'(Bo')}$$

if the red color channel clips. The device is configured to select the second, different linearization function $$Y' = \frac{Yo - w_R tf'(Ro')(a_{13}Cr - Ro') - w_G 10000 - w_B tf'(Bo')(a_{32}Cb - Bo')}{w_R tf'(Ro') + w_B tf'(Bo')}$$

if the green color channel clips and the device is configured to select the second, different linearization function $$Y' = \frac{Yo - w_R tf'(Ro')(a_{13}Cr - Ro') - w_G tf'(Go')(-a_{22}Cb - a_{23}Cr - Go') - w_B 10000}{w_R tf'(Ro') + w_G tf'(Go')}$$

if the blue color channel clips. The device is further configured to select the inverse function $$Y' = tf^{-1}\left(\frac{Yo - w_R 10000 - w_G 10000}{w_B}\right) - a_{32}Cb$$

if the red color channel and the green color channel clip, wherein $tf^{-1}(.)$ denotes the inverse of the transfer function tf(.). The device is also configured to select the inverse function $$Y' = tf^{-1}\left(\frac{Yo - w_R 10000 - w_B 10000}{w_G}\right) + a_{22}Cb + a_{23}Cr$$

if the red color channel and the blue color channel clip and select the inverse function $$Y' = tf^{-1}\left(\frac{Yo - w_G 10000 - w_B 10000}{w_R}\right) - a_{13}Cb$$

if the green color channel and the blue color channel clip.

In a particular embodiment, the device is configured to calculate Y'redclip=1-$a_{13}$Cr, Y'greenclip=1+$a_{22}$Cb+$a_{23}$Cr and Y'blueclip=1-$a_{32}$Cb. The device is further configured to check whether the luma component Y' resulting in the smallest error causes any of the red, green and blue color channel of the pixel to clip, such as clip against one, saturate or be (equal to or) exceed one, based on a smallest value of Y'redclip, Y'greenclip and Y'blueclip.

In an embodiment, the device is also configured to select a smallest value Y'firstclip=min(Y'redclip, Y'greenclip, Y'blueclip). The device is further configured to calculate Yfirstclip=$w_R$tf(Y'firstclip+$a_{13}$Cr)+$w_G$tf(Y'firstclip-$a_{22}$Cb-$a_{23}$Cr)+$w_B$tf(Y'firstclip+$a_{32}$Cb) and check whether Yo<Yfirstclip.

In another particular embodiment, the device is also configured to select a median value Y'secondclip=median(Y'redclip, Y'greenclip, Y'blueclip). The device is further configured to calculate Ysecondclip=$w_R$tf(Y'secondclip+$a_{13}$Cr)+$w_G$tf(Y'secondclip-$a_{22}$Cb-$a_{23}$Cr)+$w_B$tf(Y'secondclip+$a_{32}$Cb). The device is configured to determine that the luma component Y' resulting in the smallest error does not cause any of the red, green or blue color channel of the pixel to clip if Yo<Yfirstclip. The device is also configured to determine that the luma component Y' resulting in the smallest error causes one of the red, green and blue color channels of the pixel to clip if Yfirstclip≤Yo<Ysecondclip and determine that the luma component Y' resulting in the smallest error causes two of the red, green and blue color channels of the pixel to clip if Yo≥Ysecondclip.

In an embodiment, the device is configured to check whether a luma component Y' of the pixel resulting in a smallest error between red, green and blue color components RGB determined based on the luma component Y' and original red, green and blue color components RoGoBo of the pixel causes any of a red, green and blue color channel of the pixel to clip, such as clip against one, saturate or be (equal to or) exceed one.

In a particular embodiment, the device is configured to calculate Y'redclip=1−$a_{13}$Cr, Y'greenclip=1+$a_{22}$Cb+$a_{23}$Cr and Y'blueclip=1−$a_{32}$Cb, wherein $a_{13}$, $a_{22}$, $a_{23}$, $a_{32}$ denote positive constants of a color transformation from a Y'CbCr color to an R'G'B' color, Cb, Cr denote chroma components of the pixel. The device is also configured to calculate a first value Y'rgb of the luma component Y' as $$Y'rgb = -\frac{w_R tf'(Ro')^2(a_{13}Cr - Ro') + w_G tf'(Go')^2(-a_{22}Cb - a_{23}Cr - Go') + w_B tf'(Bo')^2(a_{32}Cb - Bo')}{w_R tf'(Ro')^2 + w_G tf'(Go')^2 + w_B tf'(Bo')^2}$$

wherein $w_R$, $w_G$, $w_B$ denote color weights, $a_{13}$, $a_{22}$, $a_{23}$, $a_{32}$ denote positive constants of a color transformation from a Y'CbCr color to an R'G'B' color, P=tf( ) wherein P=red (R), green (G) or blue (B), tf(.) is a transfer function and tf'(Po') denotes the derivative of the transfer function in Po'. The device is further configured to calculate a second value Y'one of the luma component Y' as $$Y'gb = -\frac{w_G tf'(Go')^2(-a_{22}Cb - a_{23}Cr - Go') + w_B tf'(Bo')(a_{32}Cb - Bo')}{w_G tf'(Go')^2 + w_B tf'(Bo')^2}$$

if Y'redclip=min(Y'redclip, Y'greenclip, Y'blueclip), as $$Y'rb = -\frac{w_R tf'(Ro')^2(a_{13}Cr - Ro') + w_B tf'(Bo')^2(a_{32}Cb - Bo')}{w_R tf'(Ro')^2 + w_B tf'(Bo')^2}$$

if Y'greenclip=min(Y'redclip, Y'greenclip, Y'blueclip), and as $$Y'rg = -\frac{w_R tf'(Ro')^2(a_{13}Cr - Ro') + w_G tf'(Go')^2(-a_{22}Cb - a_{23}Cr - Go')}{w_R tf'(Ro')^2 + w_G tf'(Go')^2}$$

if Y'blueclip=min(Y'redclip, Y'greenclip, Y'blueclip). The device is additionally configured to calculate a third value Y'two of the luma component Y' as $$Y'r = tf^{-1}\left(\frac{Yo - w_R 10000 - w_B 10000}{w_G}\right) + a_{22}Cb + a_{23}Cr$$

if Y'redclip=max(Y'redclip, Y'greenclip, Y'blueclip), as $$Y'g = tf^{-1}\left(\frac{Yo - w_R 10000 - w_B 10000}{w_G}\right) + a_{22}Cb + a_{23}Cr$$

if Y'greenclip=max(Y'redclip, Y'greenclip, Y'blueclip), and as $$Y'b = tf^{-1}\left(\frac{Yo - w_G 10000 - w_B 10000}{w_R}\right) - a_{13}Cb$$

if Y'blueclip=min(Y'redclip, Y'greenclip, Y'blueclip). The device is also configured to calculate a first error value errRGB(Y'rgb) $w_R$(tf(Y'rgb+$a_{13}$Cr)−Ro)$^2$+$_{w_G}$(tf(Y'rgb−$a_{22}$Cb−$a_{23}$Cr)−Go)$^2$+$w_B$(tf(Y'rgb+$a_{32}$Cb)−Bo)$^2$. The device is further configured to calculate a second error value errRGBone=$w_R$(10000−Ro)$^2$+$w_G$(tf(Y'gb−$a_{22}$Cb−$a_{23}$Cr)−Go)$^2$+$w_B$(tf(Y'gb+$a_{32}$Cb)−Bo)$^2$ if Y'redclip=min(Y'redclip, Y'greenclip, Y'blueclip), as errRGBone=$w_R$(tf(Y'rb+$a_{13}$Cr)−Ro)$^2$+$w_G$ (10000−Go)$^2$+$w_B$(tf(Y'rb+$a_{32}$Cb)−Bo)$^2$ if Y'greenclip=min(Y'redclip, Y'greenclip, Y'blueclip), and as errRGBone=$w_R$(tf(Y'rg+$a_{13}$Cr)−Ro)$^2$+$w_G$(tf(Y'rg−$a_{22}$Cb−$a_{23}$Cr)−Go)$^2$+$w_B$(10000−Bo)$^2$ if Y'blueclip=min(Y'redclip, Y'greenclip, Y'blueclip). The device is additionally configured to calculate a third error value errRGBtwo=$w_R$(tf(Y'r+$a_{13}$Cr)−Ro)$^2$+$w_G$ (10000−Go)$^2$+$w_B$(10000−Bo)$^2$ if Y'redclip=max(Y'redclip, Y'greenclip, Y'blueclip), as errRGBtwo=$w_R$(10000−Ro)$^2$+$w_G$(tf(Y'g−$a_{22}$Cb $a_{23}$Cr)−Go)$^2$+$w_B$(10000−Bo)$^2$ if Y'greenclip=max(Y'redclip, Y'greenclip, Y'blueclip), and as errRGBtwo=$w_R$(10000−Ro)$^2$+$w_G$(1000−Go)$^2$+$w_B$(tf(Y'b+$a_{32}$Cb)−Bo)$^2$ if Y'blueclip=max(Y'redclip, Y'greenclip, Y'blueclip). The device is also configured to select Y'rgb as the value of the luma component Y' if errRGB(Y'rgb)=min(errRGB(Y'rgb, errRGBone, errRGBtwo), Y'one as the value of the luma component Y' if errRGBone=min(errRGB(Y'rgb, errRGBone, errRGBtwo) and Y'two as the value of the luma component Y' if errRGBtwo=min(errRGB(Y'rgb, errRGBone, errRGBtwo).

In an embodiment, the device is configured to retrieve, from a look-up table and for each color channel of the red, green and blue color channels of the pixel using the original luminance Yo and the chroma components Cb, Cr of the pixel or quantized versions thereof as input, a bit indicating whether the luma component Y' resulting in the smallest error causes the color channel to clip, such as clip against one, saturate or be (equal to or) exceed one In an embodiment, the device is configured to calculate Y'redclipZero=−$a_{13}$Cr, Y'greenclipZero=$a_{22}$Cb+$a_{23}$Cr and Y'blueclipZero=1−$a_{32}$Cb, wherein $a_{13}$, $a_{22}$, $a_{23}$, $a_{32}$ denote positive constants of a color transformation from a Y'CbCr color to an R'G'B' color, Y' denotes a luma component of the pixel, Cb, Cr denote chroma components of the pixel. The device is also configured to check whether a luma component Y' of the pixel resulting in a smallest error between i) a luminance Y determined based on the luma component Y' and an original luminance Yo determined based on original red, green and blue color components RoGoBo of the pixel or ii) red, green and blue color components RGB determined based on the luma component Y' and the original red, green and blue color components RoGoBo of the pixel causes any of a red, green and blue color channel of the pixel to clip against zero, such as be (equal to or) smaller than zero based on at least one of Y'redclipZero=$-a_{13}$Cr, Y'greenclipZero=$a_{22}$Cb+$a_{23}$Cr and Y'blueclipZero=$1-a_{32}$Cb.

In another embodiment, the device is configured to retrieve the value of the color component in the color space from a first look-up table if the color component in the color space does not cause any color channel of the pixel to fall outside of the allowed range. The device is also configured to retrieve the value of the color component in the color space from a second, different look-up table if the color component in the color space causes any color channel of the pixel to fall outside of the allowed range.

In a particular embodiment, the device is also configured to select the second, different look-up table depending on which color channel or color channels of the pixel that falls or fall outside of the allowed range. The device is further configured to retrieve the value of the color component in the color space from the selected second, different look-up table.

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 14:
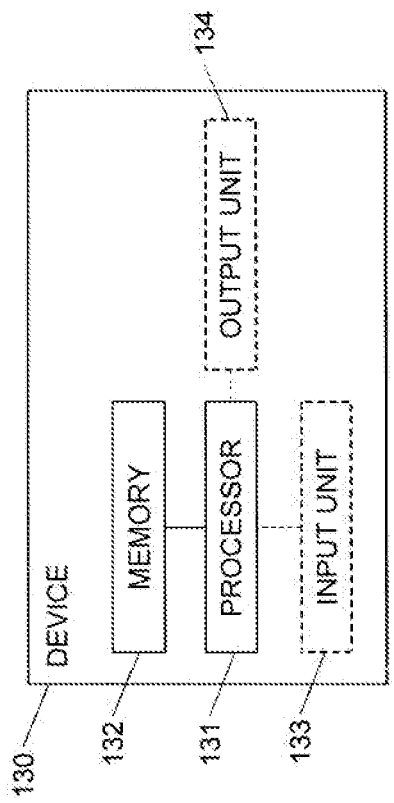
FIG. 14 is schematic block diagram of a device for processing a pixel according to an embodiment.

FIG. 14 is a schematic block diagram illustrating an example of a device 130 for processing a pixel, based on a processor-memory implementation according to an embodiment. In this particular example, the device 130 comprises a processor 131 and a memory 132. The memory 132 comprises instructions executable by the processor 131.

The processor 131 is thereby operative to check whether the color component in the color space resulting in the smallest error causes any color channel of the pixel to fall outside of the allowed range. The processor 131 is also operative to obtain the value of the color component in the color space using the first function or the first look-up table if the color component in the color space resulting in the smallest error does not cause any color channel of the pixel to fall outside of the allowed range. The processor 131 is further operative to obtain the value of the color component in the color space using the second, different function or the second, different look-up table if the color component in the color space resulting in the smallest error causes any color channel of the pixel to fall outside of the allowed range.

Optionally, the device 130 may also include a communication circuit, such as implemented in the form of an input unit 133 and an output unit 134. The input and output units 133, 134 may include functions for wired and/or wireless communication with other devices and/or network nodes in a wired or wireless communication network. In a particular example, the input and output units 133, 134 may be based on radio circuitry for communication with one or more other nodes, including transmitting and/or receiving information. In another embodiment, the input and output units 133, 134 may be based on circuitry for wired communication with one or more other devices or nodes. The input and output units 133, 134 may be interconnected to the processor 131 and/or memory 132. By way of example, the input and output units 133, 134 may include any of the following: a receiver, a transmitter, a transceiver, input/output (I/O) circuitry, input port(s) and/or output port(s).

In a particular example, the device 130 comprises a processor 131 and a memory 132 comprising instructions executable by the processor 131. In an embodiment, the processor 131 is operative to determine a modified color Y' component in a second color space using a first function, check whether this Y' component will generate clipping, and if the Y' component will generate clipping, the processor 131 is operative to determine a modified color Y' component in the second color space using a second function.

In an embodiment, the device 130 also comprises an input unit 133 configured to receive the video to be encoded. In such a case, the processor 131 is operative to receive the video to be encoded from the input unit 133.

In an embodiment, the device 130 also comprises an output unit 134 configured to output an encoded bitstream as received from the processor 131.

In a particular embodiment, the processor 131 is operative, when executing the instructions stored in the memory 132 to perform the above described operations. The processor 131 is thereby interconnected to the memory 132 to enable normal software execution.

Figure 15:
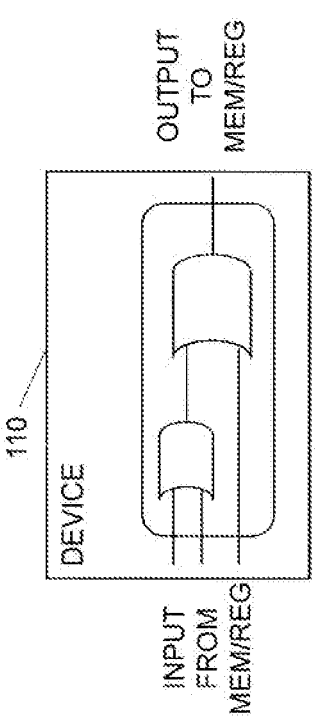
FIG. 15 is schematic block diagram of a device for processing a pixel according to another embodiment.

FIG. 15 is a schematic block diagram illustrating another example of a device 110 for processing a pixel, based on a hardware circuitry implementation according to an embodiment. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 16:
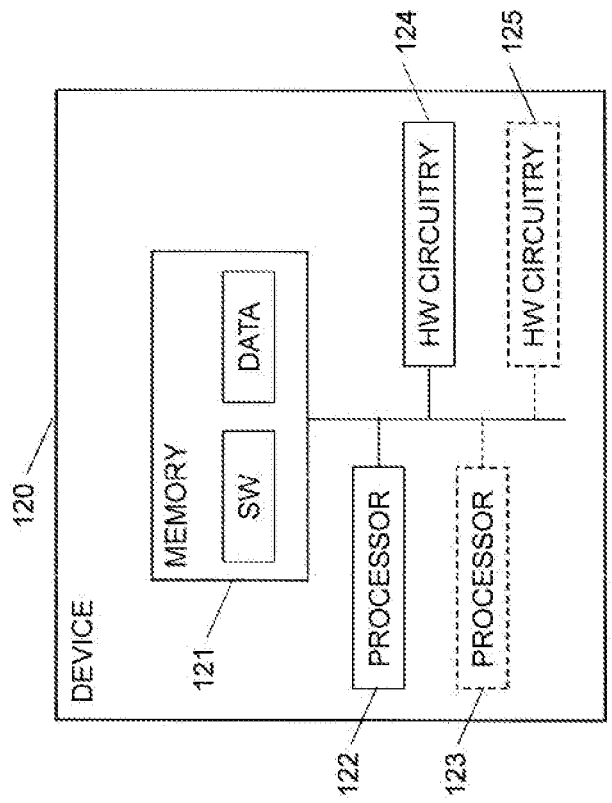
FIG. 16 is schematic block diagram of a device for processing a pixel according to a further embodiment.

FIG. 16 is a schematic block diagram illustrating yet another example of a device 120 for processing a pixel, based on combination of both processor(s) 122, 123 and hardware circuitry 124, 125 in connection with suitable memory unit(s) 121. The device 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more pre-configured or possibly reconfigurable hardware circuits 124, 125. The actual hardware-software partitioning can be decided by a system designer based on a number of factors including processing speed, cost of implementation and other requirements.

Figure 17:
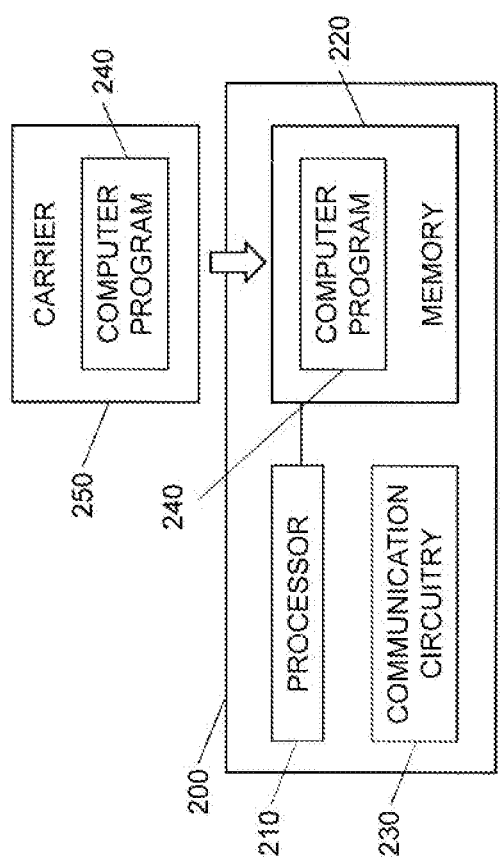
FIG. 17 is a schematic block diagram illustrating an example of a user equipment according to an embodiment.

FIG. 17 is a schematic diagram illustrating an example of a computer-implementation of 200 according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional communication circuitry 230 may also be interconnected to the processor(s) 210 and/or the memory 220 to enable input and/or output of relevant data such as video sequences and encoded video sequences.

In an embodiment, FIG. 17 represents a user equipment 200. The user equipment 200 can be any device or apparatus that can receive and process video data. For instance, the user equipment 200 could be a computer, either stationary or portable, such as laptop, a smart phone, a tablet, a set-top box, a video camera, etc.

The term 'processor' should be interpreted in a general sense as any system or device capable of executing program code or computer program instructions to perform a particular processing, determining or computing task.

The processing circuitry including one or more processors 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In a particular embodiment, the computer program 240 comprises instructions, which when executed by at least one processor 210, cause the at least one processor 210 to check whether a color component of the pixel in a color space resulting in a smallest error between at least one color component in another color space determined based on the color component in the color space and at least one original color component of the pixel in the another color space causes any color channel of the pixel to fall outside of an allowed range. The at least one processor 210 is also caused to obtain a value of the color component in the color space using a first function or a first look-up table if the color component in the color space resulting in the smallest error does not cause any color channel of the pixel to fall outside of the allowed range. The at least one processor 210 is further caused to obtain a value of the color component in the color space using a second, different function or a second, different look-up table if the color component in the color space resulting in the smallest error causes any color channel of the pixel to fall outside of the allowed range.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 may be realized as a computer program product, which is normally carried or stored on a computer-readable medium 250, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may thus be loaded into the operating memory 220 of a computer or equivalent processing device 200 for execution by the processing circuitry 210 thereof.

The flow diagram or diagrams presented herein may be regarded as a computer flow diagram or diagrams, when performed by one or more processors. A corresponding device for processing a pixel may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 18:
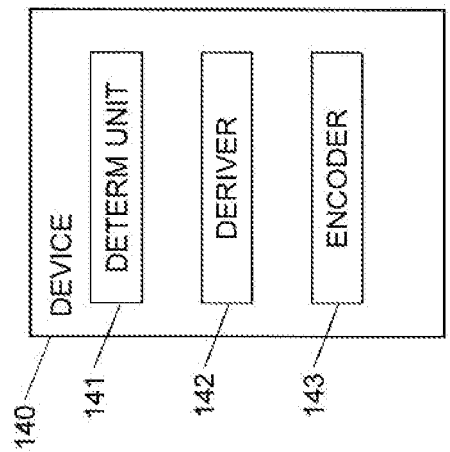
FIG. 18 is schematic block diagram of a device for processing a pixel according to yet another embodiment.

FIG. 18 is a schematic diagram illustrating an example of a device 140 for processing a pixel comprising. The device 140 comprises a determining unit 141 for determining whether a color component of the pixel in a color space resulting in a smallest error between at least one color component in another color space determined based on the color component in the color space and at least one original color component of the pixel in the another color space causes any color channel of the pixel to fall outside of an allowed range. The device 140 also comprises a value deriver 142 for deriving value of the color component in the color space using i) a first function or a first look-up table if the color component in the color space resulting in the smallest error does not cause any color channel of the pixel to fall outside of the allowed range and ii) a second, different function or a second, different look-up table if the color component in the color space resulting in the smallest error causes any color channel of the pixel to fall outside of the allowed range.

In an optional embodiment, the device 140 also comprises an encoder 143 for encoding the value of a luma component as preferred example of color component of the pixel in a color space and for encoding values of subsampled chroma components.

According to a second aspect a processor for processing a pixel in a picture is provided, wherein the pixel can be represented by color components in a first color space, e.g., R',G',B', color components in a second color space, e.g., Y',Cb,Cr, and color components in a third color space, e.g., Y',Cb,Cr or X,Y,Z, and wherein the color components of the different color spaces can be transferred between each other by color transformation functions. The processor is operative to determine a modified color Y' component in a second color space using a first function. The processor is also operative to check whether this Y' component will generate clipping. The processor is further operative to, if the Y' component will generate clipping, determine a modified color Y' component in the second color space using a second function.

The processor may also comprise modules, such as a module configured to determine a modified color Y' component in a second color space using a first function, a module configured to check whether this Y' component will generate clipping, and a module configured to, if the Y' component will generate clipping, determine a modified color Y' component in the second color space using a second function.

Figure 19:
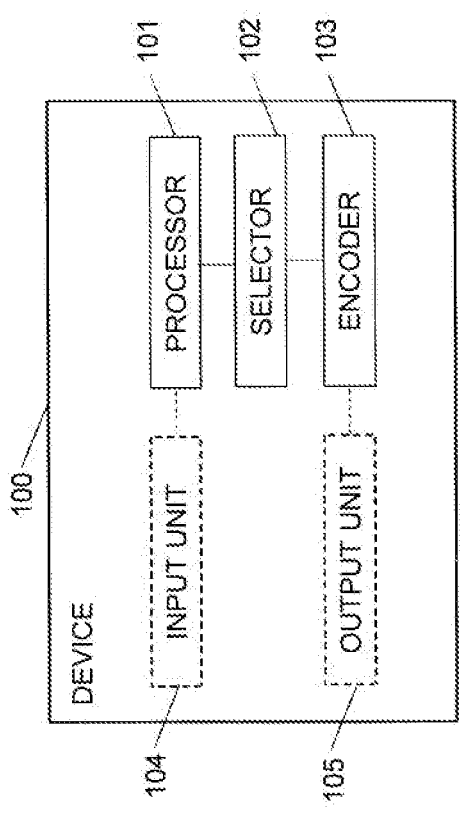
FIG. 19 is schematic block diagram of a device for processing a pixel according to a further embodiment.

FIG. 19 illustrates a particular hardware implementation of a device 100 comprising a processor 101 of processing a pixel in a picture is provided, wherein the pixel can be represented by color components in a first color space, e.g., R',G',B', color components in a second color space, e.g., Y',Cb,Cr, and color components in a third color space, e.g., Y,Cb,Cr or X,Y,Z, and wherein the color components of the different color spaces can be transferred between each other by color transformation functions. The processor 101 is operative to determine a modified color Y' component in a second color space using a first function. The processor 101 is also operative to check whether this Y' component will generate clipping. The processor 101 is further operative to, if the Y' component will generate clipping, determine a modified color Y'component in the second color space using a second function.

The device 100 comprises, hence, the processor 101 and one or more units, represented by a selector 102 in the figure, for determining a modified color Y' component in a second color space using a first function, checking whether this Y' component will generate clipping, and if the Y' component will generate clipping, the one or more units determine a modified color Y' component in the second color space using a second function.

In an optional embodiment, the device 100 also comprises a video encoder 103 for encoding the modified color Y' component and for encoding values of subsampled chroma components.

In an embodiment, the device 100 also comprises an input unit 104 configured to receive the video to be encoded and an output unit 105 configured to output an encoded bitstream.

The input unit 104 could be in the form of a general input unit such as an input interface circuit or other wired connection to external devices. Alternatively, the input unit 104 could be in the form of a receiver or transceiver, in particular in the case or a wireless connection to external devices. Correspondingly, the output unit 105 could be in the form of a general output unit such an output interface circuit or other wired connection to external devices. Alternatively, the output unit 105 could be in the form of a transmitter or transceiver, in particular in the case or a wireless connection to external devices The input unit 104 is preferably connected to the processor 101 and/or the selector 102. The processor 101 is preferably connected to the selector 102 and the video encoder 103. The video encoder 103 is preferably connected to the output unit 105 to forward the encoded bitstream to, for instance, a decoder.

It is becoming increasingly popular to provide computing services (hardware and/or software) in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources such as networks, servers, storage, applications and general or customized services.

Figure 20:
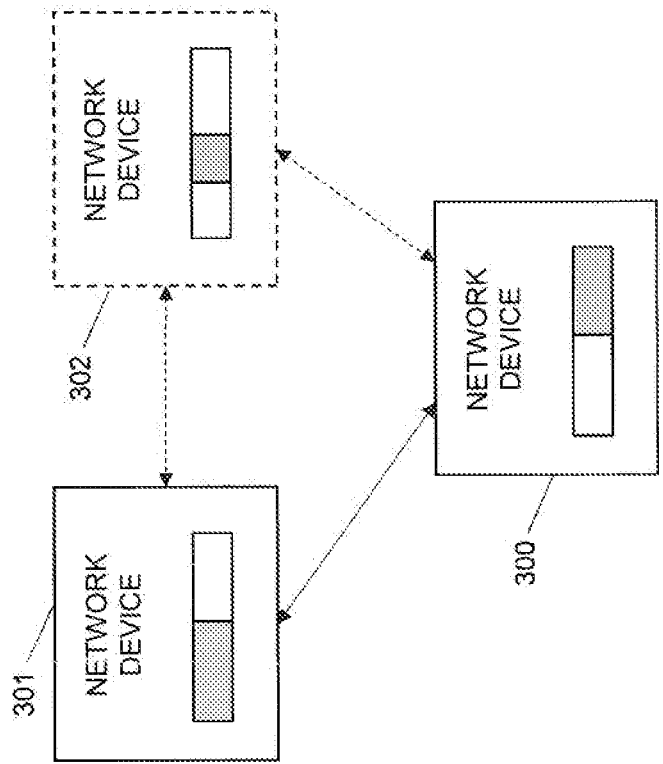
FIG. 20 schematically illustrates a distributed implementation among multiple network devices.

FIG. 20 is a schematic diagram illustrating an example of how functionality can be distributed or partitioned between different network devices in a general case. In this example, there are at least two individual, but interconnected network devices 300, 301, which may have different functionalities, or parts of the same functionality, partitioned between the network devices 300, 301. There may be additional network devices 302 being part of such a distributed implementation. The network devices 300, 301, 302 may be part of the same wireless communication system, or one or more of the network devices may be so-called cloud-based network devices located outside of the wireless communication system.

Figure 21:
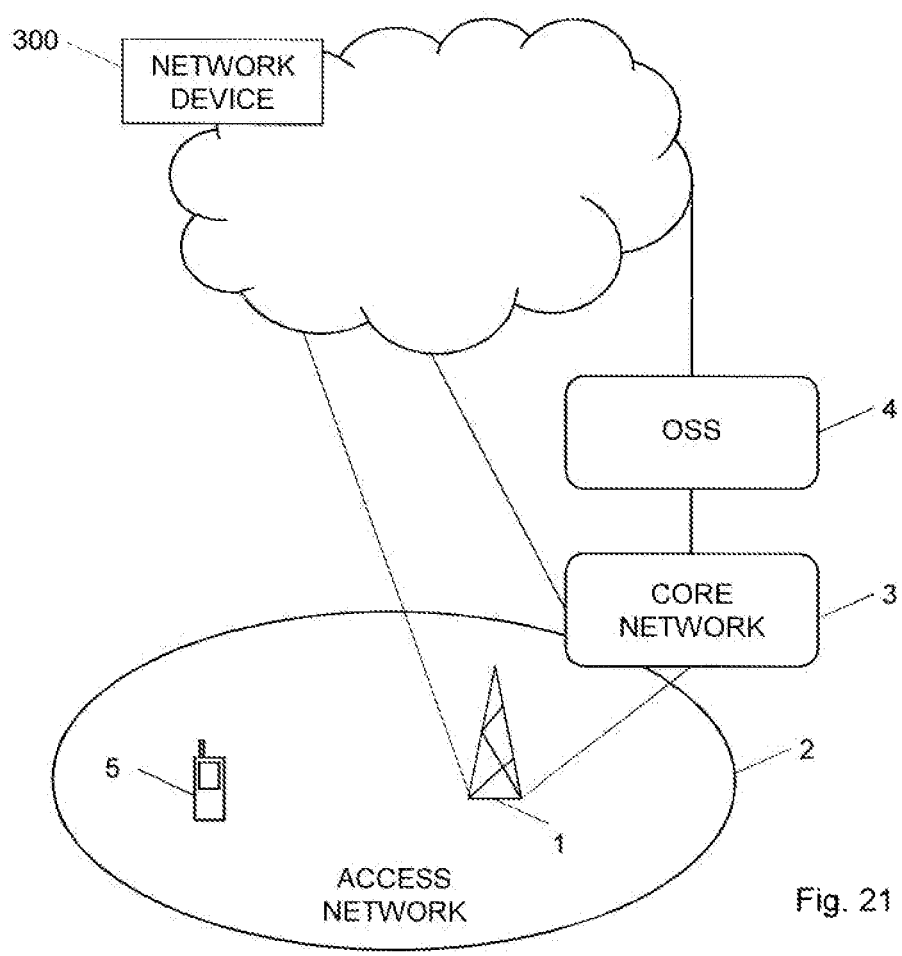
FIG. 21 is a schematic illustration of an example of a wireless communication system with one or more cloud-based network devices according to an embodiment.

FIG. 21 is a schematic diagram illustrating an example of a wireless communication network or system, including an access network 2 and/or a core network 3 and/or an operations and support system (OSS), 4 in cooperation with one or more cloud-based network devices 300. The figure also illustrates a user device 5 connected to the access network 2 and capable of conducting wireless communication with a base station representing an embodiment of a wireless communication device 1.

Annex A—Ajusty

Pixel Pre-Processing and Encoding

TECHNICAL FIELD

The present embodiments generally relate to pre-processing and encoding of pixels in a picture, and in particular to such pre-processing and encoding that improves luminance values of pixels.

BACKGROUND

In a digital video signal, each sample, i.e., pixel component, is represented by an integer or floating point value. A display, such as screen, TV or monitor, that renders the video omits optical lights based on the digital values of the video signal. The function that translates the digital value V to optical light Y is the Electro-Optical-Transfer-Function (EOTF). Traditionally the EOTF has been expressed as an exponential function called a gamma function where the gamma γ is the exponent value. This is typically 2.4 (but can also be other values): $Y=V^\gamma$.

Using a gamma function works well for low luminance signals but when the luminance goes above 100 nits (cd/m²) the gamma function is not well aligned with the contrast sensitivity of the human visual system. Therefore transfer functions that are more non-linear are defined, e.g.:

$$Y = L_p \left( \frac{\max[(V^{1/m-c_1}), 0]}{c_2 - c_3 V^{1/m}} \right)^{1/n} \quad [A1]$$

$$n = \frac{2610}{4096} \times \frac{1}{4} \approx 0.15930176$$

$$m = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

$$L_p = 10000 \frac{cd}{m^2}$$

This transfer function is more non-linear than the gamma function in the sense that the maximum value of its first derivative over the range from 0 to 1 is larger than that of the gamma function.

Chroma subsampling is typically done before compression as an initial step to reduce the amount of data. In 4:2:2 the chroma signal is reduced to half the resolution in the vertical direction. In 4:2:0 the chroma signal is reduced to half the resolution in both the vertical direction and the horizontal direction. This is typically done with some filtering operation to get a good quality signal but can also be done using nearest neighbor.

In order to display a 4:2:0 or 4:2:2 video, a decoder performs upsampling of the chroma signal, which can be done using bilinear filters or longer filters.

However, a combination of a highly non-linear transfer function, 4:2:0 or 4:2:2 subsampling and non-constant luminance ordering gives rise to severe artifacts to the video data, in particular for saturated colors, i.e., colors close to the color gamut edge.

There are several ways to get around this problem. One ways is to not use 4:2:0 or 4:2:2 subsampling, but use 4:4:4 instead. That, however, is expensive, since 4:2:0 halves the number of bits prior to compression, whereas 4:2:2 reduces the number of bits to two-thirds. Another way is to not use a highly non-linear transfer function. However, that means that it is hard to represent content of very high peak brightness without having banding in dark regions. A third way is to use constant luminance, i.e., apply the transfer function after conversion to the CIE1931 XYZ color space. However, such a solution is not aligned with common practice within the broadcasting industry and might in some scenarios be difficult and expensive to realize.

Summary of Embodiments Shown in Annex A

It is a general objective to provide a pre-processing of pixels to combat artifacts.

These and other objectives are met by embodiments as disclosed herein.

An aspect of the embodiments relates to a method of pre-processing a pixel in a picture. The method comprises obtaining an original linear luminance component value of the pixel in a third color space determined based on a linear color of the pixel in a first color space. The method also comprises deriving a non-linear luma component value in a second color space for the pixel based on a first non-linear chroma component value in the second color space, a second non-linear chroma component value in the second color space and the original linear luminance component value in the third color space.

Another aspect of the embodiments relates to a device for pre-processing a pixel in a picture. The device is configured to obtain an original linear luminance component value of the pixel in a third color space determined based on a linear color of the pixel in a first color space. The device is also configured to derive a non-linear luma component value in a second color space for the pixel based on a first non-linear chroma component value in the second color space, a second non-linear chroma component value in the second color space and the original linear luminance component value in the third color space.

A related aspect of the embodiments defines a device for pre-processing a pixel in a picture. The device comprises a determining unit for obtaining an original linear luminance component value of the pixel in a third color space determined based on a linear color of the pixel in a first color space. The device also comprises a deriver for deriving a non-linear luma component value in a second color space for the pixel based on a first non-linear chroma component value in the second color space, a second non-linear chroma component value in the second color space and the original linear luminance component value in the third color space.

A further aspect of the embodiments relates to a device for encoding a pixel in a picture. The device comprises a processor and a memory comprising instructions executable by the processor. The processor is operative to obtain an original linear luminance component value of the pixel in a third color space determined based on a linear color of the pixel in a first color space. The processor is also operative to derive a non-linear luma component value in a second color space for the pixel based on a first non-linear chroma component value in the second color space, a second non-linear chroma component value in the second color space and the original linear luminance component value in the third color space. The processor is further operative to encode the non-linear luma component value, the first non-linear chroma component value and the second non-linear chroma component value.

A related aspect of the embodiments defines a device for encoding a pixel in a picture. The device comprises a determining unit for obtaining an original linear luminance component value of the pixel in a third color space determined based on a linear color of the pixel in a first color space. The device also comprises a deriver for deriving a non-linear luma component value in a second color space for the pixel based on a first non-linear chroma component value in the second color space, a second non-linear chroma component value in the second color space and the original linear luminance component value in the third color space. The device further comprises an encoder for encoding the non-linear luma component value, the first non-linear chroma component value and the second non-linear chroma component value.

Yet another aspect of the embodiments relates to a computer program comprising instructions, which when executed by a processor, cause the processor to obtain an original linear luminance component value of a pixel in a picture in a third color space determined based on a linear color of the pixel in a first color space. The processor is also caused to derive a non-linear luma component value in a second color space for the pixel based on a first non-linear chroma component value in the second color space, a second non-linear chroma component value in the second color space and the original linear luminance component value in the third color space.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

A further aspect of the embodiments relates to a signal representing an encoded version of a pixel in a picture. The encoded version comprises an encoded version of a subsampled first non-linear chroma component value in a second color format, an encoded version of a subsampled second non-linear chroma component value in the second color space and an encoded version of a non-linear luma component value in the second color format derived according to above.

The present embodiments provide a pixel pre-processing and encoding that combats artifacts that otherwise may occur due to usage of a non-linear transfer function in combination with chroma subsampling. Subjectively, the quality improvement in luminance is clearly visible even for uncompressed video.

Example Embodiments of the Present Disclosure

A traditional compression chain involves feeding pixels of incoming linear light, typically ranging from 0 to 10,000 cd/m$^2$, to an inverse transfer function, which results in new pixel values between 0 and 1. After this, the pixels undergo color transform resulting in a luma component and two chroma components. Then the two chroma components are subsampled, such as to 4:2:0 or 4:2:2. After decompression, the 4:2:0 or 4:2:2 sequences are upsampled to 4:4:4, inverse color transformed and finally a transfer function gives back pixels of linear light that can be output on a monitor.

A combination of a highly non-linear transfer function, chroma subsampling and non-constant luminance ordering gives rise to severe artifacts to the video data, in particular for saturated colors. The trouble comes from the fact that the chroma components are interpolated, whereas the luma component is not. Hence, there can be sharp shift in the luma component in a pixel but the chroma components cannot follow since they are interpolated. For some colors, especially saturated colors, the result is a pixel of completely wrong intensity, which is clearly visible as an artifact.

The pre-processing of pixels according to the embodiments can be used to combat or at least reduce the impact of artifacts, thereby resulting in a color that is closer to the incoming "true" color of a pixel.

A color space or color format is the type and number of colors that originate from the combinations of color components of a color model. A color model is an abstract configuration describing the way colors can be represented as tuples of numbers, i.e., color components. The color components have several distinguishing features such as the component type, e.g., hue, and its unit, e.g., degrees or percentage, or the type of scale, e.g., linear or non-linear, and its intended number of values referred to as the color depth or bit depth.

Non-limiting, but illustrative, color spaces that are commonly used for pixels in pictures and videos include the red, green, blue (RGB) color space, the luma, chroma blue and chroma red (YCbCr, sometimes denoted Y'CbCr, Y'Cb'Cr, YCBCR, Y'CBCR or Y'CB'CR') color space and the luminance and chrominances (XYZ) color space.

Figure 22:
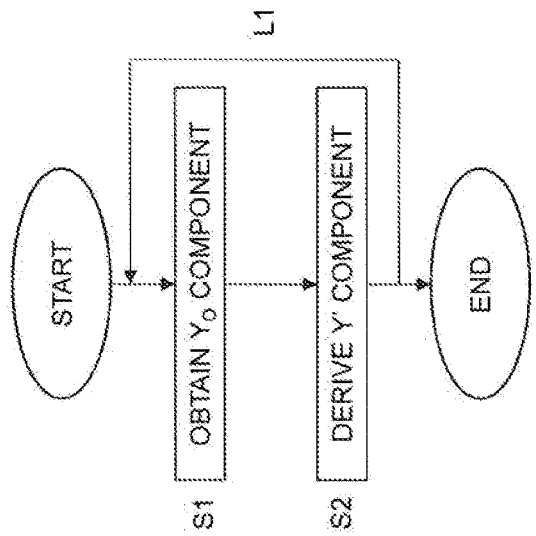
FIG. 22 is a flow chart illustrating a method of pre-processing a pixel according to AJUSTY.

FIG. 22 is a flow chart illustrating a method of pre-processing a pixel in a picture. The method comprises obtaining, in step S1, an original linear luminance component value of the pixel in a third color space determined based on a linear color of the pixel in a first color space. The method then continues to step S2, which comprises deriving a non-linear luma component value in a second color space for the pixel based on a first non-linear chroma component value in the second color space, a second non-linear chroma component value in the second color space and the original linear luminance component value in the third color space.

The pixel pre-processing in FIG. 22 employs two non-linear chroma components in the second color space. The two non-linear chroma components in the second color space could be a subsampled first non-linear chroma component value in the second color space and a subsampled second non-linear chroma component value in the second color space. In a particular embodiment, these two non-linear chroma components are the Cb' and Cr' components. More preferably, the non-linear chroma components are Cb' and Cr' components in the 4:2:0 or 4:2:2 format. Accordingly, the second color space is, in this embodiment, the YCbCr color space. The apostrophe "'" is used to indicate that the two chroma components are non-linear chroma components.

In such a case, step S2 of FIG. 22 preferably comprises deriving the non-linear luma component value in the second color space based on a subsampled first non-linear chroma component value in the second color space, a subsampled second non-linear chroma component value in the second color space and the original linear luminance component value in the third color space.

In an alternative embodiment, the two non-linear chroma component values in the second color space do not necessarily have to be subsampled but could rather be in the form of non-sampled non-linear chroma component values in the second color space or upsampled non-linear chroma component values in the second color space. In the latter case, the upsampled non-linear chroma component values are obtained following upsampling of the subsampled non-linear chroma component valuess in the second color space. In this alternative embodiment, the non-linear chroma components are Cb' and Cr' components in the 4:4:4 format.

In an embodiment, the first and second non-linear chroma component values in the second color space of the pixel are obtained based on the linear color of the pixel in the first color space. In a particular embodiment, this first linear color space is the RGB color space. Accordingly, the linear color of the pixel in the first color space is, in this particular embodiment, a RGB color of the pixel.

In an embodiment, the third color space mentioned above is the XYZ color space. Accordingly, the linear luminance of the pixel in the third color space is, in this embodiment, a Y component.

The pre-processing in FIG. 22, thus, obtains or provides an original linear luminance component value of the pixel in the third color space determined based on a linear color of the pixel in the first color space. This original linear luminance component value preferably reflects the true luminance of the pixel, i.e., the original luminance of the pixel prior to any color transformation, application of transfer functions and subsampling. This original linear luminance component value is determined based on the linear color of the pixel in the first color space. In an embodiment, this linear color of the pixel in the first color space is the original incoming color of the pixel. In a particular embodiment, this original incoming color is denoted $R_O G_O B_O$ herein and the original linear luminance component is denoted $Y_O$.

The original linear luminance is, thus, the target luminance which could be calculated in many different ways. This original linear luminance does not necessarily have to correspond directly to the actual luminance of the sensor in the camera taking a picture or recording a video or in the panel of the display.

The original linear luminance component value in the third color space could be obtained to the pre-processing and encoding functionality as an original linear luminance component value, preferably Yo value, in a pre-determined or pre-calculated form. This means that the determination of the original linear luminance component value based on the linear color in the first color space has already taken place and only the result of the determination is provided to the pre-processing and encoding functionality.

In an alternative embodiment, the pre-processing of the embodiments comprises determination or calculation of the original linear luminance component value. In such an embodiment, step S1 of FIG. 22 preferably comprises determining the original linear luminance component value in the third color space based on the linear color in the first color space.

The non-linear luma component value in the second color space is then derived for the pixel in step S2 based on the first and second non-linear chroma component values in the second color space and the original linear luminance component value in the third color space. Hence, in an embodiment, the non-linear luma component Y' in the YCbCr color space is a function of the Cb' and Cr' components in the YCbCr color space and the $Y_O$ component in the XYZ color space, i.e., Y'=f(Cb', Cr', $Y_O$). The $Y_O$ component is in turn determined based on the $R_OG_OB_O$ color of the pixel in the RGB color space, i.e., $Y_O$=g($R_O$, $G_O$, $B_O$). Accordingly, Y'=f(Cb', Cr', g($R_O$, $G_O$, $B_O$)).

The pre-processed pixel is then represented by the derived non-linear luma component (Y') and the two subsampled non-linear chroma components (Cb', Cr') in the second color space, i.e., Y'Cb'Cr. Thus, the tuple Y'Cb'Cr' represents the pre-processed color of the pixel, preferably in the 4:2:0 or 4:2:2 format, i.e., with subsampled chroma components but non-subsampled luma component.

In an embodiment, step S2 of FIG. 22 comprises deriving a non-linear luma component value in the second color space that minimizes a difference between the original linear luminance component value in the third color space and a linear luminance component value in the third color space determined based on the non-linear luma component value in the second color space, the first non-linear chroma component value in the second color space and the second non-linear chroma component value in the second color space.

Hence, in this embodiment, step S2 involves finding the non-linear luma component (Y') value in the second color space (YCbCr) that minimizes the difference between the original linear luminance component ($Y_O$) value and the linear luminance component (Y) value in the third color space (XYZ). This linear luminance component (Y) value in third color space (XYZ) is in turn obtained based on the non-linear luma component (Y') value and the two non-linear chroma component (Cb', Cr') values in the second color space (YCbCr).

Thus, this embodiment involves finding the Y' component value that minimizes the difference $|Y_O-Y|$ or $(Y_O-Y)^2$, wherein Y=h(Y', Cb', Cr') and h(.) defines that Y is determined based on Y', Cb' and Cr'.

In an alternative but related embodiment, step S2 involves deriving a non-linear luma component value in the second color space that minimizes a difference between a function of the original luminance component value in the third color space and a function of a linear luminance component value in the third color space. This linear luminance component value in the third color space is determined based on the non-linear luma component value in the second color space, the first non-linear chroma component value in the second color space and the second non-linear chroma component value in the second color space.

Thus, this embodiment involves finding the Y' component value that minimizes the difference $|k(Y_O)-k(Y)|$ or $(k(Y_O)-k(Y))^2$, wherein Y=h(Y', Cb', Cr').

The function (k(.)) is preferably an inverse transfer function, such as the inverse of the transfer function [A1].

The method steps S1 and S2 of FIG. 22 are performed for at least one pixel in a picture, such as of a video sequence. In an embodiment, steps S1 and S2 are preferably performed for multiple, i.e., at least two, pixels in the pictures, which is schematically indicated by the line L1. In a particular embodiment, steps S1 and S2 are performed for all pixels in the picture.

In another particular embodiment, steps S1 and S2 are performed for those pixels in the picture that result in a visual artifact as previously described herein. These pixels could be identified by comparing the original linear luminance component ($Y_O$) value in the third color space for the pixel with a linear luminance component (Y) value in the third color space determined for the pixel based on non-linear luma and chroma component (Y', Cb', Cr') values in the second color format and where these non-linear luma and chroma component values are derived according to the typical compression chain without any pre-processing according to the invention. In this latter embodiment, the pre-processing of the embodiments is thereby only applied to those pixels in a picture at which the typical compression chain results in an error in the luma component.

Alternatively, the pixels in the picture that result in visual artifacts could be identified by comparing the Cb' and Cb component values and/or the Cr' and Cr component values, i.e., the upsampled Cb' and/or Cr' component value with the corresponding Cb and/or Cr' component value obtained by applying the first color transform to the R'G'B' color, where R', G' and B' are obtained by applying the inverse transfer function to Ro, Go and Bo, respectively, of the original $R_OG_OB_O$ color.

A further variant is to perform steps S1 and S2 for those pixels that have saturated colors, i.e., colors at or close to the gamut edge.

Figure 23:
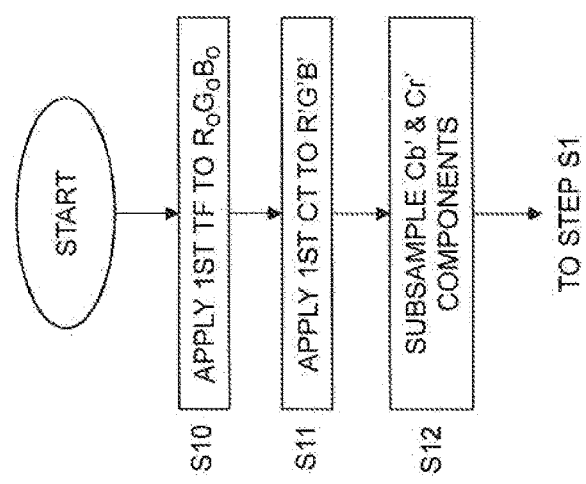
FIG. 23 is a flow chart illustrating additional, optional steps of the method shown in FIG. 22.

FIG. 23 is a flow chart illustrating additional, optional steps of the method shown in FIG. 22. The steps of FIG. 23 illustrate the typical processing chain used to derive the subsampled non-linear chroma component values in the second color space based on the linear color in the first color space. The method starts in step S10, which comprises applying a first transfer function to the linear color in the first color space to get a non-linear color in the first color space. A next step S11 comprises applying a first color transform to the non-linear color in the first color space to get a non-linear color in the second color space. The non-linear color in the second color space comprises an initial first non-linear chroma component value and an initial second non-linear chroma component value. The following step S12 comprises subsampling the initial first non-linear chroma component value in the second color space and the initial second non-linear chroma component value in the second color space to get the subsampled first non-linear chroma component value in the second color space and the subsampled second non-linear chroma component value in the second color space. The method then continues to step S1 in FIG. 22.

In an embodiment of the typical processing chain of FIG. 23, a first transfer function, such as the inverse of the transfer function [A1], is applied to the $R_OG_OB_O$ color of the pixel, i.e., the original color of the pixel, to get a non-linear color R'G'B' in the RGB color space. This R'G'B' color is then color transformed from the RGB color space to the YCbCr color space using a first color transform, such as the color transform:

$Y=0.299R+0.587G+0.114B$ $Cb=-0.168736R-0.331264G+0.5B$ $Cr=0.5R-0.418688G-0.081312B$

The resulting Y'Cb'Cr' color of the pixel following the application of the first color transform in step S11 is a non-compressed Y'Cb'Cr' color, i.e., in the 4:4:4 format. The following step S12 subsamples the two chroma components Cb' and Cr' to get a color in the 4:2:0 or 4:2:2 format, i.e., with subsampled non-linear chroma components Cb' and Cr'.

Subsampling in step S12 can be performed according to known subsampling techniques. For instance, a filtering operation or a nearest neighbor operation can be used. An example of subsampling technique that can be used according to the embodiments is disclosed in section B.1.5.5 Chroma downsampling from 4:4:4 to 4:2:0 in document [A4].

Figure 24:
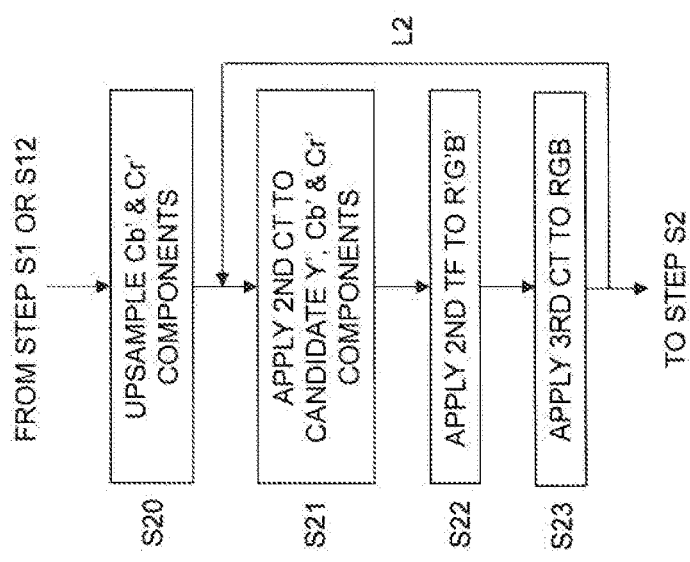
FIG. 24 is a flow chart illustrating additional, optional steps of the method shown in FIG. 22.

FIG. 24 is a flow chart illustrating additional, optional steps of the method shown in FIG. 22. These steps illustrate additional processing in order to derive an optimal non-linear luma component value for a pixel in a picture. The method continues from step S1 in FIG. 22 or step S12 in FIG. 23. The method continues by upsampling the subsampled first non-linear chroma component value in the second color space and the subsampled second non-linear chroma component value in the second color space to get an upsampled first non-linear chroma component value in the second color space and an upsampled second non-linear chroma component value in the second color space in step S20. A next step S21 comprises applying a second color transform to a candidate non-linear luma component value in the second color space, the upsampled first non-linear chroma component value in the second color space and the upsampled second non-linear chroma component value in the second color space to get a non-linear color in the first color space. The next step S22 comprises applying a second transfer function to the non-linear color in the second color space to get a linear color in the first color space. Finally, a third color transform is applied in step S23 to the linear color in the first color space to get a linear luminance component value in the third color space. The method then continues to step S2 in FIG. 22, which comprises deriving the non-linear luma component value based on a comparison of the original linear luminance component value in the third color space and the linear luminance component value in the third color space.

Thus, in an embodiment, the subsampled Cb' and Cr' component values in 4:2:0 or 4:2:2 format are first upsampled to the 4:4:4 format. Upsampling in step S20 can be performed according to known upsampling techniques. For instance, upsampling could be performed by using bilinear or longer filters. An example of upsampling technique that can be used according to the embodiments is disclosed in section B.1.5.6 Chroma upsampling from 4:2:0 to 4:4:4 (Y'CbCr domain) in document [A4].

These two upsampled Cb' and Cr' component values are then input together with a candidate Y' component value into a second color transform to get a non-linear R'G'B' color, such as the color transform:

$$R'=Y'+a13Cr'$$

$$G'=Y-a22b'-a23Cr'$$

$$B'=Y+a32Cb'$$

For Rec.709 color space a13=1.57480, a22=0.18732, a23=0.46812, a32=1.85560 and for BT.2020 color space a13=1.47460, a22=0.16455, a23=0.57135, a32=1.88140.

Generally, R', G' and B' can assume values within the interval [0, 1]. Accordingly, the second color transform may also include a clamping or clipping operation, such as R'=clip(Y'+a13Cr', 0, 1) for the R' component, wherein clip(x, a, b) is equal to a if x<a and equal to b if x>b and otherwise equal to x.

This R'G'B' color is then input into a second transfer function, such as the transfer function [A1], to get a linear RGB color. This RGB color is then transformed from the RGB color space to the XYZ color space using a third color transform, such as the color transform:

$$X=0.636958R+0.144617G+0.168881B$$

$$Y=0.262700R+0.677998G+0.059302B$$

$$Z=0.000000R+0.028073G+1.060985B$$

The linear luminance component Y value output form the third color transform is then compared to the original linear luminance component $Y_O$ value of the pixel in step S2.

In an embodiment, step S2 of FIG. 22 comprises selecting a candidate non-linear luma component value in the second color space that reduces a difference between the original linear luminance component value in the third color space and the linear luminance component value in the third color space.

Thus, step S2 preferably comprises selecting a candidate non-linear luma component value in the second color space that leads to at least a reduction in the difference between the original linear luminance component value and the linear luminance component value obtained in step S23. In a particular embodiment, step S2 comprises selecting a candidate non-linear luma component value in the second color space that minimizes the difference between the original luminance component value and the linear luminance component value in the third color space.

This difference could, as mentioned in the foregoing, be represented as $|Y_O-Y|$ or $(Y_O-Y)^2$, wherein Y is obtained in step S23 of FIG. 24.

In an alternative but related embodiment, step S2 involves selecting a candidate non-linear luma component value in the second color space that reduces or, preferably, minimizes a difference between a function of the original luminance component value in the third color space and a function of the linear luminance component value in the third color space, i.e., selecting the candidate Y' component value that minimizes the difference $|k(Y_O)-k(Y)|$ or $(k(Y_O)-k(Y))^2$.

In an embodiment, steps S21 to S23 in FIG. 24 are performed for different candidate non-linear luma component values in the second color space, which is schematically illustrated by the line L2. In such a case, step S2 preferably comprises selecting the candidate non-linear luma component value among the different candidate non-linear luma component values in the second color space that results in a smallest difference between the original linear luminance component value in the third color space and the linear luminance component value in the third color space or a smallest difference between a function of the original linear luminance component value in the third color space and a function of the linear luminance component value in the third color space.

This means that the loop of steps S21 to S23 are performed multiple times and using different candidate Y' component values in step S21. The candidate Y' component value that then lead to the smallest difference between $Y_O$ and Y or between $k(Y_O)$ and k(Y) is then selected and used together with the subsampled Cb' and Cr' component values as color representation of the pixel.

The following embodiments are described in more detail with regard to a difference between the original linear luminance component value in the third color space and the linear luminance component value in the third color space. These embodiments also encompass a difference between a function of the original linear luminance component value in the third color space and a function of the linear luminance component value in the third color space. The function is preferably, as previously mentioned herein, the inverse of a transfer function, such as an inverse of the transfer function [A1].

The selection of the optimal candidate Y' component value among multiple candidate Y' component values can be performed according to various embodiments as described further herein.

A first embodiment involves performing a binary search. Hence, in this embodiment the method comprises performing a binary search to select a candidate non-linear luma component value in the second color space that minimizes a difference between the original linear luminance component value in the third color space and the linear luminance component value in the third color space.

A binary search is an efficient technique that can be used to find the optimal candidate non-linear luma component value. Generally, a binary search algorithm begins by comparing the original luminance component value in the third color space to the linear luminance component value in the third color space obtained using the middle element of a sorted array of possible candidate non-linear luma component values in the second color space. If the linear luminance component value in the third color space is equal to the original luminance component value in the third color space or differs from the original luminance component value in the third color space with not more than a defined amount, then the position of the middle element is returned and the search is finished. If the linear luminance component value is greater than the original linear luminance component value, then the search continues on the lower half of the array; or if the linear luminance component value is less than the original linear luminance component value, then the search continues on the upper half of the array. This process continues, eliminating half of the elements, and comparing the resulting linear luminance component value to the original linear luminance component value, until the difference there between is zero or until the entire array has been searched, i.e., until all elements except one has been eliminated. This is guaranteed to only take log 2(N) steps, where N is the number of possible candidate non-linear luma component values in the array. For instance, assume that the candidate non-linear luma component values can be selected from the array of [0, 1023]. Then N=1024 and log 2(1024)=10.

In an embodiment, the binary search is performed by performing steps S21 to S23 in FIG. 24 for a candidate non-linear luma component value in the second color space in the middle of a search interval. The method then continues to the steps illustrated in FIG. 25. A following step S25 comprises selecting the candidate non-linear luma component value in the middle of the search interval if the difference between the original luminance component value in the third color space and the linear luminance component value in the third color space is equal to zero, preferably as calculated in step S24. Otherwise, i.e., if the difference calculated in step S24 is not equal to zero, the method continues to step S26. This step S26 comprises selecting a search interval having half the size as compared to the search interval used above and ending at the candidate non-linear luma component value used above if the linear luminance component value in the third color space is larger than the original linear luminance component value in the third color space or selecting a search interval having half the size as compared to the search interval used above and starting at the candidate non-linear luma component value used above if the linear luminance component value in the third color space is smaller than the original linear luminance component value in the third color space.

The steps involving the loop L2, i.e., steps S21-S23, and S24-S26 are then repeated until the difference between the original linear luminance component value in the third color space and the linear luminance component value in the third color space is equal to zero, the search interval cannot be halved any more, the loop has been repeated a defined number of times or the search interval has reached a predefined interval size, i.e., the search interval is smaller than or equal to the predefined interval size.

The selection of a search interval in step S26 generally involves selecting a search interval having approximately half the size as compared to the search interval used above. For instance, if the search interval contains the values 100, 101, 102, 103 then one could choose either 101 or 102 as the "middle value", resulting in a "halved" search interval of [100, 101] (a true halving of the search interval) or [101, 103] (an approximate halving of the search interval) or a "halved" search interval of [100, 102] (an approximate halving of the search interval) or [102, 103] (a true halving of the search interval).

Another embodiment is to regard the selection of non-linear luma component value as an optimization problem and minimizes the error $E=(Y_O-Y')^2$ or $E=|Y_O-Y'|$ with regard to Y'. This can be done, for instance, by gradient descent, by calculating the gradient of E with respect to Y', i.e., dE/dY', and update Y' a small amount in the opposite direction of the gradient, i.e., $Y'_{n+1}=Y'_n-\alpha(dE/dY')$, where $\alpha$ is a small constant.

Gradient descent can be slow, so a quicker way may be to use a second-order optimization algorithm that calculates or approximates the second order derivatives $d^2E/dY'^2$. Gauss-Newton is an example of such an algorithm.

A further embodiment involves using a look-up table (LUT) when selecting the non-linear luma component value. Such a LUT may, for instance, comprise the best Y' component value for every possible combination of Cb', Cr' and $Y_O$ component values. Assume, for instance, that the Cb' and Cr' components are quantized to 10 bits and that the $Y_O$ component is also quantized to 10 bits. Then the LUT should contain $2^{10} \times 2^{10} \times 2^{10}$ different Y' component values. This is equivalent to $2^{30}$ Y' component values. If each such Y' component value is two bytes, the LUT will have a size of $2^{31}$ bytes, or 2 Gb.

It may also be possible to use a smaller LUT. For instance, it may be possible to quantize the $Y_O$, Cb' and Cr' components to a smaller size, say 6 bits. Then the LUT would be $2^{18}$ Y' component values, or $2^{19}$ bytes, which is equal to 512 kb.

The $Y_O$ component is linear. Accordingly, it may be inefficient to just quantize it. It may instead be better to use a function of $Y_O$ together with the Cb' and Cr' as input to the LUT to get the optimal Y' component. The function preferably outputs a non-linear representation of the $Y_O$ component and may, for instance, be an inverse transfer function (TF-1(.)), such as the inverse of the transfer function [1]. The optimal Y' component value is then derived from the LUT as Y'=LUT(Cb', Cr', $TF^{-1}(Y_O)$).

FIG. 26 is a flow chart illustrating an embodiment of step S2 in FIG. 22 when using a LUT. The method continues from step S1 in FIG. 22. A next step S30 comprises upsampling the subsampled first non-linear chroma component value in the second color space and the subsampled second non-linear chroma component value in the second color space to get an upsampled first non-linear chroma component value in the second color space and an upsampled second non-linear chroma component value in the second color space.

The next step S32 comprises retrieving the non-linear luma component value in the second color space from a look-up table using the original linear luminance component value in the third color space, or a non-linear version thereof, the upsampled first non-linear chroma component value in the second color space and the upsampled second non-linear chroma component value in the second color space, or quantized versions thereof, as input to the look-up table.

FIG. 27 is a flow chart illustrating an additional, optional step of the method shown in FIG. 26. The method continues from step S30 in FIG. 26. A next step S31 comprises applying the first inverse transfer function to the original linear luminance component value in the third color space to get an original non-linear luminance component value in the third color space. The method then continues to step S32 in FIG. 26. In this embodiment, step S32 comprises retrieving the non-linear component value in the second color space from the look-up table using the original non-linear luminance component value in the third color space, the upsampled first non-linear chroma component value in the second color space and the upsampled second non-linear chroma component value in the second color space, or the quantized versions thereof, as input to the look-up table.

In an embodiment, the look-up table comprises, for each combination of the original linear luminance component value in the third color space, or the non-linear version thereof, the upsampled first non-linear chroma component value in the second color space and the upsampled second non-linear chroma component value in the second color space, or the quantized versions thereof, an optimal non-linear luma component value in the second color space that minimizes a difference between the original linear luminance component value in the third color space and a linear luminance component value in the third color space determined based on the optimal non-linear luma component value in the second color space, the subsampled first non-linear chroma component value in the second color space and the subsampled second non-linear chroma component value in the second color space.

The upsampling of the non-linear chroma component values in the second color space as performed in step S20 in FIG. 24 and step S30 in FIG. 26 preferably upsamples the non-linear chroma component values to a same number of samples as the non-linear luma component value in the second space. Thus, the upsampling as performed in these steps preferably results in non-linear chroma component values having the same number of samples as prior to application of any subsampling, such as in step S12 in FIG. 23. This means that prior to subsampling and following upsampling the Y', Cb' and Cr' components all comprise the same number of samples, such as in the 4:4:4 format. Following the subsampling the Y' component comprises more samples as compared to the Cb' and Cr' components, which preferably comprise the same number of samples, such as in the 4:2:0 or 4:2:2 format.

A pixel in a picture has non-linear luma component value in the second color space preferably derived as described herein. The non-linear chroma component values in the second color space associated with the pixel and obtained following upsampling can be generated based on a respective subsampled first and second non-linear chroma component value in the second color space or based on multiple subsampled first and second non-linear chroma component values in the second color space, depending on the upsampling technique. For instance, if bilinear upsampling is used, then four subsampled Cb' component values and four subsampled Cr' component values will affect the pixel and the values of the upsampled Cb' and Cr' components. Correspondingly, if nearest neighbor upsampling is used then typically a single subsampled Cb' component value and a single subsampled Cr' component value are used to derive the upsampled Cb' and Cr' component values for a pixel.

The pre-processing of pixels according to the embodiments can be used in different applications, in particular different video applications, including video encoding.

An embodiment therefore relates to a method of encoding a pixel in a picture. The method comprises pre-processing the pixel according to any of the embodiments as disclosed herein to derive a non-linear luma component value in the second color space for the pixel. The method also comprises, in step S3 as shown in FIG. 28, encoding the non-linear luma component value, a subsampled first non-linear chroma component value in the second color space and a subsampled second non-linear chroma component value in the second color space.

Thus, the pre-processing of pixels can be used as an additional processing during encoding pixels of pictures, such as in connection with encoding pictures of a video sequence.

The output of the pre-processing, i.e., Y'Cb'Cr', such as in the 4:2:0 or 4:2:2 format, is then input to a video encoder, such as a H.264 video encoder, a High Efficiency Video Encoder (HEVC) or H.265 video encoder, or another video encoder. The encoding as performed by the video encoder can include traditional video encoding steps, such as inter prediction, intra prediction, mode decision, transformation of residual, quantization and encoding of the transformed and quantized residuals, such as in an entropy encoder, e.g., a context-adaptive binary arithmetic coding (CABAC) encoder.

An advantage of the pre-processing of the embodiments is that it can be applied to any video or picture encoding process without the need for performing any adjustments in the video or picture encoder or any adjustments in the corresponding video or picture decoder. In clear contrast, the pre-processing can be seen as an additional processing, i.e., pre-processing, that is applied to the input pictures instead of the traditional conversion of original colors, such as $R_OG_OB_O$ colors, of pixels in pictures to be encoded into Y'Cb'Cr' colors that involves application of transfer function, application of color transform and chroma subsampling.

The pre-processing of pixels in pictures, such as of a video sequence, may also be used in other applications besides video encoding. For instance, the embodiments can be used as a pre-processing that is applied before transferring video over an interface, such as high-definition multimedia interface (HDMI), DisplayPort or Thunderbolt. For example, in HDMI 2.0a the only way to convey 4K resolution at 50 or 60 frames per second (fps) is to use 4:2:0 or 4:2:2 YCbCr subsampling. If the video data is in full chroma sampling format (4:4:4) then a subsampling pre-processing step must be applied before sending the video data over the HDMI cable. The 4:2:0 or 4:2:2 video data is then transferred over the interface without further compression. By applying the pre-processing of the embodiments, the video quality is improved compared to conventional 4:2:0 or 4:2:2 subsampling without any correction of Y' component or finding of optimal Y' component.

A typical compression chain is described below. The incoming linear light pixel (R, G, B) ranging, for instance, from 0 to 10,000 is first fed to the transfer function, which results in a new pixel (R', G', B') between 0 and 1. After this, the pixel undergoes color transform resulting in (Y', Cb', Cr'). Then the Cb' and Cr' components are subsampled to 4:2:0.

After decompression, the 4:2:0 sequences are upsampled to 4:4:4 again, inverse color space conversion gives (R', G', B') and finally inverse transfer function gives back the linear light pixel (R, G, B) that can be output on a monitor.

The trouble comes from the fact that the Cb' and Cr' components are interpolated, whereas the Y' component is not. Hence, there can be a sharp shift in the Y' component in a pixel, but the Cb' and Cr' component cannot follow, since they are interpolated. For some colors, especially saturated colors, the result is a pixel of completely wrong intensity, and it is clearly visible.

It is proposed to change the Y' component in these cases so that the tuple (Y', Cb', Cr') generated from the interpolated colors is not so different from the original. Ideally the difference would be so small that it is not noticeable.

Basically it emanates to realizing that the Cb' and Cr' components are false, and then make also the Y' component false so that the (Y', Cb', Cr') are closer to the true colors. In other words, by introducing an error in the Y' component we can compensate for the errors already existing in the Cb' and Cr' components to come closer to the real pixel. It could be determined that the Cb' and Cr' components are false by comparing (Cb'−Cb'444) and (Cr'−Cr'444) with a threshold by e.g., comparing the Cb' that you get from first subsampling chroma (4:2:0) then upsampling (to 4:4:4) with the original Cb'444 and Cr'444 values before subsampling.

The corrected Y' component can be derived according to different embodiments as described below. Hence the corrected Y' component and the Cb' and Cr' components are then compressed resulting in that the image or video is perceived with a higher quality.

By changing the Y' component, i.e., deriving a corrected Y' component, we can compensate the resulting luminance value. The eye is much more sensitive to luminance changes than to chrominance changes, so the first rule should be to make sure that the luminance does not deviates too much from the original value.

As described above, the non-linear luminance Y' is adjusted prior to compression so that the linear luminance Y of the pixel is closer to its correct value. This is further described below.

Assume a picture where the left part of the screen, e.g., pixels 0 to 96, has the value (2142, 0, 138) and that the right part, e.g., pixels 97 to 1920, has the value (2142, 4, 138). With a conventional processing chain we would get the results in Table A1.

TABLE A1

Data for the "worst" color for 4:2:0 subsampling

| Pixel no. 97 | RGB value | Y value | Y diff | relative error | Barten steps |
|---|---|---|---|---|---|
| original | 2142<br>4<br>138 | 573.5991 | 0 | 0 | 0 |
| RGB 4:4:4 | 2142.6617<br>3.9750<br>138.2966 | 573.7735 | 0.1745 | 0.0304% | 0.0691 |
| RGB 4:2:0* | 3993.733<br>2.4265<br>263.6030 | 1066.4311 | 492.8320 | 85.9192% | 195.2710 |

*This indicates values obtained by upsampling the subsampled color in 4:2:0 format Here, the Y value is the linear luminance. That is, the Y value of the original is the value you get when you take the original linear light RGB (2142, 4, 138) and convert it to XYZ. For example, if RGB is in the BT.2020 color space you can convert to XYZ using $$X = 0.636958 \times R + 0.144617 \times G + 0.168881 \times B$$

$$Y = 0.262700 \times R + 0.677998 \times G + 0.059302 \times B$$

$$Z = 0.000000 \times R + 0.028073 \times G + 1.060985 \times B$$

This Y component is the luminance that the eye is sensitive to. It should not be confused with the Y' component mentioned above, which depend nonlinearly from RGB.

As can be seen in Table A1, the Y value is grossly wrong for pixel 97 when using RGB 4:2:0 subsampling and upsampling. Note that in this example, no compression has taken place, only quantization to 10 bits, and yet the Y value has a relative error of 85%. Using Barten's model that predicts how large differences the eye can see, we see that this error is 195 Barten steps, or 195 times greater than what would be just noticeable.

If we look at Table A2, we can see what happens.

TABLE A2

Pixel 97 is very different before and after color subsampling

| 4:4:4 10 bits | 94 | 95 | 96 | 97 | 98 | 99 |
|---|---|---|---|---|---|---|
| Linear RGB in | 2142<br>0<br>138 | 2142<br>0<br>138 | 2142<br>0<br>138 | 2142<br>4<br>138 | 2142<br>4<br>138 | 2142<br>4<br>138 |
| Y'Cb'Cr' 4:2:0 10 bits | 284<br>650<br>867 | 284 | 284<br>641<br>855 | 422 | 422<br>575<br>771 | 422 |
| Y'Cb'Cr after upsampling | 284<br>650<br>867 | 284<br>650<br>866 | 284<br>641<br>855 | 422<br>607<br>812 | 422<br>575<br>771 | 422<br>571<br>766 |
| Linear RGB out | 2151.71<br>0<br>138.2278 | 2119.42<br>0<br>138.2278 | 1794.94<br>0.0018<br>114.8210 | 3993.73<br>2.4265<br>263.6030 | 2142.66<br>3.9750<br>138.2966 | 1986.71<br>4.2102<br>127.3837 |

If we look at the Cb' component, it has the value 607, which is about halfway between 650, before the discontinuity, i.e., pixel 94, and 575, after the discontinuity, but the correct value is 575. The trouble is that the error not only affects the chrominance but also the luminance of the pixel, which becomes way too big. Our idea is to compensate this by changing the Y' component of the pixel. According to the embodiments we do not let the Y' component be 422 for the pixel, but selects the value 363 instead. In Table A3 we show the result.

TABLE A3

Pixel 97 is much more similar before and after color subsampling

| 4:4:4 10 bits | 94 | 95 | 96 | 97 | 98 | 99 |
|---|---|---|---|---|---|---|
| Linear RGB in | 2142 0 138 | 2142 0 138 | 2142 0 138 | 2142 4 138 | 2142 4 138 | 2142 4 138 |
| Y'Cb'Cr' 4:2:0 10 bits | 284 650 867 | 284 | 284 641 855 | 363 | 422 575 771 | 422 |
| Y'Cb'Cr' after upsampling | 284 650 867 | 284 650 866 | 284 641 855 | 363 607 812 | 422 575 771 | 422 571 766 |
| Linear RGB out | 2151.71 0 138.2278 | 2119.42 0 138.2278 | 1794.94 0.0018 114.8210 | 2145.11 0.7008 138.0825 | 2142.66 3.9750 138.2966 | 1986.71 4.2102 127.3837 |

We can now see that the new color is much more similar to its correct value. The green component has gone in the wrong direction, but only by 1.72 cd/m², but at the same time the red component has almost halved to its correct value, a movement of 1849 cd/m², and the blue component has changed in a similar fashion. In Table A4 we show what happens to the luminance.

TABLE A4

Data for the "worst" color for 4:2:0 subsampling after correction

| Pixel no. 97 | RGB value | Y value | Y diff | relative error | Barten steps |
|---|---|---|---|---|---|
| original | 2124 138 | 573.5991 | 0 | 0 | 0 |
| RGB 4:4:4 | 2142.6617 3.9750 138.2966 | 573.7735 | 0.1745 | 0.0304% | 0.0691 |
| RGB 4:2:0* | 2145.11 0.7008 138.0825 | 572.1852 | 1.4139 | 0.2465% | 0.5602 |

*This indicates values obtained by upsampling the subsampled color in 4:2:0 format As is seen in Table A4, we get a much smaller error in the luminance Y. The relative error is 0.2465%, which is equivalent to 0.5602 Barten steps, i.e., not possible to see.

The error is now instead in the chrominance, but given the fact that the human visual system is less sensitive to errors in chrominance than in luminance, this is not much of a problem. In addition, there is going to be an error in chrominance anyway since it is subsampled. Also, one may change the Y' component to get a good trade-off between the error in luminance and the error in chrominance.

Furthermore, the change in chrominance may not even be noticeable—the only difference is that the green component is 0.7008 cd/m² instead of 3.9750 cd/m² but that is most likely dwarfed by the red component anyway, since it is 2145, almost a thousand times larger. Another way to see it is that the ratio between the green and the red components becomes 0.7008/2145.11=0.000327 instead of the correct 3.9750/2142.6617=0.001855. It is not clear that this slight shift in hue is possible to see for the human eye. Hence we have traded an error in luminance that is 200 times larger than what is just noticeable to an error in chrominance that is so small it might not be possible to see.

The nice thing is that the changed Y' value only affects the individual pixel. Hence no other pixel is sacrificed by changing the Y' component.

In an embodiment, the value Y' is not optimized for a specific value of Cb' and Cr'. Instead the Y' value is selected so that it minimizes the luminance error for some different values of Cb' and Cr' or for a range of Cb' and Cr' values. This can be done in scenarios where the chroma upsampling method is unknown.

One variant is to perform a specific number of chroma upsampling methods and then select the Y' value that minimizes the average squared error for the different upsampling methods. In another version, the Y' value is selected so that the worst case, i.e., largest error, is minimized.

Another variant is to use two or more neighboring values of Cb' and Cr' and use them directly to calculate the range of possible Cb' and Cr' values.

Figure 29:
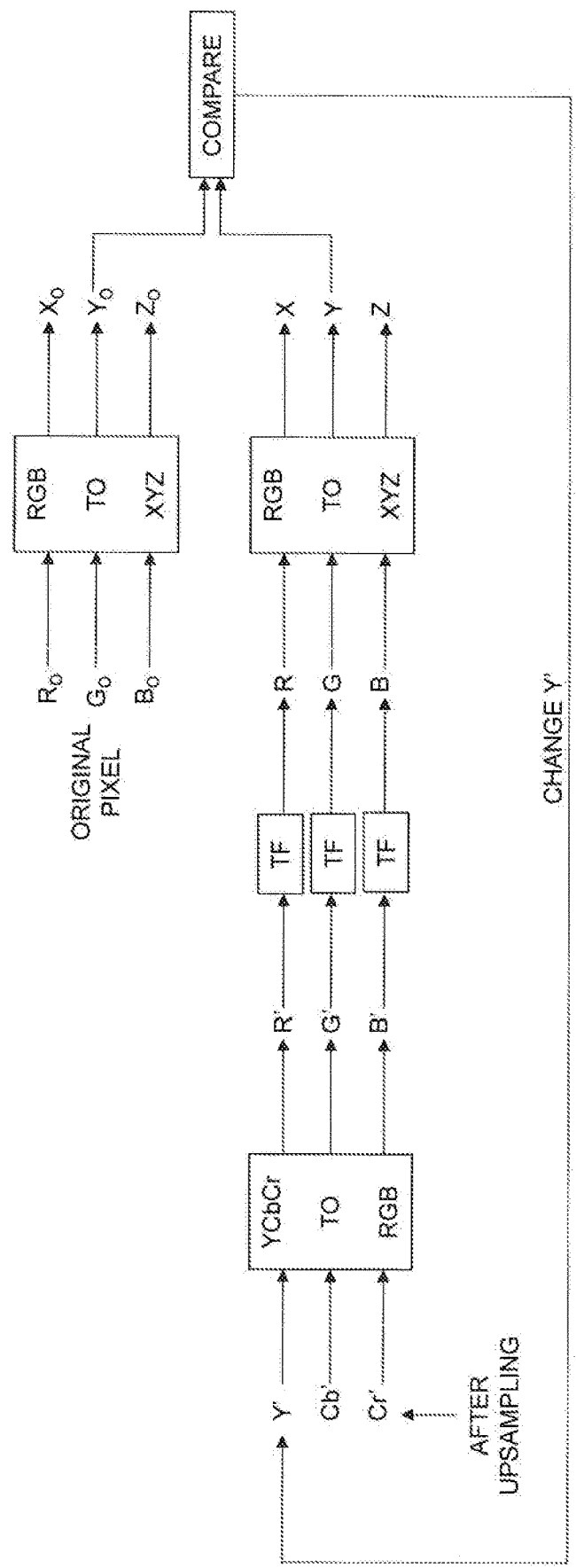
FIG. 29 illustrates a technology of deriving a corrected Y'.

There are several ways to find the best value for Y', we will go through a number of them. One way is shown in FIG. 29.

First we need to find the value $Y_O$ to optimize towards. The original pixel $R_O$, $G_O$, $B_O$ is transformed from RGB to XYZ as mentioned above. This results in $X_O$, $Y_O$, $Z_O$, of which we are only interested in $Y_O$. In fact, we do not need to calculate $X_O$ and $Z_O$. This $Y_O$ is the original luminance in linear light, and it is this that the eye is sensitive to. In our test case $Y_O$ is equal to 573.5991, see Table A1.

Second, we take our existing Y' value, together with the Cb' and Cr' values. In the case above, we would feed in (422, 607, 812), see Table A2. Now we would do a color transform from Y'Cb'Cr' to R'G'B'. This is done using $R' = Y' + 1.47460 \times Cr'$ $G' = Y' - 0.16455 \times Cb' - 0.57135 \times Cr'$ $B' = Y' + 1.88140 \times Cb'.$ Next we invoke the transfer function. In this case we use the PQ-EOTF, which can be implemented using the following Matlab code, for instance:

function $L = pq\_eotf(c)$

5%%%

%%% c goes from 0.0 to 1.0%

%% L is output luminance in nits
%%%

$c1 = 0.8359375;$ $c2 = 18.8515625;$ $c3 = 18.6875;$ $n = 0.1593017578125;$ $m = 78.84375;$ $c = \max(c, 0);$ $c = \min(c, 1);$ $L = 10000 * ((\max(c^{\wedge}(1/m) - c1, 0) / (c2 - c3 * c^{\wedge}(1/m)))^{\wedge}(1/n));$ The result is the color (R, G, B) in linear light. Now we convert this to XYZ as mentioned above, or really, we only need to calculate Y. This Y is the linear luminance of the pixel, and it is this luminance that we want to make as close as possible to $Y_O$. In our test case, Y starts out being 1066.4311, see Table A1.

Now we compare Y and $Y_O$. If Y is bigger than $Y_O$, we reduce our Y' value from 422 to something smaller. For instance, we can take one step and try 421. Then the entire calculation is carried out again, generating a new Y value. This is again compared to $Y_O$, and if it is still too big, we reduce Y' further. Finally, we will reach 363 and the resulting Y value, i.e., 572.1852 is now smaller than $Y_O$, i.e., 573.5991. The process now stops.

In the embodiment above it takes 422−363=59 iterations to reach the best value. This may be costly.

Therefore, an embodiment is to do a binary search to find the best Y' value. Optionally, first the maximum Y' value is tried, for instance 1023. Optionally, then the minimum Y' value is tried, for instance 0. Then a value in the middle is tried, for instance 512. If the Y value resulting from Y'=512 is larger than $Y_O$, we should search in the interval [0, 512]. If the Y-value is smaller than $Y_O$, we should instead search the interval [512, 1023]. We then proceed by calculating a new value in the middle of the selected interval, and proceeds until the interval only contains a single number, such as [363, 363], or [363, 364]. This is guaranteed to only take $\log_2(N)$ steps, where N is the number of possible values, which in this case is 1024. Hence only $\log_2(1024) = 10$ steps are sufficient.

Yet another way to calculate the best value is to see FIG. 29 as an optimization problem and minimize the error $E = (Y - Y_O)^2$ with respect to Y'. This can be done by gradient descent, by calculating the gradient of E with respect to Y', i.e., dE/dY', and update Y' a small amount in the opposite direction of the gradient: $Y'_{n+1} = Y'_n - \alpha \times dE/dY'$, where $\alpha$ is a small constant.

Gradient descent can be slow, so a quicker way may be to use a second-order optimization algorithm that calculates or approximates the second order derivatives $d^2E/dY'^2$. Gauss-Newton is an example of such an algorithm.

In another embodiment the following process is applied in order to calculate Y':
X, $Y_O$ and Z are converted with a XYZ to RGB conversion to produce new values R1, G1 and B1
R1, G1 and B1 are converted with an inverse transfer function to produce R1', G1' and B1'.
R1, G1' and B1' are converted with an inverse color transform to produce Y'

In an embodiment, the Y' values of all pixels in an image or picture are corrected. In an alternate embodiment, only pixels that are at risk of having visible luminance errors are corrected. This may include pixels that are close to the color gamut edge, but exclude pixels closer to the middle of the color gamut triangle.

Looking at the bottom row in FIG. 29, the first step of processing is $R' = Y' + 1.47460 \times Cr'$ $G' = Y' - 0.16455 \times Cb' - 0.57135 \times Cr'$ $B' = Y' + 1.88140 \times Cb'.$ But since Cr' and Cb' are fixed, they are interpolated, not sent, we can replace everything to the right of Y' with a constant $R' = Y' + c1$ $G' = Y' + c2$ $B' = Y' + c3$ The next step is taking the transfer function of the color components:

$R = TF(R')$ $G = TF(G')$ $B = TF(B')$ which then becomes $R = TF(Y' + c1)$ $G = TF(Y' + c2)$ $B = TF(Y' + c3)$ The last step of the processing is going from RGB to XYZ. This is done using $X = 0.636958 \times R + 0.144617 \times G + 0.168881 \times B$ $Y = 0.262700 \times R + 0.677998 \times G + 0.059302 \times B$ $Z = 0.000000 \times R + 0.028073 \times G + 1.060985 \times B$ of this we are only interested in the Y component, so we use $Y = 0.262700 \times R + 0.677998 \times G + 0.059302 \times B.$ Inserting the previous equations into this gives $Y = 0.262700 \times TF(Y' + c1) + 0.677998 \times TF(Y' + c2) + 0.059302 \times TF(Y' + c3),$ or shortened to $Y = f(Y')$ We want the output value Y of this equation to match the original $Y_O$. Since the Y depends on Y' in three different places in a nonlinear way, there seems to be no easy way to invert the function so that we can get $Y' = f^{-1}(Y)$.

However, it is possible to linearize the nonlinear TF(x) ~ kx+m. Doing this in the three different places gives $Y \sim k1 \times Y' + m1 + k2 \times Y' + m2 + k3 \times Y' + m3$ which is equivalent to $Y \sim (k1 + k243) \times Y' + (m1 + m2 + m3).$ This can be inverted to $$Y'-Y'k=(Y_O-(m1+m2+m3))/(k1+k243).$$

Thus it is likely that Y'k will produce a value Yk closer to $Y_O$ than before. The function can be linearized again at this new point Y'k, resulting in a new value Y'k+1, etc.

It should be noted that for all these iterative techniques it is not necessary to find the absolutely best 10 bit value that generates the Y value closest to the $Y_O$ value. It may be sufficient to just use a few iterations or even one iteration. The corrected Y value resulting from a single iteration will most likely be much better than not correcting at all.

Figure 30:
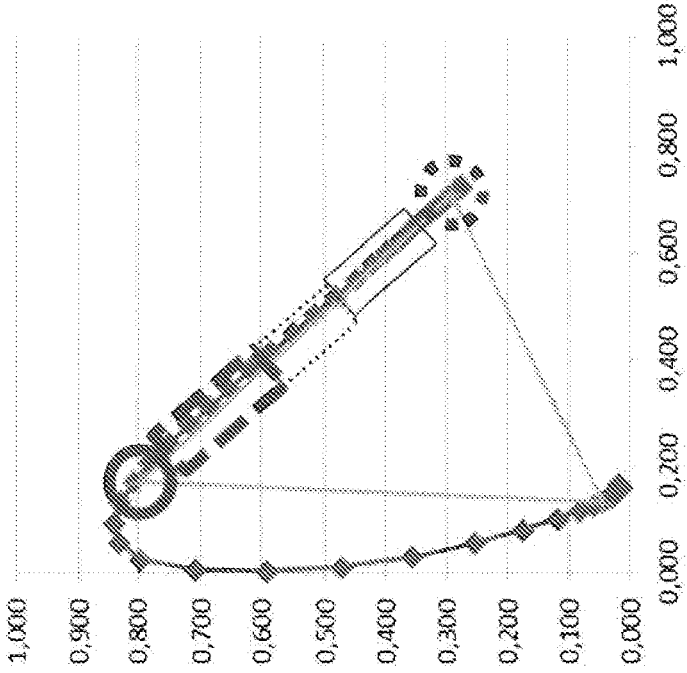
FIG. 30 illustrates that different linearizations can be used in different areas.

Some linearizations may also be done in advance. As noticed above, the worst problems occur on the gamut edge. Hence one could have one linearization for the line connecting the red primary to the green primary, one linearization for the line connecting the red primary to the blue primary and one linearization for the line connecting the green primary to the blue primary. Another way may be to have linearizations that will be used close to the red primary, another close to the green primary, and a third that is used close to the blue primary. Furthermore it is possible to have several linearizations along the line of the gamut, as shown in FIG. 30.

Thus, there can be different linearizations in different areas. If the color is inside the circle with a solid line, we are close to the green primary and we can use one linearization. If we are further along towards the red primary, i.e., inside the dashed box, we can use a second linearization. If we are close to the edge of the gamut and roughly half ways between the red and the green primary, i.e., inside the dotted box, a third linearization can be used. If we are even closer to the red primary, i.e., inside the box with a solid line, a fourth linearization can be used. If we are inside the dotted circle, i.e., close to the red primary, a fifth linearization can be used. The same partitioning of the other two lines in the triangle can also be used. Finally the area inside the triangle but in no box or circle can be partitioned into one or more areas, each area having a different linearization.

Another way is to create a look-up table (LUT). As can be seen from the above formulation, if we have Cb', Cr' and the wanted Y-value, it is possible to find the best Y' using any of the iterative techniques mentioned above. Hence we can create a look-up table for every possible combination of Cb', Cr' and Y. Assume for instance that Cb' and Cr' is quantized to 10 bits. Assume further that we also quantize Y to bits. We then need $2^{10} \times 2^{10} \times 2^{10}$ different values in our look-up table. That is equivalent to $2^{30}$ values. If each value is two bytes, this means $2^{31}$ bytes, or 2 Gb. That is big but maybe not infeasible, especially in the future.

Care may need to be taken when quantizing Y. Since Y is completely linear, it may be inefficient to just quantize it. It may instead be better to create Ynonlinear=TF(Y) and instead create a LUT for Y using Cb', Cr' and Ynonlinear as input variables. Given Cb', Cr' and Y, we would then first calculate Ynonlinear=TF(Y) and then find Y'=LUT(Cb', Cr', Ynonlinear).

It may also be possible to use a smaller LUT. For instance, it may be possible to quantize Y (or Ynonlinear), Cb' and Cr' to, say, 6 bits. Then the table size would be $2^{(6+6+6)}=2^{18}$ values or $2^{19}$ bytes, which is equal to 512 kbytes. That is a reasonable size even with today's hardware.

It may be possible to take the quantized values Cb', Cr' and Y closest to the true values and interpolate them. As an example, if the real value of Cb' is bigger than Cb' quantized to 6 bits but smaller than Cb' quantized to 6 bits+1, the following may be good approximation:

$$Y'=(LUT(Cb'6bit,Cr'6bit,Y6bit)+(LUT(Cb'6bit+1,Cr'6bit,Y6bit))/2$$

Interpolating between more than two values is also possible.

In an embodiment, a look-up-table is used for deriving the value of Y'. In one version the look-up-table contains every possible value of $Y_O$, Cb' and Cr'. For 10 bit video that will result in 1024×1024×1024 entries and in some applications this size is acceptable. In another version the look-up-table (LUT) is pruned, for example through rounding one or more of $Y_O$, Cb' and Cr, e.g., to 8 bits. If a pruned look-up-table is used the algorithm can be extended with a refinement step that finds the best Y' starting from the Y' that was retrieved from the LUT. In a version the LUT is only used when the Cb' value and/or the Cr' value is such that Y' can become too different from $Y_O$, i.e., when the initially calculated Y' gives a linear Y value that is too different from $Y_O$, and thereby the size of the LUT can be substantially reduced since many values of Cb' and Cr' will not cause any problems.

In an embodiment, a function of $Y_O$, Cb' and Cr', e.g., a linear combination, polynomial function, exponential function, logarithmic function, trigonometric function, etc., is used for deriving Y'. The function can be defined such that for any value of $Y_O$, Cb' and Cr' the difference between Y and $Y_O$ is below a certain threshold or the difference between the derived Y' and the optimal Y' is below a certain threshold.

In an embodiment several different function of $Y_O$, Cb' and Cr' are defined for deriving Y'. The selection of which function to use is based on the value of $Y_O$, Cb' and Cr'.

For each embodiment described herein it could be the case that the method for deriving Y' is only invoked if the difference between Y' and TF($Y_O$) is above a certain threshold to begin with.

According to an aspect, a method is provided as illustrated in FIG. 31. The method can be performed in an encoder or in a pre-process to the encoder. In the method, when it is determined that the Cb' and/or Cr' components include errors, a corrected Y' component is derived to compensate for the errors in the Cb' and/or the Cr' components. The method optionally also comprise encoding video with the corrected Y' component.

Another aspect of the embodiments relates to a device for pre-processing a pixel in a picture. The device is configured to obtain an original linear luminance component value of the pixel in a third color space determined based on a linear color of the pixel in a first color space. The device is also configured to derive a non-linear luma component value in a second color space for the pixel based on a first non-linear chroma component value in the second color space, a second non-linear chroma component value in the second color space and the original linear luminance component value in the third color space.

In an embodiment, the device is configured to determine the original linear luminance component value in the third color space based on the linear color in the first color space.

In an embodiment, the device is configured to derive a non-linear luma component value in the second color space that minimizes a difference between the original linear luminance component value in the third color space and a linear luminance component value in the third color space determined based on the non-linear luma component value in the second color space, the first non-linear chroma component value in the second color space and the second non-linear chroma component value in the second color space.

In an embodiment, the device is configured to derive the non-linear luma component value in the second color space based on a subsampled first non-linear chroma component value in the second color space, a subsampled second non-linear chroma component value in the second color space and the original linear luminance component value in the third color space.

In an embodiment, the device is configured to apply a first transfer function to the original linear color in the first color space to get a non-linear color in the first color space. The device is also configured to apply a first color transform to the non-linear color in the first color space to get a non-linear color in the second color space. The non-linear color in the second color space comprises an initial first non-linear chroma component value and an initial second non-linear chroma component value. The device is further configured to subsample the initial first non-linear chroma component value in the second color space and the initial second non-linear chroma component value in the second color space to get the subsampled first non-linear chroma component value in the second color space and the subsampled second non-linear chroma component value in the second color space.

In an embodiment, the device is configured to upsample the subsampled first non-linear chroma component value in the second color space and the subsampled second non-linear chroma component value in the second color space to get an upsampled first non-linear chroma component value in the second color space and an upsampled second non-linear chroma component value in the second color space. The device is also configured to apply a second color transform to a candidate non-linear luma component value in the second color space, the upsampled first non-linear chroma component value in the second color space and the upsampled second non-linear chroma component value in the second color space to get a non-linear color in the first color space. The device is further configured to apply a second transfer function to the non-linear color in the first color space to get a linear color in the first color space. The device is additionally configured to apply a third color transform to the linear color in the first color space to get a linear luminance component value in the third color space. The device is also configured to derive the non-linear luma component value based on a comparison of the original linear luminance component value in the third color space and the linear luminance component value in the third color space.

In an embodiment, the device is configured to select a candidate non-linear luma component in the second color space that reduces, such as minimizes, a difference between the original linear luminance component in the third color space and the linear luminance component in the third color space.

In an embodiment, the device is configured to perform application of the second color transform to a candidate non-linear luma component value in the second color space, the upsampled first non-linear chroma component value in the second color space and the upsampled second non-linear chroma component value in the second color space, application of the second transfer function to the non-linear color in the first color space and application of the third color transform to the linear color in the first color space for different candidate non-linear luma component values in the second color space. The device is also configured to select the candidate non-linear luma component value among the different candidate non-linear luma component values in the second color space that results in a smallest difference between the original linear luminance component value in the third color space and the linear luminance component value in the third color space.

In an embodiment, the device is configured to perform a binary search to select a candidate non-linear luma component value in the second color space that minimizes a difference between the original linear luminance component value in the third color space and the linear luminance component value in the third color space.

In an embodiment, the device is configured to perform application of the second color transform to a candidate non-linear luma component value in the second color space, the upsampled first non-linear chroma component value in the second color space and the upsampled second non-linear chroma component value in the second color space, application of the second transfer function to the non-linear color in the first color space and application of the third color transform to the linear color in the first color space for a candidate non-linear luma component value in the second color space in the middle of a search interval. The device is also configured to select the candidate non-linear luma component value in the middle of the search interval if the difference between the original linear luminance component value in the third color space and the linear luminance component value in the third color space is equal to zero. The device is also configured to otherwise select a search interval having half the size as compared to the search interval used by the device when performing the applications and ending at the candidate non-linear luma component value used by the device when performing the applications if the linear luminance component value in the third color space is larger than the original linear luminance component value in the third color space or select a search interval having half the size as compared to the search interval used by the device when performing the applications and starting at the candidate non-linear luma component value used by the device when performing the applications if the linear luminance component value in the third color space is smaller than the original linear luminance component value in the third color space. the device is further configured to repeat performing the applications and selection of the search interval until the difference between the original linear luminance component value in the third color space and the linear luminance component value in the third color space is equal to zero or the search interval comprises a single candidate non-linear luma component value in the second color space.

In an embodiment, the device is configured to upsample the subsampled first non-linear chroma component value in the second color space and the subsampled second non-linear chroma component value in the second color space to get an upsampled first non-linear chroma component value in the second color space and an upsampled second non-linear chroma component value in the second color space. The device is also configured to retrieve the non-linear luma component value in the second color space from a look-up table using the original linear luminance component value in the third color space, or a non-linear version thereof, the upsampled first non-linear chroma component value in the second color space and the upsampled second non-linear chroma component value in the second color space, or quantized versions thereof, as input to the look-up table.

In an embodiment, the device is configured to apply the first transfer function to the original linear luminance component value in the third color space to get an original non-linear luminance component value in the third color space. The device is configured to retrieve the non-linear luma component value in the second color space from the look-up table using the original non-linear luminance component value in the third color space, the upsampled first non-linear chroma component value in the second color space and the upsampled second non-linear chroma component value in the second color space, or the quantized versions thereof, as input to the look-up table.

Figure 32:
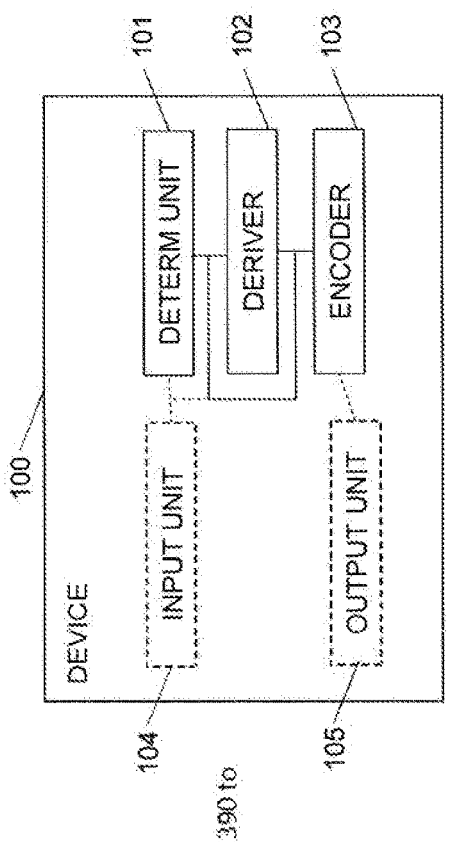
FIG. 32 is a schematic illustration of a hardware implementation of a device according to AJUSTY.

FIG. 32 illustrates a particular hardware implementation of a device 100 for pre-processing a picture according to an embodiment. In an embodiment, the device 100 comprises a determining unit 101 configured to obtain the original linear luminance component value of the pixel in the third color space.

The device 100 also comprises a deriver 102 configured to derive the non-linear luma component value in the second color space for the pixel.

In another embodiment, the device 100 comprises a determining unit 101 configured to determine that Cb' and/or Cr' include errors. The device 100 also comprises a deriver 102 configured to derive a corrected Y'. The device 100 further comprises a video encoder 103 configured to encode a picture with the corrected Y'.

In an embodiment, the device 100 also comprises an input unit 104 configured to receive the video to be encoded and an output unit 105 configured to output an encoded bitstream.

The input unit 104 could be in the form of a general input unit, in particular in the case of a wired connection to external devices. Alternatively, the input unit 104 could be in the form of a receiver or transceiver, in particular in the case or a wireless connection to external devices. Correspondingly, the output unit 105 could be in the form of a general output unit, in particular in the case of a wired connection to external devices. Alternatively, the output unit 105 could be in the form of a transmitter or transceiver, in particular in the case or a wireless connection to external devices The input unit 104 is preferably connected to the determining unit 101, the deriver 102 and the video encoder 103 to forward the video to be encoded thereto. The determining unit 101 is preferably connected to the deriver 102 and the video encoder 103. The video encoder 103 is preferably connected to the output unit 105 to forward the encoded bitstream to, for instance, a decoder.

Particular examples of suitable hardware circuitry include one or more suitably configured or possibly reconfigurable electronic circuitry, e.g., Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more FPGAs, or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 33:
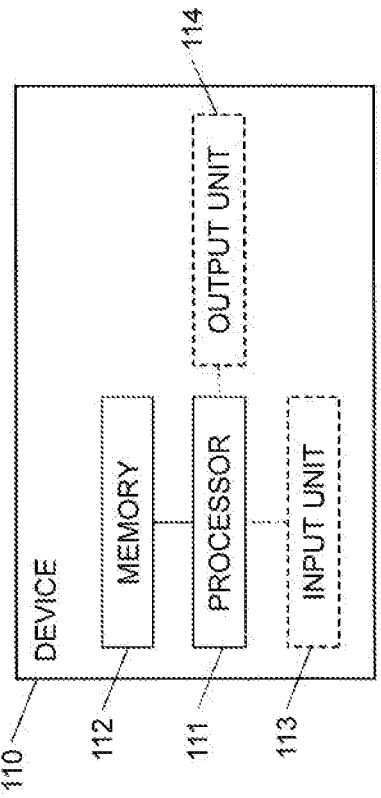
FIG. 33 is a schematic illustration of an implementation of a device according to AJUSTY with a processor and a memory.

In a particular example, the device 110, see FIG. 33, comprises a processor 111 and a memory 112 comprising instructions executable by the processor 111. In an embodiment, the processor 111 is operative to obtain the original linear luminance component value of the pixel in the third color space. The processor 111 is also operative to derive the non-linear luma component value in the second color space for the pixel.

In another embodiment, the processor 111 is operative to determine that the Cb' and/or Cr' components include errors and when it is determined that the Cb' and/or Cr' components include errors. The processor 111 is also operative to derive a corrected Y' component to compensate for the errors in the Cb' and/or the Cr' components.

In an embodiment, the device 110 also comprises an input unit 113 configured to receive the video to be encoded. In such a case, the processor 111 is operative to receive the video to be encoded from the input unit 113.

In an embodiment, the device 110 also comprises an output unit 114 configured to output an encoded bitstream as received from the processor 111.

In a particular embodiment, the processor 111 is operative, when executing the instructions stored in the memory 112 to perform the above described operations. The processor 111 is thereby interconnected to the memory 112 to enable normal software execution.

Figure 34:
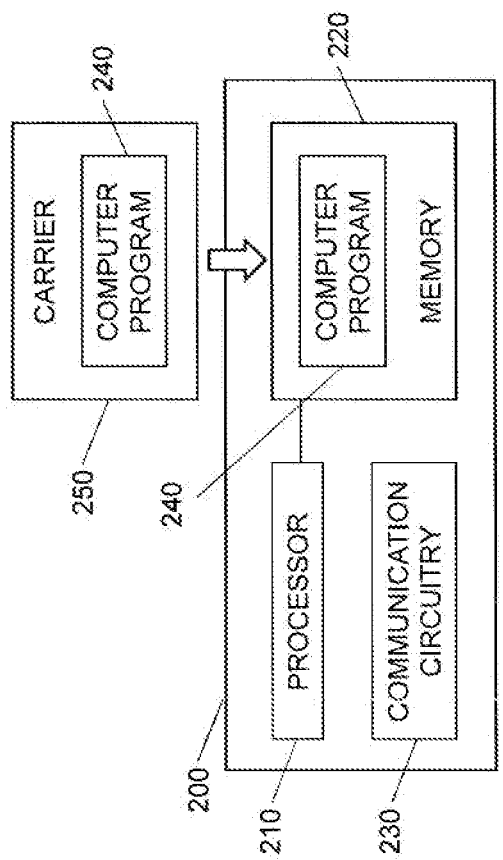
FIG. 34 is a schematic illustration of a user equipment according to AJUSTY.

FIG. 34 is a schematic block diagram illustrating an example of a user equipment (UE) 200 comprising a processor 210, an associated memory 220 and a communication circuitry 230.

In this particular example, at least some of the steps, functions, procedures, modules and/or blocks described herein are implemented in a computer program 240, which is loaded into the memory 220 for execution by processing circuitry including one or more processors 210. The processor 210 and memory 220 are interconnected to each other to enable normal software execution. A communication circuitry 230 is also interconnected to the processor 210 and/or the memory 220 to enable input and/or output of video data.

The user equipment 200 can be any device or apparatus that can receive and process video data. For instance, the user equipment 200 could be a computer, either stationary or portable, such as laptop, a smart phone, a tablet, a set-top box, a video camera, etc.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In an embodiment, the computer program 240 comprises instructions, which when executed by the processor 210, cause the processor 210 to obtain an original linear luminance component value of a pixel in a picture in a third color space determined based on a linear color of the pixel in a first color space. The processor 210 is also caused to derive a non-linear luma component value in a second color space for the pixel based on a first non-linear chroma component value in the second color space, a second non-linear chroma component value in the second color space and the original linear luminance component value in the third color space.

In an embodiment, the computer program 240 further comprises instructions, which when executed by the processor 210, cause the processor 210 to encode the non-linear luma component value, the first non-linear chroma component value and the second non-linear chroma component value.

In another embodiment, the computer program 240 comprises instructions, which when executed by the processor 210, cause the processor 210 to determine that the Cb' and/or Cr' components include errors, and when it has determined that the Cb' and/or Cr' components include errors, they cause the processor 210 to derive a corrected Y' component to compensate for the errors in the Cb' and the Cr' components.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium 250.

By way of example, the software or computer program 240 may be realized as a computer program product, which is normally carried or stored on a computer-readable medium 240, preferably non-volatile computer-readable storage medium 250. The computer-readable medium 250 may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 240 may thus be loaded into the operating memory of a computer or equivalent processing device, represented by the user equipment 200 in FIG. 34, for execution by the processor 210 thereof.

A further aspect of the embodiments also relates to a signal representing an encoded version of a pixel in a picture. The encoded version comprises an encoded version of a subsampled first non-linear chroma component value in a second color format, an encoded version of a subsampled second non-linear chroma component value in the second color format and an encoded version of a non-linear luma component value in the second color format derived according to any of the embodiments.

In an embodiment, the signal is one of an electronic signal, an optical signal, an electromagnetic signal, a magnetic signal, an electric signal, a radio signal and a microwave signal.

The flow diagram or diagrams presented herein may therefore be regarded as a computer flow diagram or diagrams, when performed by one or more processors. A corresponding device may be defined as a group of function modules, where each step performed by the processor corresponds to a function module. In this case, the function modules are implemented as a computer program running on the processor. Hence, the device may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 35.

Figure 35:
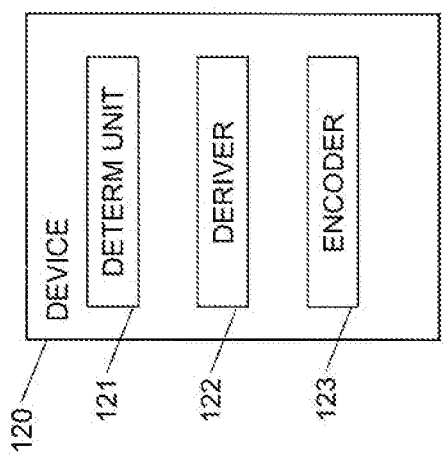
FIG. 35 is a schematic illustration of an implementation of a device according to AJUSTY with function modules.

FIG. 35 is a schematic block diagram of a device 120 for pre-processing a pixel in a picture with function modules. In an embodiment, the device 120 comprises a determining unit 121 for obtaining an original linear luminance component value of the pixel in a third color space determined based on a linear color of the pixel in a first color space. The device 120 also comprises a deriver 122 for deriving a non-linear luma component value in a second color space for the pixel based on a first non-linear chroma component value in the second color space, a second non-linear chroma component value in the second color space and the original linear luminance component value in the third color space.

In another embodiment, the device 120 comprises a determining unit 121 for determining that Cb' and/or Cr' include errors. The device 120 also comprises a deriver 102 for deriving a corrected Y'. The device 120 further, optionally, comprises a video encoder 123 for encoding the bitstream using the corrected Y'.

A further aspect of the embodiments, see FIG. 33, relates to a device 110 for encoding a pixel in a picture. The device 110 comprises a processor 111 and a memory 112 comprising instructions executable by the processor 111. The processor 111 is operative to obtain an original linear luminance component value of the pixel in a third color space determined based on a linear color of the pixel in a first color space. The processor 111 is also operative to derive a non-linear luma component value in a second color space for the pixel based on a first non-linear chroma component value in the second color space, a second non-linear chroma component value in the second color space and the original linear luminance component value in the third color space. The processor 111 is further operative to encode the non-linear luma component value, the first non-linear chroma component value and the second non-linear chroma component value.

Another further aspect of the embodiments, see FIG. 35, relates to a device 120 for encoding a pixel in a picture. The device 120 comprises a determining unit 121 for obtaining an original linear luminance component value of the pixel in a third color space determined based on a linear color of the pixel in a first color space. The device 120 also comprises a deriver 122 for deriving a non-linear luma component value in a second color space for the pixel based on a first non-linear chroma component value in the second color space, a second non-linear chroma component value in the second color space and the original linear luminance component value in the third color space. The device 120 further comprises an encoder 123 for encoding the non-linear luma component value, the first non-linear chroma component value and the second non-linear chroma component value.

According to an aspect a unit, such as a pre-processor or an encoder, is provided. The unit is configured to determine that the Cb' and/or Cr' components include errors, and when it has determined that the Cb' and/or Cr' components include errors, it is configured to derive a corrected Y' component to compensate for the errors in the Cb' and the Cr' components.

The present embodiments also relates to a user equipment comprising a device for pre-processing a pixel or a device for encoding a pixel according to the embodiments. The user equipment is preferably a device or apparatus configured to receive and process video data. The user equipment could, for instance, be a device or apparatus configured to forward video data over an interface, such as HDMI.

Another embodiment relates to a user equipment comprising a device for pre-processing a pixel or a device for encoding a pixel according to the embodiments. In this embodiment, the user equipment is preferably selected from a group consisting of a computer, a laptop, a smart phone, a tablet and a set-top box.

It is becoming increasingly popular to provide computing services, such as hardware and/or software, in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources such as networks, servers, storage, applications and general or customized services.

Figure 36:
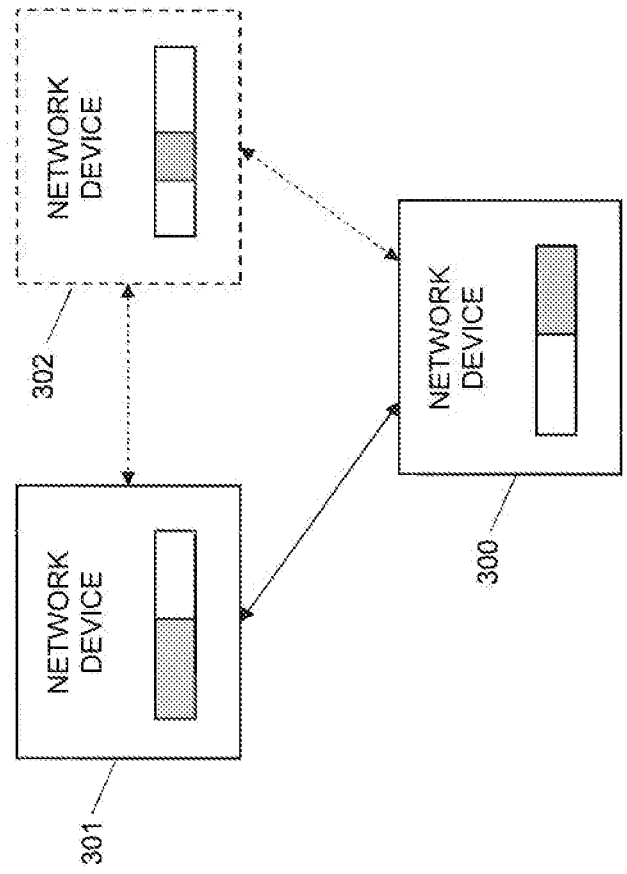
FIG. 36 schematically illustrate a distributed implementation of AJUSTY among multiple network devices.

FIG. 36 is a schematic diagram illustrating an example of how functionality can be distributed or partitioned between different network devices 300, 301, 302 in a general case. In this example, there are at least two individual, but interconnected network devices 300, 301, which may have different functionalities, or parts of the same functionality, partitioned between the network devices 300, 301. There may be additional network devices 302 being part of such a distributed implementation. The network devices 300, 301, 302 may be part of the same wireless communication system, or one or more of the network devices may be so-called cloud-based network devices located outside of the wireless communication system.

Figure 37:
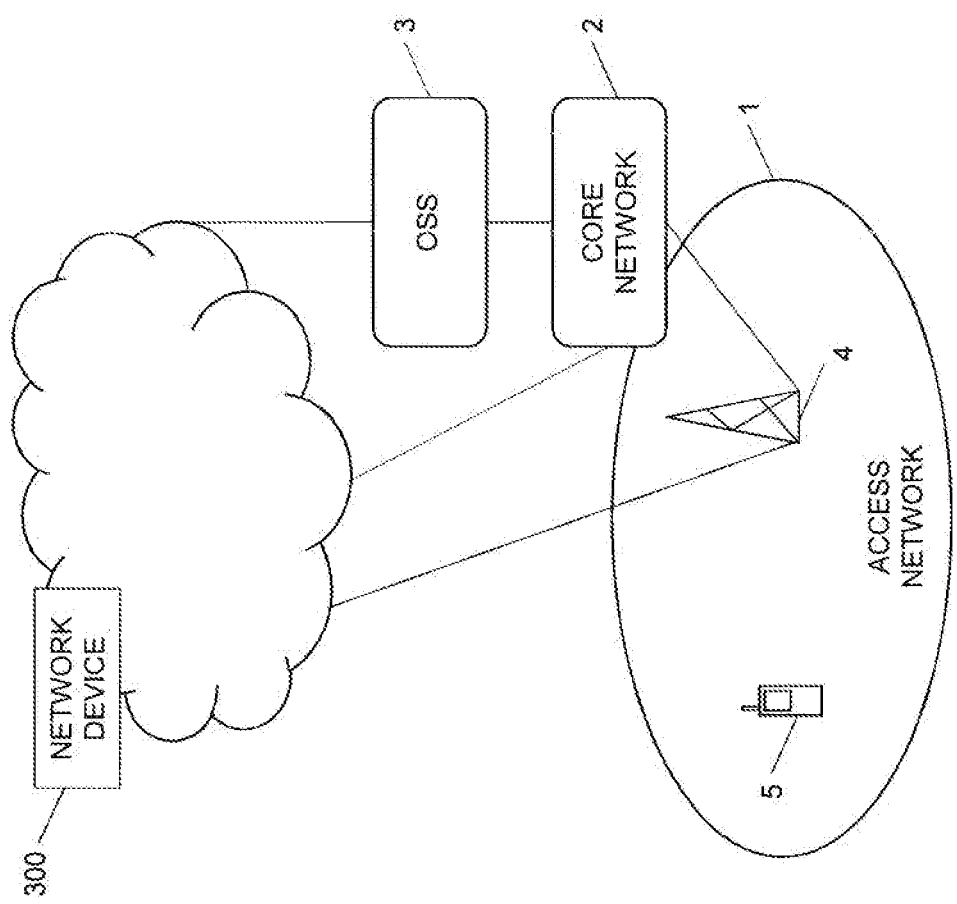
FIG. 37 is a schematic illustration of an example of a wireless communication system with one or more cloud-based network devices according to AJUSTY.

FIG. 37 is a schematic diagram illustrating an example of a wireless communication system, including an access network 1 and/or a core network 2 and/or an Operations and Support System (OSS) 3 in cooperation with one or more cloud-based network devices 300. The figure also illustrates a network node 4 of the access network 1 and a user equipment 5 according to the embodiments.

EXAMPLES

Recently, a tremendous increase in quality has been achieved in digital video by increasing resolution, going from standard definition via high definition to 4k. High dynamic range (HDR) video uses another way to increase perceived image quality, namely by increasing contrast. The conventional TV system was built for luminances between 0.1 candela per square meter (cd/m²) and 100 cd/m², or about ten doublings of luminance, this is generally referred to as standard dynamic range (SDR) video. As a comparison, some HDR monitors are capable of displaying a range from 0.01 to 4000 cd/m², i.e., over 18 doublings.

Conventional SDR Processing

Typical SDR systems such as TVs or computer monitors often use an eight bit representation where 0 represents dark and 255 bright. Just linearly scaling the code value range [0; 255] to the luminance range [0.1; 100] cd/m² mentioned above would not be ideal: The first two code words 0 and 1 would be mapped to 0.1 cd/m² and 0.49 cd/m² respectively, a relative difference of 390%. The last two code words 254 and 255 on the other hand, would be mapped to 99.61 cd/m² and 100 cd/m² respectively, a relative difference of only 0.3%. To avoid this large difference in relative step sizes, SDR systems include an electro-optical transfer function (EOTF) which maps code values to luminances in a non-linear way. As an example, the red component is first divided by 255 to get a value $R_{01} \in [0; 1]$ and then fed through a power function $R' = (R_{01})^\gamma$.

Finally R' is scaled to the range [0.1; 100] to get the light representation in cd/m². The green and blue components are handled in the same way. By selecting γ=2.4, the relative difference between the first two code words becomes 0:16% and ditto for the last two code words 0.95%, which is much more balanced.

SDR Acquisition Process

Assuming the camera sensor measures linear light (R, G, B) in cd/m², the first step is to divide by the peak brightness to get to normalized linear light ($R_{01}$, $G_{01}$, $B_{01}$). Then the inverse of the EOTF is applied $R' = (R_{01})^{1/\gamma}$, and likewise for green and blue. To decorrelate the color components, a color transform from the RGB color space to the YCbCr is applied. The next step is to quantize the data. In this example we quantize to 10 bits, yielding components ($Y'_{444}$, $Cb'_{444}$, $Cr'_{444}$) that vary from 0 to 1023. Finally, the two chroma components are subsampled to get ($Y'_{420}$, $Cb'_{420}$, $Cr'_{420}$). The data can now be sent to a video encoder, such as HEVC encoder.

Display of SDR Data

On the receiver side, the HEVC bitstream is decoded to recover ($Y'_{420}$, $Cb'_{420}$, $Cr'_{420}$) or rather decoded versions of these values due to the fact that HEVC is a lossy decoder. The signal is then processed in reverse to what is described above. The end result is the linear light representation (R, G, B), which is displayed.

HDR Processing

For HDR data, which may include luminances of up to 10 000 cd/m², a simple power function is not a good fit to the contrast sensitivity of the human eye over the entire range of luminances. Any fixed value of γ will result in too coarse a quantization either in the dark tones, the bright tones, or the mid tones. To solve this problem, the EOTF defined as $$R_{01} = \left( \frac{(R')^{1/m} - c_1}{c_2 - c_3 (R')^{1/m}} \right)^{1/n}$$

is used. The peak luminance is also changed from 100 to 10 000.

Problem

If applying the conventional SDR processing outlined above but with the new EOTF defined above and peak luminance equal to 10,000, something unexpected occurs. As is shown by comparing FIGS. 38A and 38B and FIGS. 39A and 39B, artifacts appear. Note that for FIGS. 38A, 38B, 39A, 39B, no compression has taken place other than subsampling and quantizing to 10 bits. Yet disturbing artifacts occur.

Analysis

Assume that the following two pixels are next to each other in a picture:

$RGB1=(1000;0;100);$ and $RGB2=(1000;4;100)$

Note that these colors are quite similar. However, the first processing steps yield $Y'_{444}Cb'_{444}Cr'_{444}1=(263;646;831)$ and $Y'_{444}Cb'_{444}Cr'_{444}2=(401;571;735)$ which are quite different from each other. The average of these two values is Y'Cb'Cr'=(332; 608.5; 783). Now if we would go backwards in the processing chain to see what linear RGB value this represents, we get RGB=(1001; 0.48; 100.5), which is quite close to both RGB1 and RGB2. Thus, just averaging all three components is not a problem. A larger problem arises when only Cb' and Cr' are interpolated, and we use the Y' values from the pixels without interpolation. This is what is done in conventional chroma subsampling, which is performed in order to create a 4:2:0 representation. For instance, taking Y' from the first pixel above, i.e., Y'Cb'Cr'=(263; 608.5; 783) represents a linear RGB color of (484; 0.03; 45), which is much too dark. Similarly, taking Y' from the second pixel, i.e., Y'Cb'Cr'=(401; 608.5; 783) gives an RGB value of (2061; 2.2; 216), which is too bright.

Possible Workarounds

Consider adding a third pixel to the example, $$RGB3=(1000;8;100)$$

If we convert these linear inputs to R'G'B' we get $$R'G'B'1=(0.7518;0.0000;0.5081)$$

$$R'G'B'2=(0.7518;0.2324;0.5081)$$

$$R'G'B'3=(0.7518;0.2824;0.5081).$$

Clearly, the jump in G' is bigger between the first and second pixel although the linear G changes in equal steps of 4. Likewise, the difference between the Y'Cb'Cr' coordinates will be bigger between the first two pixels than the last two. Hence, the effect will be biggest when one or two of the components are close to zero in linear light, i.e., when the color is close to the edge of the color gamut. Thus, one way to avoid the artifacts can be to just avoid saturated colors. However, the larger color space of BT.2020 was introduced specifically to allow for more saturated colors, so that solution is not desirable.

This highlights another issue. Much test content is shot in Rec.709, and after conversion to BT.2020, none of the colors will be fully saturated and thus the artifacts will be small. As an example, a pixel acquired in Rec.709, e.g., RGB709=(0; 500; 0) will after conversion to BT.2020 no longer have any zero components, RGB2020=(165; 460; 44). Later on, when cameras are capable of recording in BT.2020, much stronger artifacts will appear. To emulate the effect of BT.2020 content in a BT.2020 container, we have therefore used Rec.709 material in a Rec.709 container for the processing of the figures in this example. Mathematically, however, there is no difference, since the coordinates $R_{01}G_{01}B_{01}$ will span the full range of [0; 1] in both cases.

Another workaround is to use constant luminance processing (CL). In CL, all of the luminance is carried in Y', as opposed to only most of the luminance being carried in the luma Y' in the above presented processing, which is referred to as non-constant luminance processing (NCL). However, one problem with CL is that it affects the entire chain; converting back and forth between a 4:2:0/4:2:2 CL representation and a 4:2:0/4:2:2 NCL representation endangers introducing artifacts in every conversion step. In practice it has therefore been difficult to convert entire industries from conventional NCL to CL.

Proposed Solution: Luma Adjustment

Figure 40:
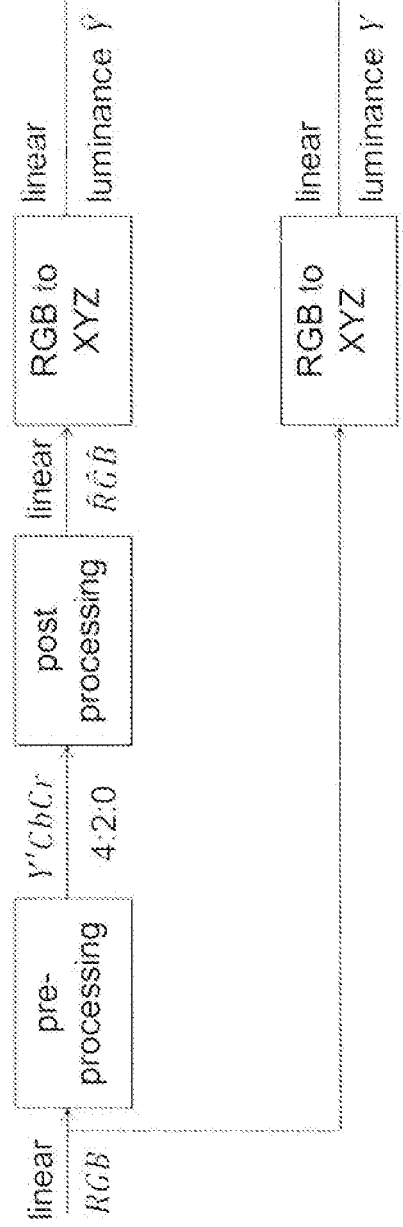
FIG. 40 illustrates that the linear luminance, the Yin CIE1931 XYZ space, is quite different in the original picture (bottom) and the processed picture (top)
Figure 41:
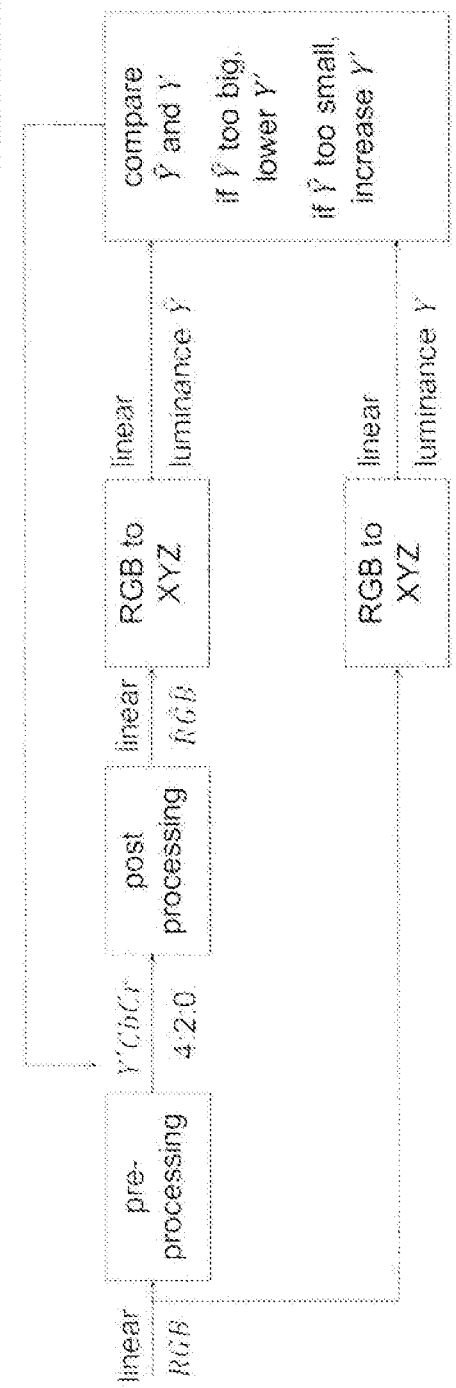
FIG. 41 illustrates a technology that by changing the Y' value in an individual pixel, it is possible to reach a linear luminance $\hat{Y}$ that matches the desired linear luminance Y.

A basic idea is to make sure that the resulting luminance matches the desired one. With luminance, we mean the Y component of the (linear) CIE1931 XYZ color space. This Y is different from the luma Y' mentioned above since Y is calculated from the linear R G B values $Y=w_R R + w_G G + w_B B$ (Equation 1), where wR=0.2627, $w_G$=0.6780 and $w_B$=0.0593. The luminance Y corresponds well to how the human visual system appreciates brightness, so it is interesting to preserve it well. This is shown in FIG. 40 where both the processed signal (top) and the original signal (bottom) is converted to linear XYZ. Then the Y components are quite different as can be seen in the figure. The key insight is that the luma value Y' can be changed independently in each pixel, and therefore it is possible to arrive at the correct desired or original linear luminance $Y_O$ by changing Y' until $\hat{Y}$ equals $Y_O$, as is shown in FIG. 41. It is also the case that $\hat{Y}$ increases monotonically with Y', which means that it is possible to know the direction in which Y' should be changed. Therefore simple methods such as interval halving can be used to find the optimal Y', in at most ten steps for 10 bit quantization. If a one-step solution is preferred, it is possible to use a 3D look-up table that takes in Cb, Cr and desired linear luminance $Y_O$ and delivers Y'.

Implementation Aspects

The technique can be implemented efficiently in the following way: First, the desired, or original luminance $Y_O$ for each pixel is obtained by applying Equation 1 to the original (R, G, B) values of each pixel. Second, the entire chain: (R, G, B)→(normalization)→($R_{01}$, $G_{01}$, $B_{01}$)→(EOTF$^{-1}$)→(R', G', B')→(color transform)→(Y'$_{01}$, Cb'$_{0.5}$, Cr'$_{0.5}$)→(10-bit quantization)→(Y'$_{444}$, Cb'$_{444}$, Cr'$_{444}$)→(chroma subsampling)→(Y'$_{420}$, Cb'$_{420}$, Cr'$_{420}$)→(chroma upsampling)→($\hat{Y}'_{444}$, Cb'$_{444}$, Cr'$_{444}$)→(inverse quantization)→($\hat{Y}'_{01}$, Cb'$_{0.5}$, Cr'$_{0.5}$) is carried out. Then, for each pixel, a starting interval of [0; 1023] is set. Next, the candidate value $\hat{Y}'_{444}$=512 is tried. $\hat{Y}'_{01}$ is calculated from the candidate value, and using the previously calculated $\hat{Cb}'_{0.5}$, $\hat{Cr}'_{0.5}$ it is possible to go through the last processing steps, yielding ($\hat{R}$, $\hat{G}$, $\hat{B}$) through the chain ($\hat{Y}'_{01}$, $\hat{Cb}'_{0.5}$, $\hat{Cr}'_{0.5}$)→(inverse color transform)→($\hat{R}'_{01}$, $G'_{01}$,$\hat{B}'_{01}$)→(EOTF)→($\hat{R}_{01}$, $\hat{G}_{01}$, $\hat{B}_{01}$)→(denormalization)→($\hat{R}$, $\hat{G}$, $\hat{B}$). This is now fed into Equation 1 to get the candidate luminance $\hat{Y}$. For a given pixel, if $\hat{Y}<Y_O$, this means that the candidate value $\hat{Y}'_{444}$ was too small, and that the correct luma value must be in the interval [512; 1023]. Likewise if $\hat{Y}>Y_O$, the correct luma value must be in the interval [0; 512]. The process is now repeated, and after ten iterations the interval contains two neighboring values. At this stage, both of the two values are tried, and the one that produces the smallest error $(\hat{Y}-Y_O)^2$ is selected.

Results

Figures 39A, 39B, 39C:
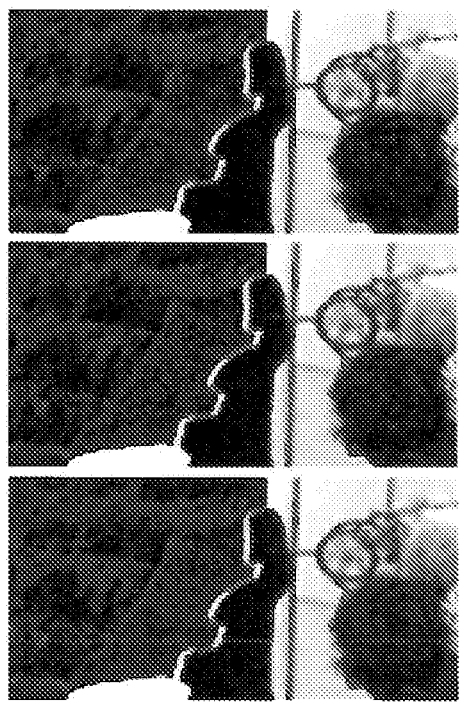
FIGS. 39A-39C illustrate an original 4:4:4 picture (FIG. 39A), a picture following traditional processing 4:2:0 (FIG. 39B) and a picture following AJUSTY processing 4:2:0 (FIG. 39C) in the case of no compression but just downsampling and upsampling.
Figures 38A, 38B, 38C:
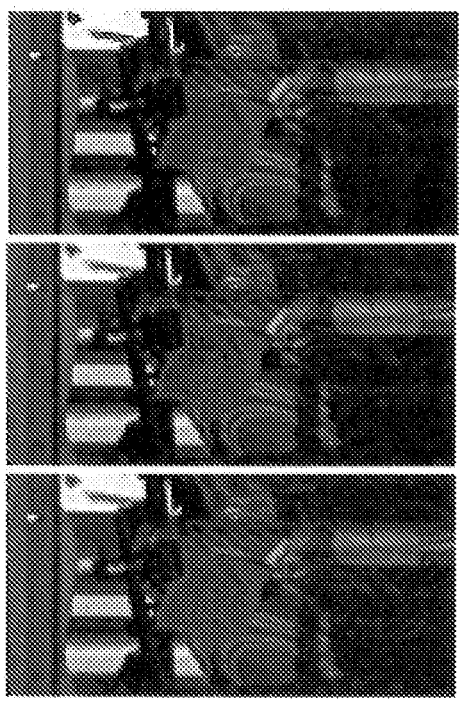
FIGS. 38A-38C illustrate an original 4:4:4 picture (FIG. 38A), a picture following traditional processing 4:2:0 (FIG. 38B) and a picture following AJUSTY processing 4:2:0 (FIG. 38C) in the case of no compression but just downsampling and upsampling.

We implemented the conventional processing chain and compared this to our chain, which includes the luma adjustment step, but keeps the decoder the same. FIGS. 38A-38C and 39A-39C show results without compression. Here, both the conventional processing chain (FIGS. 38B and 39B) and our processing chain (FIGS. 38C and 39C) converts to Y'Cb'Cr' 4:2:0 and then back to linear RGB. FIGS. 38A and 39A illustrate the original pictures. Total encoding time (color conversion plus HM compression) increases about 3% compared to traditional processing.

For HDR material, no single metric has a role similar to PSNR for SDR content. Instead we report two metrics tPSNR-Y for luminance and deltaE for chrominance. In Table A5 the uncompressed results for BT.709 material in a BT.709 container is shown. Here we see a large increase in luminance quality measured as tPSNR-Y of over 17 dB on average, and over 20 dB on one sequence. Also the deltaE result is improving. Table A6 shows the uncompressed results for BT.709 material or P3 material in a BT.2020 container. Here the gains are less pronounced, since no colors directly on the gamut edge are available, but the tPSNR-Y improvement is still 8 dB on average and over 11 dB on some sequences. The deltaE measure improves marginally. Note that with true BT.2020 material, we expect the gains to be more similar to those in Table A5.

TABLE A5 tPSNR-Y and deltaE increase (dB) for Rec.709 container

| class | sequence | tPSNR-Y | deltaE |
|---|---|---|---|
| class A' | FireEaterClip4000r1 | 13.81 | 2.23 |
| | Tibul2Clip4000r1 | 18.01 | 3.85 |
| | Market3Clip4000r2 | 20.30 | 0.15 |
| | Overall | 17.37 | 2.08 |

TABLE A6 tPSNR-Y and deltaE increase (dB) for BT.2020 container

| class | sequence | tPSNR-Y | deltaE |
|---|---|---|---|
| class A | FireEAterClip4000r1 | 5.88 | 0.73 |
| | Market3Clip4000r2 | 10.17 | 0.95 |
| | Tibul2Clip4000r1 | 7.60 | 0.02 |
| class B | AutoWelding | 11.25 | 0.12 |
| | BikeSparklers | 11.33 | 0.02 |
| class C | ShowGirl2Teaser | 6.28 | 0.05 |
| class D | StEM_MagicHour | 7.22 | 0.03 |
| | stem_WarmNight | 8.53 | 0.04 |
| class G | BallonFestival | 7.71 | 0.05 |
| | Overall | 8.44 | 0.22 |

Annex B

This Annex B investigates color artifacts due to 4:2:0 subsampling. First, an attempt to cross-check is made, but the worst value cannot be reproduced, likely due to a bug in HDRTools that has already been fixed. Next, a search is performed for the worst relative error in luminance arising from 4:2:0 subsampling. It is found that a relative error of 86% (195 Barten steps) can occur even if displayed on a screen limited to 4000 nits. Even if data is restricted to Rec709 and held in a BT.2020 container, an error of 30 Barten steps is possible. For P3 content in a BT.2020 container, an error of 40 Barten steps is possible.

1. Introduction

It has been noted that small changes in color can introduce surprisingly large artifacts when 4:2:0 subsampling is used, even if no compression is happening.

1.1 Cross-Check Discrepancies

This investigation started as a cross-check of m35255 [B1], trying to replicate the results on slide 13, reprinted in Table B1 below. The results are from a test image where the left part of the image up to pixel 95 has the color (3000, 0, 100) and the right part, pixel 96 and forward, has the color (3000, 4, 100).

TABLE B1 values of m35255

| 4:2:0 10 bits | 94 | 95 | 96 | 97 | 98 | 99 |
|---|---|---|---|---|---|---|
| EXR | 3000 | 3000 | 3000 | 3000 | 3000 | 3000 |
| RGB | 0 | 0 | 4 | 4 | 4 | 4 |
| in | 100 | 100 | 100 | 100 | 100 | 100 |
| YCbCr | 258 | 258 | 404 | 404 | 404 | 404 |
| | 650 | 650 | 640 | 640 | 570 | 570 |
| | 882 | 882 | 870 | 870 | 787 | 787 |
| implied | 258 | 258 | 401 | 404 | 404 | 404 |
| YCbCr | 650 | 649 | 642 | 604 | 570 | 566 |
| | 882 | 881 | 862 | 828 | 787 | 782 |
| EXR | 3006 | 2958 | 10000 | 5860 | 2998 | 2764 |
| RGB | 0 | 0 | 1.57324 | 2.58008 | 3.99609 | 4.20313 |
| out | 99.1875 | 97.125 | 402.25 | 199 | 100.125 | 92.1875 |

When cross-checking using the same procedures as for the anchors (n14548, [B2]) we got the result shown in Table B2. For downsampling, the filters described in Section 2.4.7 of [B2] was followed (2 and 3 taps) and for upsampling Section 2.4.8 of [B2] was followed (4 tap filters).

TABLE B2 values when trying to crosscheck

| 4:4:4 10 bits | 94 | 95 | 96 | 97 | 98 | 99 |
|---|---|---|---|---|---|---|
| EXR | 3000 | 3000 | 3000 | 3000 | 3000 | 3000 |
| RGB | 0 | 0 | 4 | 4 | 4 | 4 |
| in | 100 | 100 | 100 | 100 | 100 | 100 |
| YCbCr | 258 | 258 | 404 | 404 | 404 | 404 |
| 4:2:0 | 650 | | 580 | | 570 | |
| | 882 | | 799 | | 787 | |
| YCbCr | 258 | 258 | 404 | 404 | 404 | 404 |
| after | 650 | 616 | 580 | 571 | 570 | 569 |
| upsampling | 882 | 841 | 799 | 788 | 787 | 786 |

TABLE B2-continued values when trying to crosscheck

| 4:4:4 10 bits | 94 | 95 | 96 | 97 | 98 | 99 |
|---|---|---|---|---|---|---|
| EXR | 3006 | 1551 | 3644 | 3048 | 2998 | 2950 |
| RGB | 0 | 0.0169 | 3.5293 | 3.9531 | 3.9961 | 4.0391 |
| out | 99.1875 | 48.2188 | 122.9375 | 102.2500 | 100.125 | 98.0625 |

As can be seen, this matches really poorly and only pixel nos. 94 and 98 matches, whereas no match is found for pixel nos. 95-97 or 99. However, moving the discontinuity to pixel 97 instead gives a much better match, as shown in Table B3.

TABLE B3 values when moving the discontinuity

| 4:4:4 10 bits | 94 | 95 | 96 | 97 | 98 | 99 |
|---|---|---|---|---|---|---|
| EXR | 3000 | 3000 | 3000 | 3000 | 3000 | 3000 |
| RGB | 0 | 0 | 0 | 4 | 4 | 4 |
| in | 100 | 100 | 100 | 100 | 100 | 100 |
| YCbCr | 258 | 258 | 258 | 404 | 404 | 404 |
| 4:2:0 | 650 | | 640 | | 570 | |
|  | 882 | | 870 | | 787 | |
| YCbCr | 258 | 258 | 258 | 404 | 404 | 404 |
| after | 650 | 649 | 640 | 604 | 570 | 566 |
| upsampling | 882 | 881 | 870 | 828 | 787 | 782 |
| EXR | 3006 | 2958 | 2476 | 5860 | 2998 | 2764 |
| RGB | 0 | 0 | 0.00142 | 2.58008 | 3.99609 | 4.20312 |
| out | 99.1875 | 97.125 | 80.5625 | 199 | 100.125 | 92.1875 |

In Table B3, only pixel no. 96 does not match. That is also the pixel with the strangest values (10000, 1.57, 402.25), the correct answer being (3000, 0, 100) or (3000, 4, 100) depending on where you put the discontinuity.

It seems as if the mismatch in the crosscheck is due to an error that has already been corrected in HDRtools. If reverting to revision 492, we can produce the same values as in m35255 [B1]. To confirm that the newer version of HDRtools (revision 573) is correct we have independently implemented the processing chain in Matlab and we get the same results as in Table B3. The reason why we had to move the discontinuity to get a match is probably due to the faulty filtering in revision 492 which has been fixed in the current version.

1.2 Rounding Issue

When implementing the Matlab crosscheck, we realized that the conversion of float to EXR in HDRtools lacks rounding. Instead of rounding the 23 bits of the mantissa to 10 bits, they are just right-shifted, basically replacing a round( ) with a floor( ) This affects the end result. As an example a float of 3007.9 will be converted to 3006.0, even though 3008.0 is a much closer value. To get a match we made the Matlab code emulate the floor( ) type conversion in the current revision of HDRtools (revision 587 of [B3]).

1.3 Color Outliers

Note that even if pixel 96 is no longer an extreme outlier, pixel 97 is still quite far from correct: (5860, 2.58, 199) instead of (3000, 4, 100). That raises the question; how bad outliers can 4:2:0 subsampling generate and where does this happen? To answer this question we first have to define what we mean by "bad". We concentrated on the luminance, since the human visual system is more sensitive to changes in luminance than in chrominance. Hence we transformed both the input ExR image and the output ExR image both linear light to XYZ, and formed the difference in Y. To get a relative error we then divided by the Y component of the original. We then wrote a small program maximizing this relative error for pixel 97 over all possible images of the type where the left part is of one color and the right part is the same color plus a small delta of length 4, just as was done in m35255 [B1].

Running this program gave the answer that having the color (2142, 0, 138) in the left part and (2142, 4, 138) in the right part gives the largest visible error, as shown in Table B4. The optimization software that looks for the "worst" error is not guaranteed to find the global maximum, hence even worse positions in the color gamut may exist.

TABLE B4 data for the "worst" color for 4:2:0 subsampling

| pixel 97 | RGB value | Y value | Y diff | relative error | Barten steps |
|---|---|---|---|---|---|
| original | 2142<br>4<br>138 | 573.5991 | 0 | 0 | 0 |
| RGB 4:4:4 | 2142.6617<br>3.9750<br>138.2966 | 573.7735 | 0.1745 | 0.0304% | 0.0691 |
| RGB 4:2:0 | 3993.7333<br>2.4265<br>263.6030 | 1066.4311 | 492.8320 | 85.9192% | 195.2710 |

It should be noted that having a red component higher than 2142 would generate an even higher relative error. However, we assumed that RGB values above 4000 would be clipped to 4000 by the monitor, so we believe that the actual on-screen difference would start to diminish if higher values were used.

Figures 42, 43:
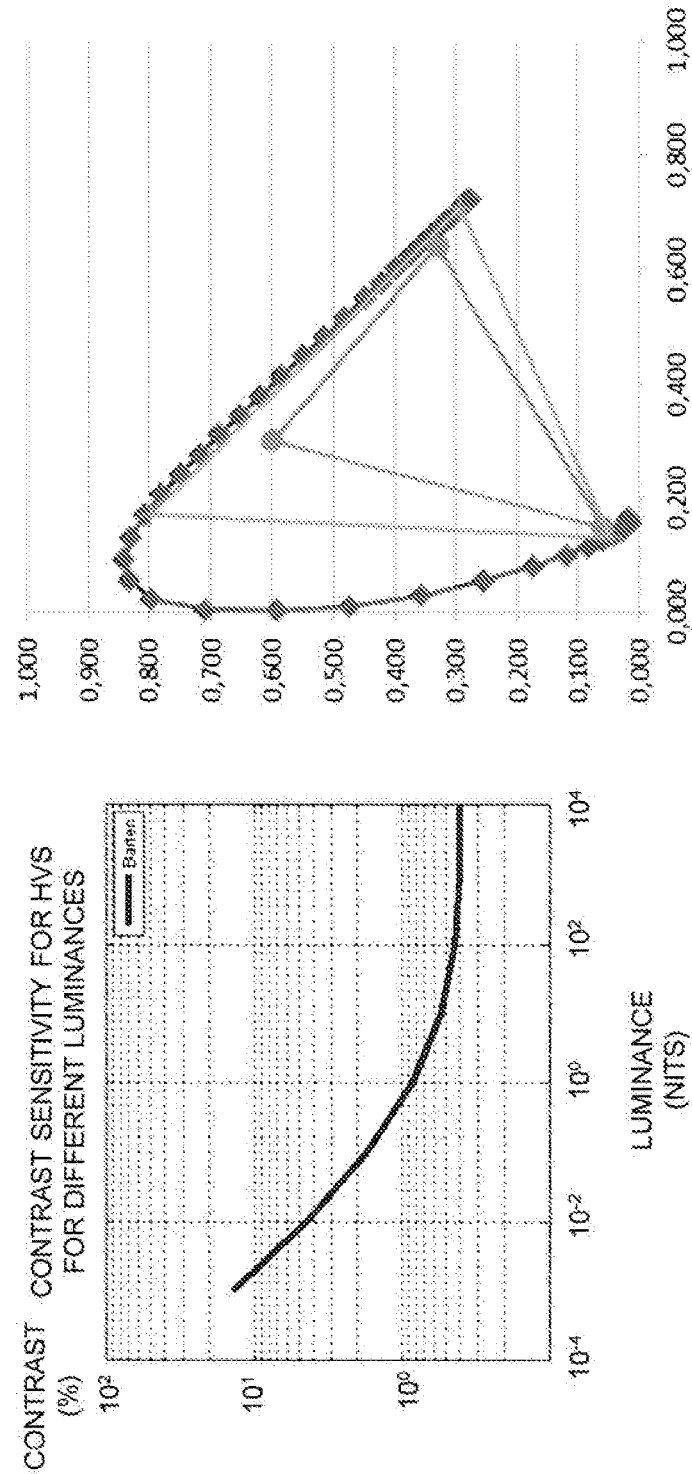
FIG. 42 illustrates Barten's curve for contrast sensitivity.
FIG. 43 illustrates a comparison between Rec709 and BT.2020 color gamuts.

As can be seen in Table B4, the relative error for RGB 4:4:4 is 0.0304%. To put that in perspective, we compared that with Barten's curve, see FIG. 42 illustrating Barten's curve for contrast sensitivity. A contrast below the curve is not noticeable. Table B5 shows the values used for plotting the curve in FIG. 42.

TABLE B5 values used for plotting the Barten's curve

| Luminance in cd/m² | Contrast (%) |
|---|---|
| $10^{-3}$ | 13.8294 |
| $10^{-2}$ | 4.5454 |
| $10^{-1}$ | 1.7461 |
| $10^{0}$ | 0.8507 |
| $10^{1}$ | 0.5454 |
| $10^{2}$ | 0.4360 |
| $10^{3}$ | 0.4027 |
| $10^{4}$ | 0.3962 |

As can be seen in FIG. 42, the tolerance for relative errors decreases with increased luminance. At 100 nits, an error of 0.44% can be just noticeable, whereas at 1000 nits, an error of 0.40% can be just noticeable. Since 455 nits is right between these, we use the higher value of 0.44%. This gives a Barten step of 0.069, which means it is not noticeable.

For 4:2:0 subsampling, on the other hand, the relative error is 85.92%. This is equivalent to over 195 Barten steps, which should be clearly visible. It therefore seems reasonable to conclude that 4:2:0 subsampling can create clearly visible artifacts, at least together with non-constant luminance and a highly non-linear transfer function as is the case in the anchor generation.

Note that the worst error is right on the border of the color gamut; since the green color is zero, the color (2142, 0, 138) is on the line between the red and green color primaries. This is consistent with what was reported in m35255 [B1], which also pointed out colors on the gamut edge as problematic.

1.4 when Input is 709 Data

The data presented in Table A1 was for BT.2020 primaries. If the input data is with Rec709 primaries, but the container is BT.2020, it will not be possible to reach the color gamut boundary. This is due to the fact that the Rec709 gamut triangle is inside the BT.2020 triangle, not touching the gamut boundary, as can be seen in FIG. 43. It is therefore reasonable to assume that the relative error will be smaller. We have run the optimization software to find the Rec709 color that, after conversion to BT.2020, would result in the largest relative error. The resulting two colors are (0, 0, 50) for the left part of the screen and (2, 3, 49) in the right part. This is presented in Table B6.

TABLE B6 data for the "worst" color for 4:2:0 subsampling if input is Rec709 and container format is BT.2020

| pixel 97 | RGB value | Y value | Y diff | relative error | Barten steps |
|---|---|---|---|---|---|
| original Rec709 color | 2<br>3<br>49 | | | | |
| original BT.2020 color | 4.3650<br>3.4535<br>44.1810 | 6.1082 | | | |
| RGB 4:4:4 | 4.3793<br>3.4293<br>43.7035 | 6.0672 | 0.0410 | 0.6711% | 1.2305 |

TABLE B6-continued data for the "worst" color for 4:2:0 subsampling if input is Rec709 and container format is BT.2020

| pixel 97 | RGB value | Y value | Y diff | relative error | Barten steps |
|---|---|---|---|---|---|
| RGB 4:2:0 | 4.4055<br>2.9939<br>63.5135 | 7.2163 | 1.1082 | 18.1422% | 33.2640 |

Here we have used the Barten curve at 10 nits, which equals 0.54%. For RGB 4:4:4 we then get an error that is just noticeable at 1.2305 Barten steps, whereas the error in RGB 4:2:0 equals 33 Barten steps, which should be clearly visible. It is also reasonable that the error is smaller (33 Barten steps vs. 195 Barten steps) since starting out with Rec709 data precludes the color from reaching all parts of the gamut edge of BT.2020.

Notice also how the optimization result has found that the worst error is available near the blue primary. This is likely because the blue Rec709 primary is closest to the BT.2020 gamut edge, as can be seen in FIG. 43.

1.5 when Input is P3 Data

The same test can be carried out for P3 source data contained in a BT.2020 container. The worst colors are then (2.48, 3.32, 4.63) and (3.29, 0, 6.71), as shown in Table B7.

TABLE B7 data for the "worst" color for 4:2:0 subsampling if input is P3 and container format is BT.2020

| pixel 97 | RGB value | Y value | Y diff | relative error | Barten steps |
|---|---|---|---|---|---|
| original P3 color | 3.29<br>0<br>6.71 | | | | |
| original BT.2020 color | 2.7993<br>0.2342<br>6.5960 | 1.2853 | | | |
| RGB 4:4:4 | 2.8099<br>0.2304<br>6.4838 | 1.2788 | 0.0065 | 0.5062% | 0.5951 |
| RGB 4:2:0 | 1.4911<br>0.3834<br>3.2402 | 0.8438 | 0.4416 | 34.3530% | 40.38 |

We would assume that the error would be somewhere between that of Rec709 and BT.2020, and this is also the case, we now get an error equivalent of 40.38 Barten steps. Note that since the Barten value changes, it is important to include it in the loop when searching for the worst value. We have used the Barten value for 1 cd/m², which equals 0.85%.

1.6 Conclusion

This Annex has investigated the error in luminance due to 4:2:0 subsampling. Although we have not been able to match the worst outlier from m35255 [B1], the worst case errors are still significant, reaching almost 200 Barten steps for general data. Even if the source data is constrained to Rec709 and put into a BT.2020 container, the error is still significant, over 30 Barten steps, and for P3 data in a BT.2020 container, over 40 Barten steps.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] Tourapis et al., Enhanced Luma Adjustment Methods, Joint Collaborative Team on Video Coding (JCT-VC) of ITU-T SG 16 WP 3 and ISO/IEC JTC 1/SC 29/WG 11, 23$^{rd}$ Meeting: San Diego, USA, 19-26 Feb. 2016, Document: JCTVC-W0052

[2] Norkin, Closed form HDR 4:2:0 chroma subsampling (HDR CE1 and AHG5 related), Joint Collaborative Team on Video Coding (JCT-VC) of ITU-T SG 16 WP 3 and ISO/IEC JTC 1/SC 29/WG 11, 23$^{rd}$ Meeting: San Diego, USA, 19-26 Feb. 2016, Document: JCTVC-W0107

[A4] International Organization for Standardization, ISO/IEC JTC1/SC29/WG11, Coding of moving pictures and audio, MPEG2014/N15083, February 2015, Geneva, Switzerland, Luthra et al., Call for Evidence (CfE) for HDR and WCG Video Coding

[B1] International Organization for Standardization, ISO/IEC JTC1/SC29/WG11, Coding of moving pictures and audio, MPEG2013/M35255, October 2014, Strasbourg, France, Francois et al., About using a BT.2020 container for BT.709 content

[B2] International Organization for Standardization, ISO/IEC JTC1/SC29/WG11, Coding of moving pictures and audio, MPEG2014/N14548, July 2014, Sapporo, Japan, Luthra et al., Test sequences and anchor generation for HDR and Wide Gamut Content Distribution

[B3] https://wg11.sc29.org/svn/repos/Explorations/XYZ/HDRTools/branches/0.9-dev

The invention claimed is:

1. A method of processing a pixel in a picture, said method comprises:
checking whether a color component of said pixel in a color space resulting in a smallest error between at least one color component in another color space determined based on said color component in said color space and at least one original color component of said pixel in said another color space causes any color channel of said pixel to fall outside of an allowed range;
obtaining a value of said color component in said color space using a first function or a first look-up table if said color component in said color space resulting in said smallest error does not cause any color channel of said pixel to fall outside of said allowed range; and
obtaining a value of said color component in said color space using a second, different function or a second, different look-up table if said color component in said color space resulting in said smallest error causes any color channel of said pixel to fall outside of said allowed range.

2. The method of claim 1, wherein
checking whether said color component in said color space resulting in said smallest error causes any color channel of said pixel to fall outside of said allowed range comprises checking whether a color component of said pixel in a second color space resulting in a smallest error between i) a color component in a third color space determined based on said color component in said second color space and an original color component in said third color space determined based on original color components of said pixel in a first color space or ii) color components in said first color space determined based on said color component in said second color space and said original color components in said first color space causes any color channel of said pixel to fall outside of said allowed range;
obtaining said value comprises obtaining a value of said color component in said second color space using said first function or said first look-up table if said color component in said second color space resulting in said smallest error does not cause any color channel of said pixel to fall outside of said allowed range; and
obtaining said value comprises obtaining a value of said color component in said second color space using said second, different function or said second, different look-up table if said color component in said second color space resulting in said smallest error causes any color channel of said pixel to fall outside of said allowed range.

3. The method of claim wherein
checking whether said color component in said color space resulting in said smallest error causes any color channel of said pixel to fall outside of said allowed range comprises checking whether a luma component of said pixel resulting in a smallest error between i) a luminance determined based on said luma component and an original luminance determined based on original red, green and blue color components of said pixel or ii) red, green and blue color components determined based on said luma component and said original red, green and blue color components of said pixel causes any color channel of said pixel to fall outside of said allowed range;
obtaining said value comprises obtaining a value of said luma component using said first function or said first look-up table if said luma component resulting in said smallest error does not cause any color channel of said pixel to fall outside of said allowed range; and
obtaining said value comprises obtaining a value of said luma component using said second, different function or said second, different look-up table if said luma component resulting in said smallest error causes any color channel of said pixel to fall outside of said allowed range.

4. The method of claim 1, wherein checking whether said color component in said color space resulting in said smallest error causes any color channel of said pixel to fall outside of said allowed range comprises checking whether said color component in said color space resulting in said smallest error causes clipping of any color channel of said pixel.

5. The method of claim 1, wherein checking whether said color component in said color space resulting in said smallest error causes any color channel of said pixel to fall outside of said allowed range comprises checking whether said color component in said color space resulting in said smallest error causes any color channel of said pixel to be larger than one or to be smaller than zero.

6. The method of claim 1, wherein checking whether said color component in said color space resulting in said smallest error causes any color channel of said pixel to fall outside of said allowed range comprises checking whether said color component in said color space resulting in said smallest error causes any color channel of said pixel to saturate.

7. The method of claim 1, wherein
obtaining said value comprises calculating said value of said color component in said color space using a first linearization function if said color component in said color space does not cause any color channel of said pixel to fall outside of said allowed range; and obtaining said value comprises calculating said value of said color component in said color space using a second, different linearization function or an inverse function if said color component in said color space causes any color channel of said pixel to fall outside of said allowed range.

8. The method of claim 7, wherein calculating said value of said color component comprises:

selecting said second, different linearization function or said inverse function depending on which color channel or color channels of said pixel that falls or fall outside of said allowed range; and calculating said value of said color component in said color space using said selected second, different linearization function or said selected inverse function.

9. The method of claim 8, wherein checking whether said color component in said color space resulting in said smallest error causes any color channel of said pixel to fall outside of said allowed range comprises checking whether a luma component Y' of said pixel resulting in a smallest error between a luminance Y determined based on said luma component Y' and an original luminance Yo determined based on original red, green and blue color components RoGoBo of said pixel causes any of a red, green and blue color channel of said pixel to clip;

calculating said value comprises calculating) a value of said luma component Y' as $$Y' = -\frac{w_R tf'(Ro')(a_{13}Cr - Ro') + w_G tf'(Go')(-a_{22}Cb - a_{23}Cr - Go') + w_B tf'(Bo')(a_{32}Cb - Bo')}{w_R tf'(Ro') + w_G tf'(Go') + w_B tf'(Bo')}$$

if said luma component Y' does not cause any of said red, green, blue color channel of said pixel to clip, wherein $w_R$, $w_G$, $w_B$ denote color weights, $a_{13}$, $a_{22}$, $a_{23}$, $a_{32}$ denote positive constants of a color transformation from a Y'CbCr color to an R'G'B' color, Cb, Cr denote chroma components of said pixel, P=tf(P'), wherein P=red (R), green (G) or blue (B), tf(.) is a transfer function and tf'(Po') denotes the derivative of said transfer function in Po';

selecting said second, different linearization function or said inverse function comprises:

selecting said second, different linearization function $$Y' = \frac{Yo - w_R 10000 - w_G tf'(Go')(-a_{22}Cb - a_{23}Cr - Go') - w_B tf'(Bo')(a_{32}Cb - Bo')}{w_G tf'(Go') + w_B tf'(Bo')}$$

if said red color channel clips;
selecting said second, different linearization function $$Y' = \frac{Yo - w_R tf'(Ro')(a_{13}Cr - Ro') - w_G 10000 - w_B tf'(Bo')(a_{32}Cb - Bo')}{w_R tf'(Ro') + w_B tf'(Bo')}$$

if said green color channel clips;
selecting said second, different linearization function $$Y' = \frac{Yo - w_R tf'(Ro')(a_{13}Cr - Ro') - w_G tf'(Go')(-a_{22}Cb - a_{23}Cr - Go') - w_B 10000}{w_R tf'(Ro') + w_G tf'(Go')}$$

if said blue color channel clips;
selecting said inverse function $$Y' = tf^{-1}\left(\frac{Yo - w_R 10000 - w_G 10000}{w_B}\right) - a_{32}Cb$$

if said red color channel and said green color channel clip, wherein $tf^{-1}(.)$ denotes the inverse of said transfer function tf(.);
selecting said inverse function $$Y' = tf^{-1}\left(\frac{Yo - w_R 10000 - w_B 10000}{w_G}\right) + a_{22}Cb + a_{23}Cr$$

if said red color channel and said blue color channel clip; and
selecting said inverse function $$Y' = tf^{-1}\left(\frac{Yo - w_G 10000 - w_B 10000}{w_R}\right) - a_{13}Cb$$

if said green color channel and said blue color channel clip.

10. The method of claim 9, further comprising calculating Y'redclip=1−$a_{13}$Cr, Y'greenclip=1+$a_{22}$Cb+$a_{23}$Cr and Y'blueclip=1−$a_{32}$Cb, wherein checking whether said luma component Y' resulting in said smallest error causes any of said red, green and blue color channel of said pixel to clip comprises checking whether said luma component Y' resulting in said smallest error causes any of said red, green and blue color channel of said pixel to clip based on a smallest value of Y'redclip, Y'greenclip and Y'blueclip.

11. The method of claim 10, further comprising:
selecting a smallest value Y'firstclip=min(Y'redclip, Y'greenclip, Y'blueclip); and
calculating Yfirstclip=$w_R$tf(Y'firstclip+$a_{13}$Cr)+$w_G$tf(Y'firstclip−$a_{22}$Cb−$a_{23}$Cr)+$w_B$tf(Y'firstclip+$a_{32}$Cb),
wherein checking whether said luma component Y' resulting in said smallest error causes any of said red, green and blue color channel of said pixel to clip comprises checking whether Yo<Yfirstclip.

12. The method of claim 11, further comprising:
selecting a median value Y'secondclip=median(Y'redclip, Y'greenclip, Y'blueclip); and
calculating Ysecondclip=$w_R$tf(Y'secondclip+$a_{13}$Cr)+$w_G$tf(Y'secondclip−$a_{22}$Cb−$a_{23}$Cr)+$w_B$tf(Y'secondclip+$a_{32}$Cb), wherein checking whether said luma component Y' resulting in said smallest error causes any of said red, green and blue color channel of said pixel clip comprises:
determining that said luma component Y' resulting in said smallest error does not cause any of said red, green or blue color channel of said pixel to clip if Yo<Yfirstclip;
determining that said luma component Y' resulting in said smallest error causes one of said red, green and blue color channels of said pixel to clip if Yfirstclip≤Yo<Ysecondclip; and determining that said luma component Y' resulting in said smallest error causes two of said red, green and blue color channels of said pixel to clip if Yo≥Ysecondclip.

13. The method of claim 1, wherein checking whether said color component in said color space resulting in said smallest error causes any color channel of said pixel to fall outside of said allowed range comprises checking whether a luma component Y' of said pixel resulting in a smallest error between red, green and blue color components RGB determined based on said luma component Y' and original red, green and blue color components RoGoBo of said pixel causes any of a red, green and blue color channel of said pixel to clip.

14. The method of claim 13, wherein checking whether said color component in said color space resulting in said smallest error causes any color channel of said pixel to fall outside of said allowed range, obtaining said value and obtaining said value comprise:

calculating Y'redclip=1−$a_{13}$Cr, Y'greenclip=1+$a_{22}$Cb+$a_{23}$Cr and Y'blueclip=1−$a_{32}$Cb, wherein $a_{13}$, $a_{22}$, $a_{23}$, $a_{32}$ denote positive constants of a color transformation from a Y'CbCr color to an R'G'B' color, Cb, Cr denote chroma components of said pixel;

calculating a first value Y'rgb of said luma component Y' as $$Y'rgb = -\frac{w_R tf'(Ro')^2(a_{13}Cr - Ro') + w_G tf'(Go')^2(-a_{22}Cb - a_{23}Cr - Go') + w_B tf'(Bo')^2(a_{32}Cb - Bo')}{w_R tf'(Ro')^2 + w_G tf'(Go')^2 + w_B tf'(Bo')^2},$$

wherein $w_R$, $w_G$, $w_B$ denote color weights, $a_{13}$, $a_{22}$, $a_{23}$, $a_{32}$ denote positive constants of a color transformation from a Y'CbCr color to an R'G'B' color, P=tf(P'), wherein P=red (R), green (G) or blue (B), tf(.) is a transfer function and tf(Po') denotes the derivative of said transfer function in Po';

calculating a second value Y'one of said luma component Y' as $$Y'gb = -\frac{w_G tf'(Go')^2(-a_{22}Cb - a_{23}Cr - Go') + w_B tf'(Bo')^2(a_{32}Cb - Bo')}{w_G tf'(Go')^2 + w_B tf'(Bo')^2}$$

if Y'redclip=min(Y'redclip, Y'greenclip, Y'blueclip), as $$Y'rb = -\frac{w_R tf'(Ro')^2(a_{13}Cr - Ro') + w_B tf'(Bo')^2(a_{32}Cb - Bo')}{w_R tf'(Ro')^2 + w_B tf'(Bo')^2}$$

if Y'greenclip=min(Y'redclip, Y'greenclip, Y'blueclip), and as $$Y'rg = -\frac{w_R tf'(Ro')^2(a_{13}Cr - Ro') + w_G tf'(Go')^2(-a_{22}Cb - a_{23}Cr - Go')}{w_R tf'(Ro')^2 + w_G tf'(Go')^2}$$

if Y'blueclip=min(Y'redclip, Y'greenclip, Y'blueclip);
calculating a third value Y'two of said luma component Y' as $$Y'r = tf^{-1}\left(\frac{Yo - w_R 10000 - w_B 10000}{w_G}\right) + a_{22}Cb + a_{23}Cr$$

if Y'redclip=max(Y'redclip, Y'greenclip, Y'blueclip), as $$Y'g = tf^{-1}\left(\frac{Yo - w_R 10000 - w_B 10000}{w_G}\right) + a_{22}Cb + a_{23}Cr$$

if Y'greenclip=max(Y'redclip, Y'greenclip, Y'blueclip), and as $$Y'b = tf^{-1}\left(\frac{Yo - w_G 10000 - w_B 10000}{w_R}\right) - a_{13}Cb$$

if Y'blueclip=min(Y'redclip, Y'greenclip, Y'blueclip);
calculating a first error value errRGB(Y'rgb)=$w_R$(tf(Y'rgb+$a_{13}$Cr)−Ro)$^2$+$w_G$(tf(Y'rgb−$a_{22}$Cb−$a_{23}$Cr)−Go)$^2$+$w_B$(tf(Y'rgb+$a_{32}$Cb)−Bo)$^2$;

calculating a second error value errRGBone=$w_R$(10000−Ro)$^2$+$w_G$(tf(Y'gb−$a_{22}$Cb−$a_{23}$Cr)−Go)$^2$+$w_B$(tf(Y'gb+$a_{32}$Cb)−Bo)$^2$ if Y'redclip=min(Y'redclip, Y'greenclip, Y'blueclip), as errRGBone=$w_R$(tf(Y'rb+$a_{13}$Cr)−Ro)$^2$+$w_G$(10000−Go)$^2$+$w_B$(tf(Y'rb+$a_{32}$Cb)−Bo)$^2$ if Y'greenclip=min(Y'redclip, Y'greenclip, Y'blueclip), and as errRGBone=$w_R$(tf(Y'rg+$a_{13}$Cr)−Ro)$^2$+$w_G$(tf(Y'rg−$a_{22}$Cb−$a_{23}$Cr) Go)$^2$+$w_B$(10000−Bo)$^2$ if Y'blueclip=min(Y'redclip, Y'greenclip, Y'blueclip);

calculating a third error value errRGBtwo=$w_R$(tf(Y'r+$a_{13}$Cr)−Ro)$^2$+$w_G$(10000−Go)$^2$+$w_B$(10000−Bo)$^2$ if Y'redclip=max(Y'redclip, Y'greenclip, Y'blueclip), as errRGBtwo=$w_R$(10000−Ro)$^2$+$w_G$(tf(Y'g−$a_{22}$Cb−$a_{23}$Cr)−Go)$^2$+$w_B$(10000−Bo)$^2$ if Y'greenclip=max(Y'redclip, Y'greenclip, Y'blueclip), and as errRGBtwo=$w_R$(10000−Ro)$^2$+$w_G$(1000−Go)$^2$+$w_B$(tf(Y'b+$a_{32}$Cb)−Bo)$^2$ if Y'blueclip=max(Y'redclip, Y'greenclip, Y'blueclip); and selecting Y'rgb as said value of said luma component Y' if errRGB(Y'rgb)=min(errRGB(Y'rgb), errRGBone, errRGBtwo), Y'one as said value of said luma component Y' if errRGBone=min(errRGB(Y'rgb, errRGBone, errRGBtwo) and Y'two as said value of said luma component Y' if errRGBtwo=min(errRGB(Y'rgb, errRGBone, errRGBtwo).

15. The method of claim 9, wherein checking whether said luma component Y' resulting in said smallest error causes any of said red, green and blue color channel of said pixel to clip comprises retrieving, from a look-up table and for each color channel of said red, green and blue color channels of said pixel using said original luminance Yo and said chroma components Cb, Cr of said pixel or quantized versions thereof as input, a bit indicating whether said luma component Y' resulting in said smallest error causes said color channel to clip.

16. The method of claim 1, further comprising calculating Y'redclipZero=−$a_{13}$Cr, Y'greenclipZero=$a_{22}$Cb+$a_{23}$Cr and Y'blueclipZero=1−$a_{32}$Cb, wherein $a_{13}$, $a_{22}$, $a_{23}$, $a_{32}$ denote positive constants of a color transformation from a Y'CbCr color to an R'G'B' color, Y' denotes a luma component of said pixel, Cb, Cr denote chroma components of said pixel, wherein checking whether said color component in said color space resulting in said smallest error causes any color channel of said pixel to fall outside of said allowed range comprises checking whether a luma component Y' of said pixel resulting in a smallest error between i) a luminance Y determined based on said luma component Y' and an original luminance Yo determined based on original red, green and blue color components RoGoBo of said pixel or ii) red, green and blue color components RGB determined based on said luma component Y' and said original red, green and blue color components RoGoBo of said pixel causes any of a red, green and blue color channel of said pixel to clip against zero based on at least one of Y'redclipZero=$-a_{13}$Cr, Y'greenclipZero=$a_{22}$Cb+$a_{23}$Cr and Y'blueclipZero=$1-a_{32}$Cb.

17. The method of claim 1, wherein
obtaining said value comprises retrieving said value of said color component in said color space from a first look-up table if said color component in said color space does not cause any color channel of said pixel to fall outside of said allowed range; and
obtaining said value comprises retrieving said value of said color component in said color space from a second, different look-up table if said color component in said color space causes any color channel of said pixel to fall outside of said allowed range.

18. The method of claim 17, wherein retrieving said value of said color component comprises:
selecting said second, different look-up table depending on which color channel or color channels of said pixel that falls or fall outside of said allowed range; and
retrieving said value of said color component in said color space from said selected second, different look-up table.

19. A method of encoding a pixel in a picture, said method comprising:
processing said pixel of claim 1 to derive a value of a luma component for said pixel; and
encoding said value of said luma component and values of subsampled chroma components.

20. A device of processing a pixel in a picture, wherein
said device is configured to check whether a color component of said pixel in a color space resulting in a smallest error between at least one color component in another color space determined based on said color component in said color space and at least one original color component of said pixel in said another color space causes any color channel of said pixel to fall outside of an allowed range;
said device is configured to obtain a value of said color component in said color space using a first function or a first look-up table if said color component in said color space resulting in said smallest error does not cause any color channel of said pixel to fall outside of said allowed range; and
said device is configured to obtain a value of said color component in said color space using a second, different function or a second, different look-up table if said color component in said color space resulting in said smallest error causes any color channel of said pixel to fall outside of said allowed range.

21. A computer program product comprising a non-transitory computer readable medium storing a instructions for causing a processing device to perform the method of claim 1.

* * * * *